US009037808B2

(12) United States Patent
Suzuki et al.

(10) Patent No.: US 9,037,808 B2
(45) Date of Patent: May 19, 2015

(54) RESTORING DATA USING PARITY WHEN SUSPENDING A CORE OF A MULTICORE PROCESSOR

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 13/730,514

(22) Filed: Dec. 28, 2012

(65) Prior Publication Data

US 2013/0124804 A1 May 16, 2013

Related U.S. Application Data

(63) Continuation of application No. PCT/JP2010/061179, filed on Jun. 30, 2010.

(51) Int. Cl.
| | |
|---|---|
| G06F 12/08 | (2006.01) |
| G06F 1/32 | (2006.01) |
| G06F 1/30 | (2006.01) |
| G06F 11/10 | (2006.01) |
| G06F 12/06 | (2006.01) |

(52) U.S. Cl.
CPC .............. *G06F 1/30* (2013.01); *G06F 12/0804* (2013.01); *G06F 2212/254* (2013.01); *G06F 12/0646* (2013.01); *G06F 2212/1028* (2013.01); *G06F 2211/1059* (2013.01); *G06F 11/1004* (2013.01); *G06F 11/1076* (2013.01)

(58) Field of Classification Search
CPC . G06F 12/0646; G06F 12/0804; G06F 13/12; G06F 13/124; G06F 2212/1028
USPC ......................................... 711/147, 148, 162
See application file for complete search history.

(56) References Cited

U.S. PATENT DOCUMENTS

| | | | |
|---|---|---|---|
| 5,928,365 | A | 7/1999 | Yoshida |
| 2002/0065998 | A1 | 5/2002 | Buckland |
| 2003/0097518 | A1 | 5/2003 | Kohn et al. |
| 2005/0071554 | A1 | 3/2005 | Thayer et al. |
| 2008/0250260 | A1 | 10/2008 | Tomita |

FOREIGN PATENT DOCUMENTS

| | | |
|---|---|---|
| JP | 62-198949 A | 9/1987 |
| JP | 09-212416 A | 8/1997 |

(Continued)

OTHER PUBLICATIONS

Japanese Office Action dated Sep. 9, 2014 issued in Japanese Patent Application No. 2013-208550 (with English translation).

*Primary Examiner* — Hal Schnee
(74) *Attorney, Agent, or Firm* — Arent Fox LLP

(57) ABSTRACT

A computer-readable recording medium stores a program that causes a computer capable of accessing a multicore processor equipped with volatile memories and a plurality of cores accessing the volatile memories, to execute a data restoration process. The data restoration process includes detecting a suspend instruction to any one of the cores in the multicore processor; and restoring, when the suspend instruction is detected, data stored in a volatile memory accessed by a core receiving the suspend instruction, the data being restored in a shared memory accessed by the cores in operation and based on parity data stored in the volatile memories accessed by the cores in operation other than the core receiving the suspend instruction.

13 Claims, 51 Drawing Sheets

(56) References Cited

FOREIGN PATENT DOCUMENTS

| | | |
|---|---|---|
| JP | 2002-215337 A | 8/2002 |
| JP | 2005-508032 A | 3/2005 |
| JP | 2005-108224 A | 4/2005 |
| JP | 2008-257578 A | 10/2008 |
| JP | 2009-507324 A | 2/2009 |
| WO | WO 03/036884 A2 | 5/2003 |
| WO | WO 2007/028109 A3 | 3/2007 |

RESTORING DATA USING PARITY WHEN SUSPENDING A CORE OF A MULTICORE PROCESSOR

CROSS REFERENCE TO RELATED APPLICATIONS

This application is a continuation application of International Application PCT/JP2010/061179, filed on Jun. 30, 2010 and designating the U.S., the entire contents of which are incorporated herein by reference.

FIELD

The embodiments discussed herein are related a data restoration program, a data restoration apparatus, and a data restoration method restoring data stored in a volatile memory mounted on a core.

BACKGROUND

A technique to achieve low power consumption in a multicore processor is conventionally disclosed that turns off a currently unutilized core so as to reduce power consumption, when an overall load of cores is light (see, e.g., Japanese Laid-Open Patent Publication Nos. S62-198949 and H9-212416).

A multicore processor with a local memory mounted on each central processing unit (CPU) uses a technique of turning off a local memory paired with each CPU, at the same time as a core is turned off and a technique of leaving a local memory turned on even if a core is turned off. Particularly, since power consumption of a local memory tends to increase as the capacity of a local memory increases, the technique of turning off a local memory along with turning off of a core is widely employed from the viewpoint of power efficiency.

A register and a local memory inside a core are generally made up of volatile memories and internal information is not retained unless power is supplied. Therefore, an operating system (hereinafter referred to as "OS") etc., normally saves data stored in a register and a local memory of a core before the core is turned off, to a storage device such as a shared memory not to be turned off and outside the core.

By saving data stored in a volatile memory such as a local memory to a shared memory, the data can be utilized without problem even if a cache in a CPU is flushed and data is erased. When the power is turned on again, the data saved by the OS, etc., is read from the shared memory and restored in the local memory.

An example is also recently disclosed that avoids data loss due to power-supply disconnection by applying the redundant arrays of inexpensive disks (RAID) technology widely utilized as a technique for retaining security of stored data in hard disks etc., to the saving of the local memory (see, e.g., Japanese Laid-Open Patent Publication Nos. 2005-108224 and 2009-507324).

If the RAID technology is utilized, data stored in a local memory is distributed and stored in other memories. Therefore, if the power supply of the local memory is suspended due to a power-supply suspension of a CPU, data stored in other memories can be utilized to restore the erased data.

However, since the capacity of a local memory has increased accompanying recent advancements in technologies achieving higher device densities and the time required for saving data significantly increases as compared to a register and a cache, local memories are likely to have a greater impact on the deterioration of power efficiency. For example, although the capacity of a register or a cache is several tens to hundreds of bytes or several tens of kilobytes, the capacity of a local memory often reaches several hundreds of kilobytes. Therefore, it is problematic that sufficient results are not achieved even if a low-power-consumption technique is employed when consideration is given to an amount of electrical power consumed for saving data stored in the local memory.

Although the RAID technology is proposed as a solution for the saving of data in a volatile memory as described above, sufficient results are not achieved since no consideration is given to the difference in configuration between hard disks for distributing data by RAID and local memories of a multicore processor.

The restoration of data using the RAID technology is originally based on the premise of a failure of a hard disk drive. For example, the conventional RAID technology is configured to distribute data or generate redundant data for restoration based on the assumption that one or two hard disk drives (HDDs) are suspended.

On the other hand, in the case of power-supply control in a multicore processor, power supply to multiple local memories may be suspended. Therefore, it is difficult to achieve an operation such as restoring data that is lost consequent to the power-supply control of local memories even if the conventional RAID technology is expanded.

SUMMARY

According to an aspect of an embodiment, a computer-readable recording medium stores a program that causes a computer capable of accessing a multicore processor equipped with volatile memories and a plurality of cores accessing the volatile memories, to execute a data restoration process. The data restoration process includes detecting a suspend instruction to any one of the cores in the multicore processor; and restoring, when the suspend instruction is detected, data stored in a volatile memory accessed by a core receiving the suspend instruction, the data being restored in a shared memory accessed by the cores in operation and based on parity data stored in the volatile memories accessed by the cores in operation other than the core receiving the suspend instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of a data restoration program, a data restoration apparatus, and a data restoration method according to the present invention will be described in detail with reference to the accompanying drawings.

Figure 1:
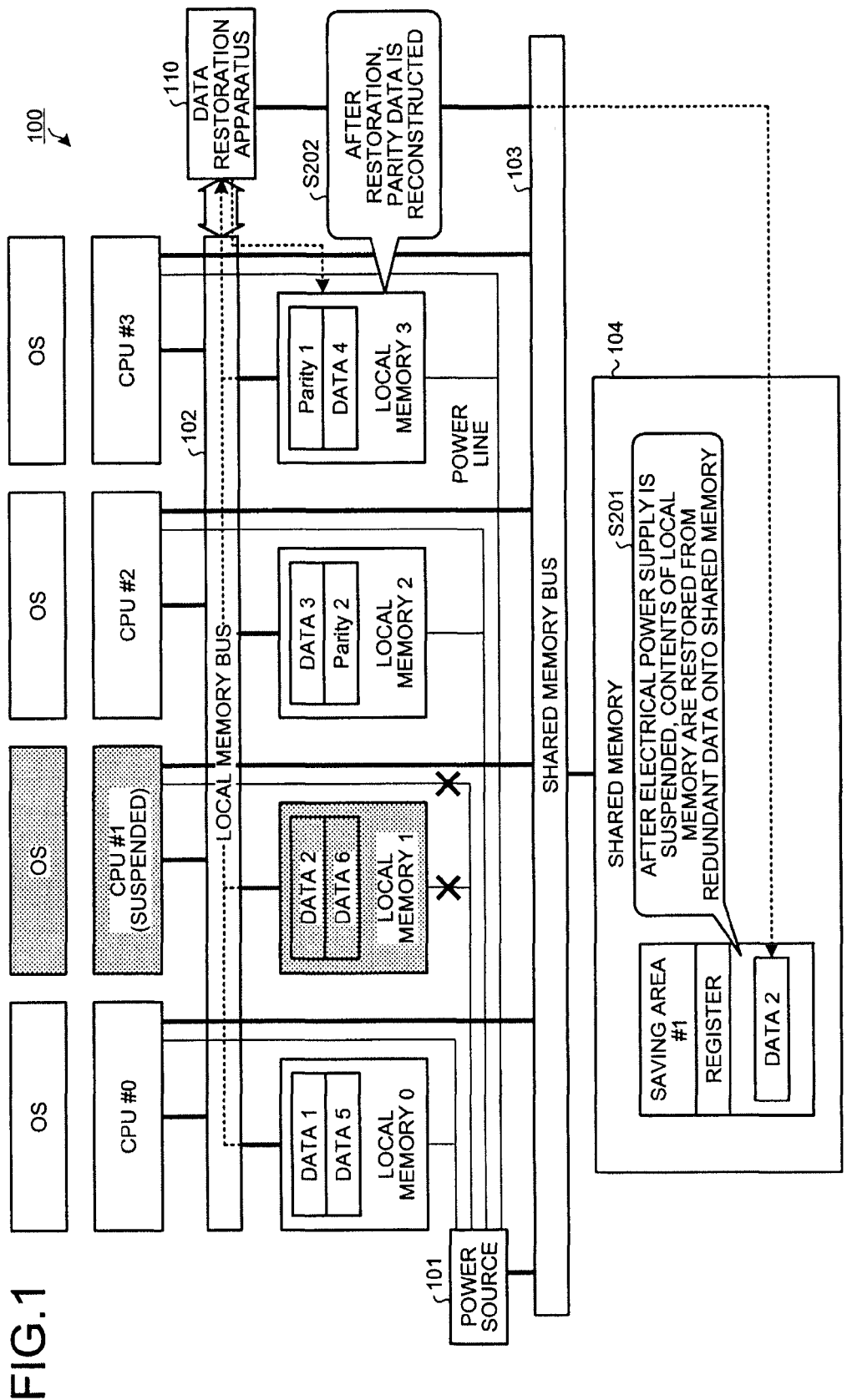
FIG. 1 is an explanatory view of an example of a data restoration process according to embodiments.

FIG. 1 is an explanatory view of an example of a data restoration process according to an embodiment. As depicted in FIG. 1, a multicore processor 100 is a core group including multiple CPUs (e.g., a CPU #0 to a CPU #3). The multicore processor 100 includes a power source 101, a local memory bus 102, and a shared memory bus 103 along with the multiple CPUs.

The power source 101 supplies electrical power to the CPUs and local memories accessed by the CPUs. The power source 101 can suspend the supply of electrical power to a specified CPU and local memory alone according to an instruction from an OS. Similarly, the power supply 101 can resume the supply of electrical power to a specified CPU and local memory alone according to an instruction from the OS. Although each CPU is controlled by an OS, while a CPU is suspended, the corresponding OS is also suspended. Therefore, each OS controls the powering-off of the CPU on which the OS runs and also controls the powering-on of other CPUs.

The local memory bus 102 is a bus enabling access between the CPUs and the local memories. Each of the CPUs can access the local memories of the other cores via the local memory bus 102.

The shared memory bus 103 is a bus enabling access between the multicore processor 100 and a shared memory 104. The shared memory 104 is a nonvolatile memory or a memory always supplied with electrical power and having no risk of data loss.

In this embodiment, when a data restoration apparatus 110 is added as depicted in FIG. 1 to the multicore processor 100 having the configuration as described above, the data in the local memories can be restored even if the electrical power supply to the local memories is suspended along with the electrical power supply to the CPUs.

Before describing a data restoration process according to this embodiment, power-supply suspension and start procedures of a conventional multicore processor will be described.

At the time of conventional power-supply suspension, the multicore processor 100 does not include the data restoration apparatus 110 and the OS of a CPU to be suspended (e.g., the OS of the CPU #0) starts a power-supply suspension process. The OS first saves data in a register and a local memory of the CPU to the shared memory 104. The OS writes the contents of a cache back into the shared memory 104. The OS subsequently notifies the OSs of the other CPUs of an electrical power suspension. The OS lastly instructs the power source 101 to suspend electrical power supply to turn off the power.

At the time of the conventional power-supply start, an OS of an operating CPU (e.g., the OS of the CPU #1) starts a power-supply recovery process for a suspended OS. The OS first instructs the power source 101 to start the power supply to the CPU to be recovered to turn on the power. The OS then restores in the register and the local memory of the recovered CPU, the data of the register and the local memory saved in the shared memory 104.

As described above, in the case of the conventional power-supply suspension, the suspension of electrical power supply to a local memory must wait until data in the local memory is saved to the shared memory 104. Similarly, in the case of the power-supply start, if the data in the local memory is saved to the shared memory 104 at the time of power-supply suspension, the CPU cannot be shifted to normal operation until all the data are restored in the local memory.

Figure 2:
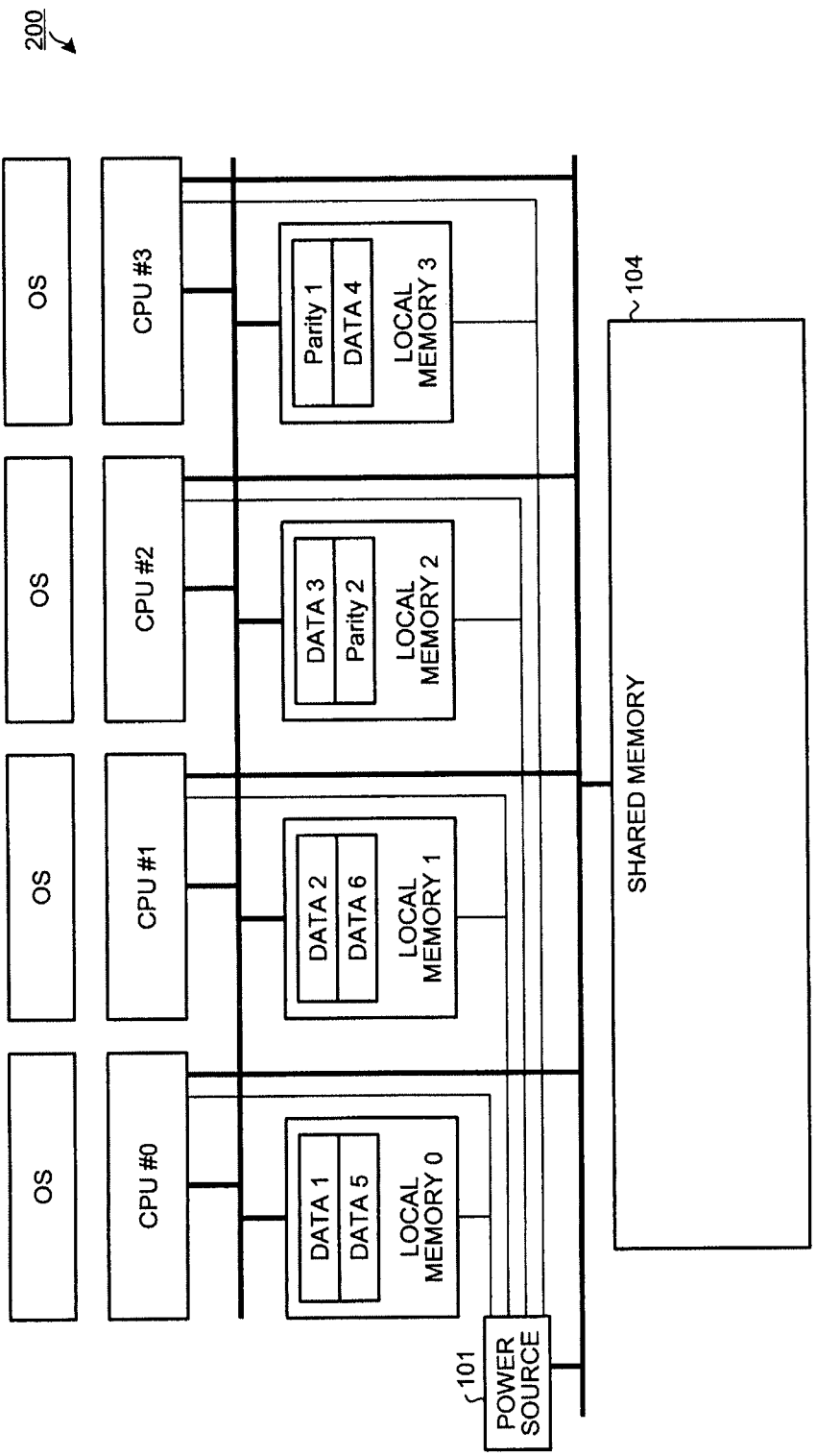
FIG. 2 is an explanatory view of an example of a configuration of a multicore processor employing RAID technology.

FIG. 2 is an explanatory view of an example of a configuration of a multicore processor employing the RAID technology. The RAID technology is employed as a countermeasure to eliminate the time consumed for saving data at the time of the conventional power-supply suspension. For example, even if data in a local memory is not saved at the time of power-supply suspension, the data stored in the local memory of the suspended CPU can be restored from data with redundancy.

In the case of a multicore processor 200 illustrated in FIG. 2, even if the CPU #1 is suspended, DATA 2 can be restored from DATA 1 stored in the local memory 0, DATA 3 stored in the local memory 2, and Parity 1 stored in the local memory 3. Similarly, DATA 6 can be restored from DATA 5, Parity 2, and DATA 4 stored in the local memories 0, 2, and 3.

Figure 3:
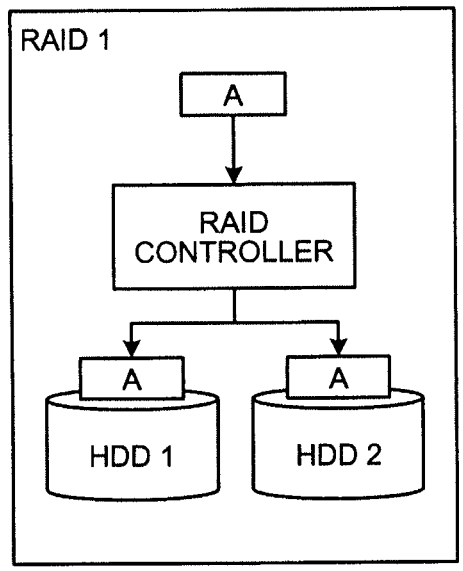
FIG. 3 is an explanatory view of operation of RAID 1.
Figure 4:
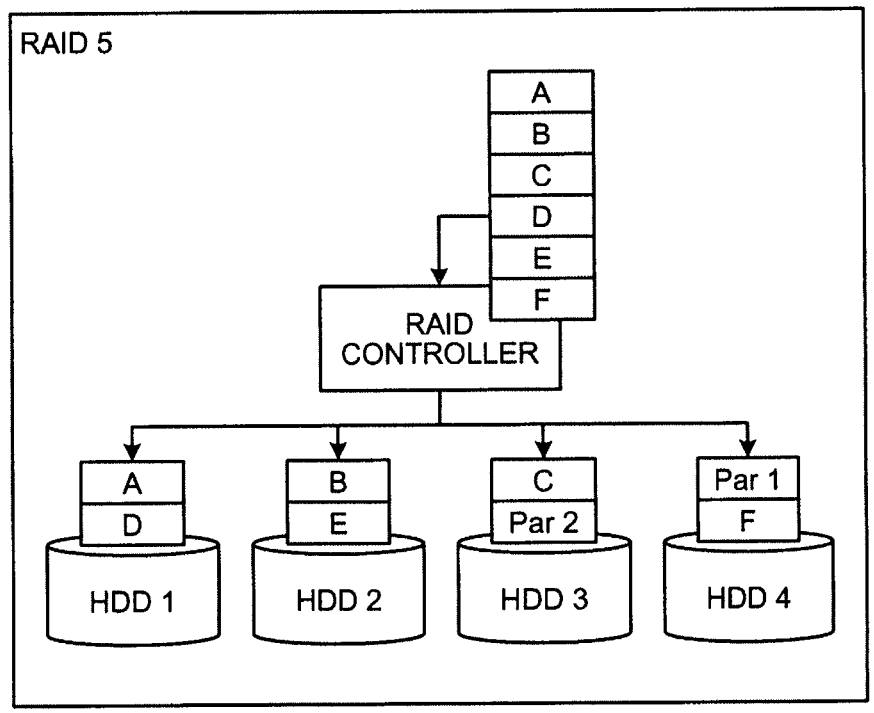
FIG. 4 is an explanatory view of operation of RAID 5.

FIG. 3 is an explanatory view of operation of RAID 1 and FIG. 4 is an explanatory view of operation of RAID 5. The RAID technology is a technology of operating multiple hard disk drives (hereinafter referred to as "HDDs") as a one virtual HDD. The RAID technology includes mirroring in which one data (e.g., data A) is stored in each of HDDs by a RAID controller as in the RAID 1 depicted in FIG. 3.

As in the case of RAID 5 depicted in FIG. 4, redundant data (parity data (e.g., Par 1 and Par 2)) is distributed and stored in addition to stored data (e.g., data A to F). Even if any one of HDDs is damaged, the parity data can be utilized to restore partially damaged data.

For example, data stored in a damaged HDD is restored by obtaining exclusive OR of data stored in the HDDs other than the damaged HDD as follows.

Par 1=AxorBxorC
A=BxorCxorPar1
B=AxorBxorPar1
C=BxorCxorPar1
Par 2=DxorExorF
D=ExorFxorPar2
E=DxorFxorPar2
F=BxorCxorPar2

In each of the techniques described above, data can be protected from an unexpected failure of an HDD by making data stored in HDDs redundant. Therefore, a technique conventionally exists that protects data stored in a volatile memory such as a local memory of a CPU by employing RAID 5 or RAID 6, which is similar to RAID 5.

However, if data stored in multiple local memories, as in the multicore processor 100, is distributed by the technique of RAID 5, a situation such as the suspension of multiple CPUs may not be able to be handled.

In the case of the RAID technology, when one HDD crashes among multiple HDDs, data stored in the crashed HDD is restored by utilizing data stored in the remaining HDDs. Therefore, if the same technique is applied to the multicore processor, when the power supply to multiple CPUs is suspended, data stored in local memories cannot be restored.

Although a large number of parity data in the RAID 5 technology can be created so as to restore data stored in local memories even if multiple CPUs are suspended, a proportion of the parity data is increased in the local memories and the area available to the CPUs is reduced.

Therefore, in this embodiment, after electrical power supply to a local memory is suspended, the contents of the suspended local memory is restored from parity data and saved to the shared memory 104 and new parity data is reconstructed according to a configuration of the operating local memories.

The reference of description returns to FIG. 1, after the electrical power supply to the CPU #1 and the local memory 1 is suspended, the data restoration apparatus 110 restores the contents of the local memory onto the shared memory 104 from redundant data (step S1). For example, DATA 2 stored in the local memory 1 is restored from DATA 1, DATA 3, and Parity 1 and is stored to a saving area #1 in the shared memory 104. Although DATA 6 stored in the local memory 1 is also subsequently restored from DATA 5, DATA 3, DATA 4, and Parity 2, this will not be described.

After the restoration at step S1, the data restoration apparatus 110 reconstructs parity data according to the number of operating CPUs (step S2). Before the CPU #1 is suspended, the local memories of the four CPUs are utilized to store the parity data that enable restoration of data stored in each of the local memories. However, the CPU #1 is suspended. Therefore, after the CPU #1 is suspended, the local memories of the three operating CPUs are utilized to generate (reconstruct) parity data that enable restoration of data stored in each of the local memories and the parity data are stored in the respective local memories.

After the reconstruction of the parity data, if a local memory of another CPU is powered off, data can be restored from the reconstructed parity data and therefore, the power-supply suspension of multiple local memories can be handled by performing the same procedure. Therefore, since it is no longer necessary to preliminarily save the contents of the local memories at the time of power-supply suspension of local memories, the power-supply suspension operation of local memories can be accelerated.

Description hereinafter will be given of a specific example of a configuration and a process procedure of the data restoration apparatus 110 for realizing the high-speed power-supply suspension as illustrated in FIG. 1.

Figure 5:
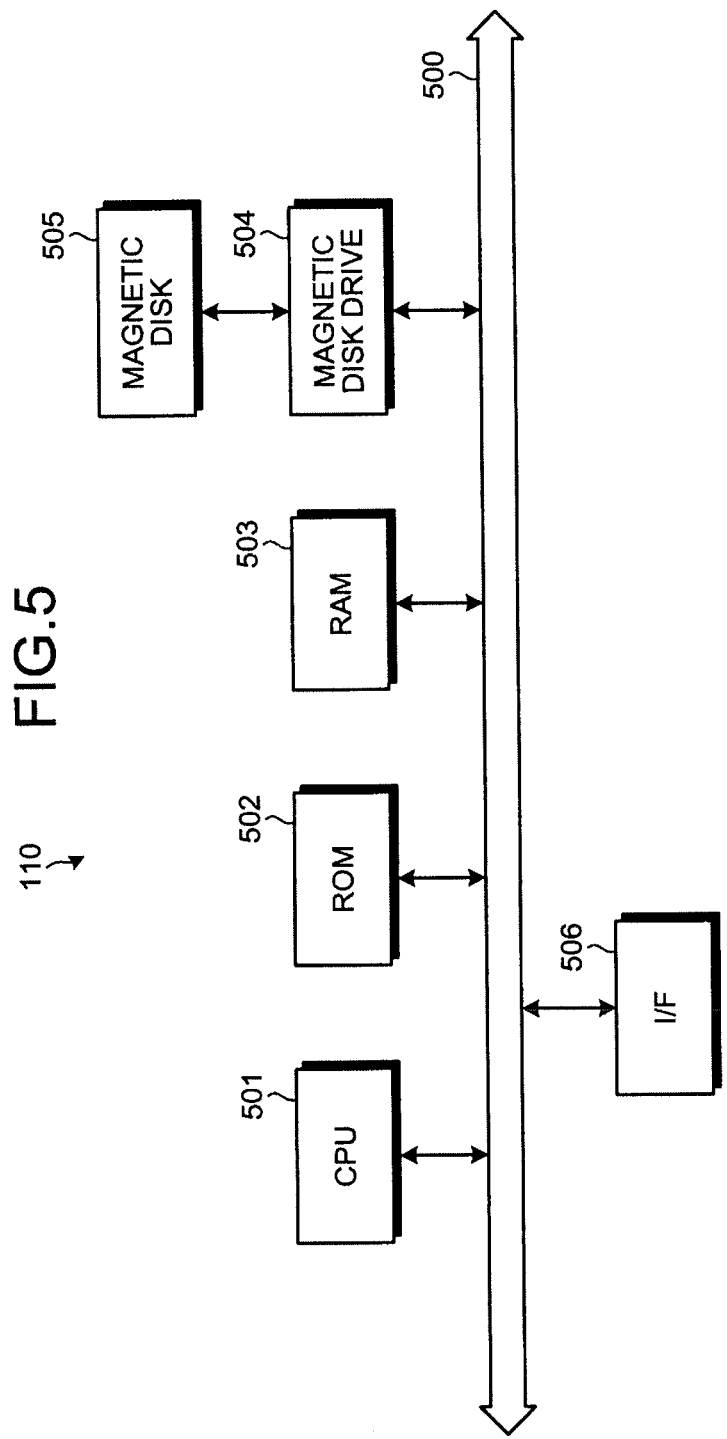
FIG. 5 is a block diagram of a hardware configuration of a data restoration apparatus according to the embodiments.

FIG. 5 is a block diagram of a hardware configuration of a data restoration apparatus 110 according to the embodiments. As depicted in FIG. 5, the data restoration apparatus 110 includes a central processing unit (CPU) 501, a read-only memory (ROM) 502, a random access memory (RAM) 503, a magnetic disk drive 504, a magnetic disk 505, and an interface (I/F) 506, respectively connected by a bus 500.

The CPU 501 governs overall control of the data restoration apparatus 110. The ROM 502 stores therein programs such as a boot program. The RAM 503 is used as a work area of the CPU 501. The magnetic disk drive 504, under the control of the CPU 501, controls the reading and writing of data with respect to the magnetic disk 505. The magnetic disk 505 stores therein data written under control of the magnetic disk drive 504. Although in FIG. 5, the magnetic disk 505 is given as an example of a storage medium, another medium such as an optical disk, semiconductor memory, etc. may be used.

The I/F 506 is connected to a network 514 such as a local area network (LAN), a wide area network (WAN), and the Internet through a communication line and is connected to other apparatuses through the network 514. The I/F 506 administers an internal interface with the network 514 and controls the input/output of data from/to external apparatuses. For example, a modem or a LAN adaptor may be employed as the I/F 506.

Figure 6:
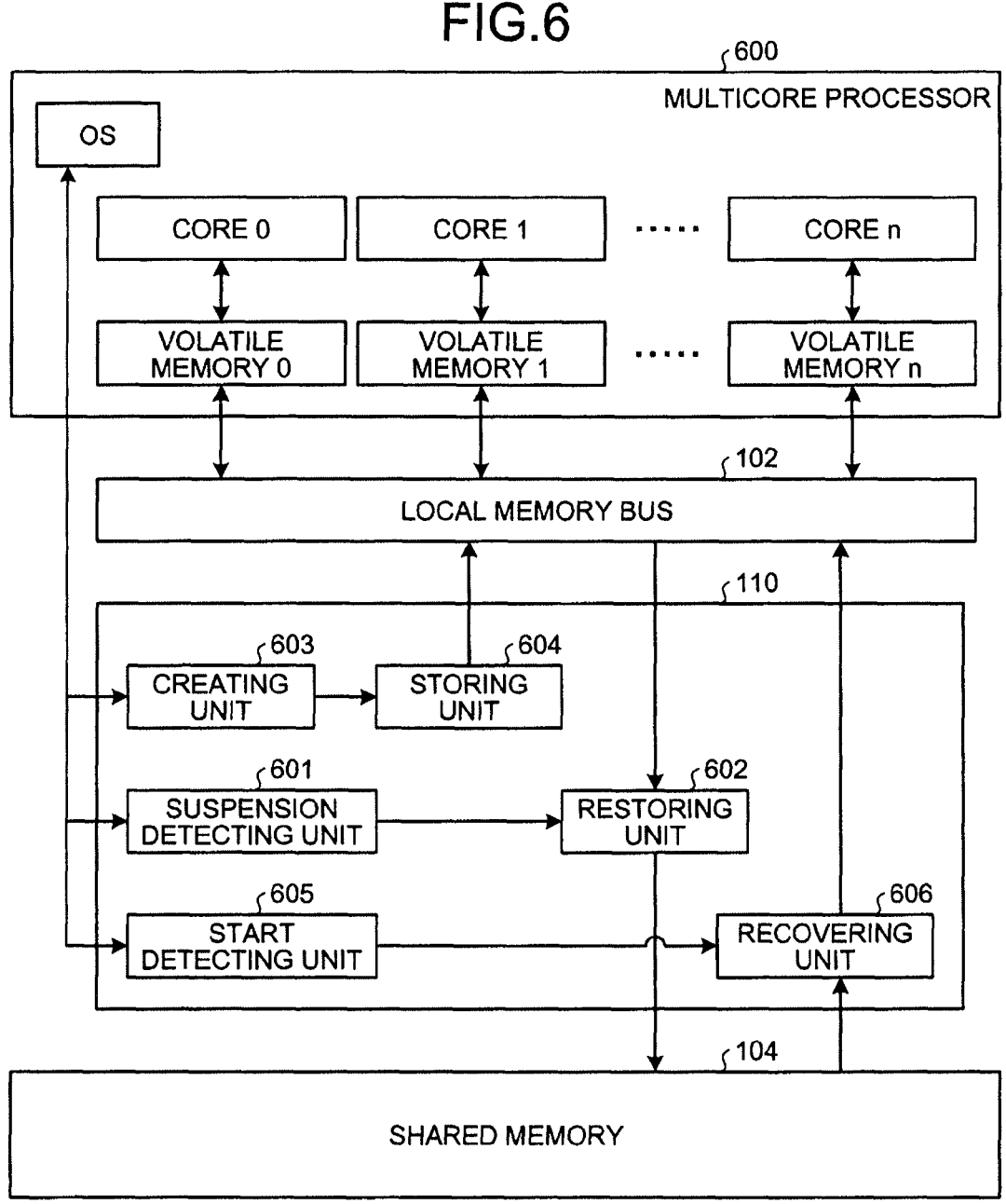
FIG. 6 is a block diagram of a functional configuration of the data restoration apparatus.

FIG. 6 is a block diagram of a functional configuration of the data restoration apparatus. The data restoration apparatus 110 includes a suspension detecting unit 601, a restoring unit 602, a creating unit 603, a storing unit 604, a start detecting unit 605, and a recovering unit 606. For example, the functions (the suspension detecting unit 601 to the recovering unit 606) acting as a control unit are implemented by the CPU 501 executing programs stored in storage devices such as the ROM 502, the RAM 503, and the magnetic disk 505 depicted in FIG. 5 or by the I/F 506.

The suspension detecting unit 601 has a function of detecting a suspend instruction from a higher program such as an OS to a core. For example, the suspension detecting unit 601 detects a suspend instruction to any one of multiple cores (core 0 to core n) in a multicore processor 600. The detection result is stored to the storage area such as the RAM 503 and the magnetic disk 505.

The restoring unit 602 has a function of restoring, in the shared memory 104, data stored in a volatile memory to which the electrical power-supply has been suspended. For example, when the suspension detecting unit 601 detects a suspend instruction, the restoring unit 602 restores the data stored in the volatile memory based on parity data stored in volatile memories accessed by operating cores other than the core that is the destination of the suspend instruction. The restoring unit 602 stores the restored data into the shared memory 104, which can be accessed by the cores in operation. The stored data is temporarily stored to a storage area such as the RAM 503 and the magnetic disk 505.

The creating unit 603 has a function of creating new parity data. For example, after the restoring unit 602 restores the data, the creating unit 603 creates parity data for restoring data stored in each of the volatile memories accessed by the operating cores. The created parity data is stored to a storage area such as the RAM 503 and the magnetic disk 505.

The storing unit 604 has a function of storing the created parity data into a volatile memory of a core in operation. For example, the storing unit 604 stores the parity data created by the creating unit 603 into the respective volatile memories accessed by the cores in operation.

The storing unit 604 stores the parity data into volatile memories other than the volatile memory storing the data restored by the parity data. For example, parity data for restoring data stored in the volatile memory 1 is stored in volatile memories of cores other than the volatile memory 1.

When data is newly added to, or updated to new data in, a volatile memory of any one of multiple cores, the creating unit 603 creates parity data restoring the new data. In other words, each time data stored in a volatile memory is updated, the creating unit 603 creates parity data for restoring the latest data.

Therefore, the storing unit 604 stores the parity data created by the creating unit 603 into volatile memories other than the volatile memory having new data added or updated with new data, among the respective volatile memories accessed by the cores in operation.

The start detecting unit 605 has a function of detecting an instruction from a higher program to a core. For example, the start detecting unit 605 detects the start of electrical power supply to a suspended core among the multiple cores. The detected result is stored to a storage area such as the RAM 503 and the magnetic disk 505.

The recovering unit 606 has a function of recovering saved data to a volatile memory of a core to which electrical power supply is started. For example, if the start detecting unit 605 detects the start of electrical power supply, the recovering unit 606 stores the restored data in the shared memory 104 into the volatile memory accessed by the core for which the start of power supply is detected.

If the start detecting unit 605 detects the start of electrical power supply while the restoring unit 602 is restoring data, the data stored in the volatile memory includes data not yet restored in the shared memory 104. The recovering unit 606 restores and recovers these data by using the parity data stored in the volatile memories accessed by the cores in operation.

If the recovering unit 606 described above restores data, the creating unit 603 creates the parity data restoring the data stored in the respective volatile memories accessed by the cores. The storing unit 604 stores the parity data created by the creating unit 603 into a volatile memory other than the volatile memory storing the data restored by the parity data. Therefore, the parity data for restoring the data stored in the volatile memory 1 is stored to the operating volatile memories other than the volatile memory 1.

In addition to the detection functions of the suspension detecting unit 601 and the start detecting unit 605 described above, the data restoration apparatus 110 may have a read detection function for detecting a read request that is from a core and for data stored in a volatile memory.

For example, if a non-operating volatile memory stores the data for which a read request is detected by the read detection function, the data restoration apparatus 110 notifies the core executing the reading of data that the data is stored in the shared memory 104. The notified core can read the data stored in the shared memory 104 actually storing the desired data based on the notification, rather than the volatile memory that does not store the desired data.

A read request may be generated for data stored in a suspended volatile memory before the restoration in the shared memory 104. In this case, the data restoration apparatus 110 utilizes the function of the restoring unit 602 to restore the data stored in the suspended volatile memory based on the parity data. The data restoration apparatus 110 can notify the core executing the reading of data of the storage location of the restored data to allow the core to read the desired data.

The data restoration apparatus 110 may selectively apply either the data restoration process according to this embodiment or the conventional data saving process, according to the number of operating cores. If the number of the operating cores is extremely reduced, the parity data accounts for an increased proportion of the capacity of the operating volatile memories. Therefore, the capacity of the volatile memories available for the primary processes of the cores is reduced and causes functional deterioration in the cores, resulting in deterioration in power efficiency.

Therefore, a predetermined value of the number of CPUs can be defined as a threshold value according to the total number of the cores or the capacity of the volatile memories of the multicore processor 600 to which the data restoration apparatus 110 is applied, such that it is automatically determined based on the threshold value, whether the data restoration process of this embodiment or the conventional data saving process is utilized. The determination utilizing the threshold value enables the data restoration apparatus 110 to support operation such that the highest power efficiency is achieved according to the operating state of the cores in the multicore processor 600.

For example, the OS executed by the multicore processor 600 is driven to execute a process of determining whether the number of the operating cores is greater than or equal to the threshold value. When a core receives a suspend instruction to a core of the multicore processor 600, if it is determined that the number of the operating cores is greater than or equal to the threshold value, the OS outputs to the power source 101 a suspend instruction for the electrical power supply with respect to the core for which the suspend instruction is received and a volatile memory accessed by the core, to immediately suspend the power supply.

Therefore, since the data restoration apparatus 110 is caused to execute the data restoration process of this embodiment, the stored data is restored to the shared memory 104 even if the electrical power supply to the volatile memory is suspended.

In contrast, if it is determined that the number of the operating cores is not greater than or equal to the threshold value, an amount of parity data is increased. Therefore, the OS waits until the data in the volatile memory is saved to the shared memory 104 before the suspension of electrical power supply, as is the case with the conventional technique.

For example, if it is determined that the number of the operating cores in the multicore processor 600 is not greater than or equal to the threshold value, the OS transfers to the shared memory 104, the data stored in the volatile memory of the core for which the suspend instruction is received. After the data stored in the volatile memory is transferred to the shared memory 104 as a result of the transfer described above, the OS outputs to the power source 101, the suspend instruction for electrical power supply to the volatile memory.

Figure 7:
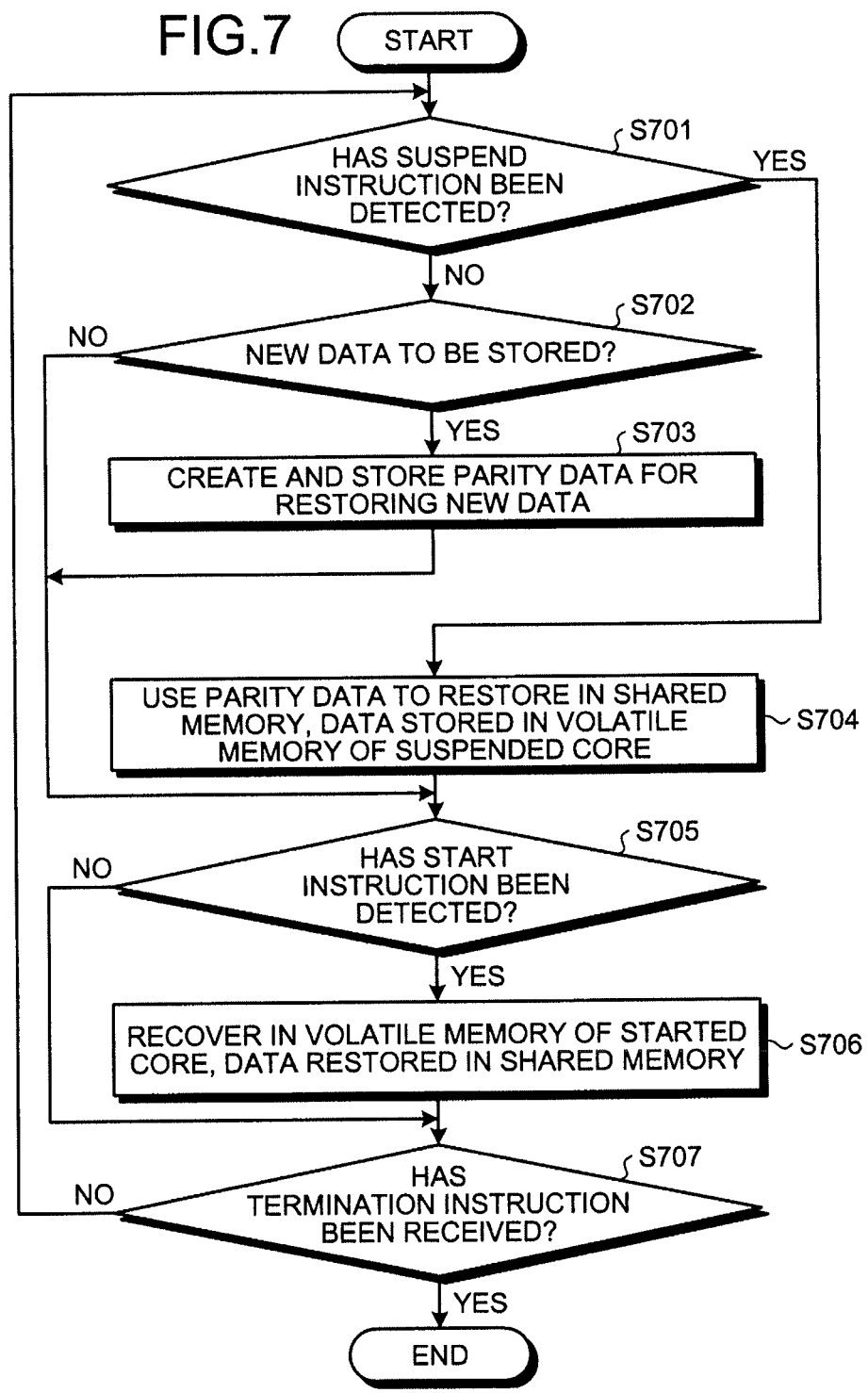
FIG. 7 is a flowchart of a procedure of a data restoration process by the data restoration apparatus.

FIG. 7 is a flowchart of a procedure of the data restoration process by the data restoration apparatus. The flowchart in FIG. 7 represents a procedure of the data restoration apparatus 110 automatically restoring and storing data stored in a volatile memory into the shared memory 104 when a suspend instruction to a core is received. The execution of the processes of FIG. 7 enables the multicore processor 600 including the data restoration apparatus 110 to immediately turn off the power without waiting for a saving process for the contents stored in the volatile memory of the core receiving the suspend instruction.

In FIG. 7, the data restoration apparatus 110 first determines whether a suspend instruction has been detected by the suspension detecting unit 601 (step S701). At step S701, if it is determined that a suspend instruction has been detected (step S701: YES), the data restoration apparatus 110 goes to the process at step S704 to execute a restoration process for data stored in a volatile memory to be suspended.

At step S701, if it is determined that a suspend instruction has not been detected (step S701: NO), the data restoration apparatus 110 determines whether an OS stores new data into a currently operating volatile memory (step S702). Whether new data is stored is determined at step S702 according to whether a write instruction from a higher program (an operating system (OS) in this case) operating the multicore processor 600 has been received.

At step S702, if it is determined that new data is to be stored (step S702: YES), the data restoration apparatus 110 uses the creating unit 603 to create parity data for restoring the new data stored in the volatile memory and uses the storing unit 604 to store the parity data into a volatile memory of an operating core (step S703).

On the other hand, if it is determined that a suspend instruction is detected at step S701, the data restoration apparatus 110 uses the restoring unit 602 to restore in the shared memory 104, the data stored in the volatile memory of the suspended core by using the parity data (step S704).

After the processes at steps S703 and S704 are completed or if it is determined that new data is not stored at step S702 (step S702: NO), the data restoration apparatus 110 determines whether a start instruction has been detected by the start detecting unit 605 (step S705).

If a start instruction has been detected at step S705 (step S705: YES), the data restoration apparatus 110 uses the recovering unit 606 to recover in a volatile memory of a started core, the data restored in the shared memory 104 at step S704 (step S706). On the other hand, if a start instruction has not been detected at step S705 (step S705: NO), the data restoration apparatus 110 goes to the process at step S707 without executing the process at step S706.

The data restoration apparatus 110 subsequently determines whether a termination instruction has been received from a higher program such as the OS (step S707). If no termination instruction has been received (step S707: NO), the data restoration apparatus 110 repeats the process at steps S701 to S706. If a termination instruction has been received at step S707 (step S707: YES), the data restoration apparatus 110 directly terminates the series of the processes.

As described, the preparation of the data restoration apparatus 110 enables the restoration of data stored in a volatile memory even if the electrical power supply is suspended to a core and a volatile memory thereof in the multicore processor 600. Therefore, a CPU can quickly be suspended to significantly reduce power consumption without having to take into consideration the saving of data in a volatile memory. The data restoration apparatus 110 can drive the multicore processor 600 to automatically select a data saving technique at the time of power-supply suspension according to the number of the operating cores.

Examples 1 to 3 implementing the function of the data restoration apparatus 110 by a RAID controller will be described in detail as application examples of the data restoration apparatus 110 implementing the data restoration process as described above.

Example 1

Figure 8:
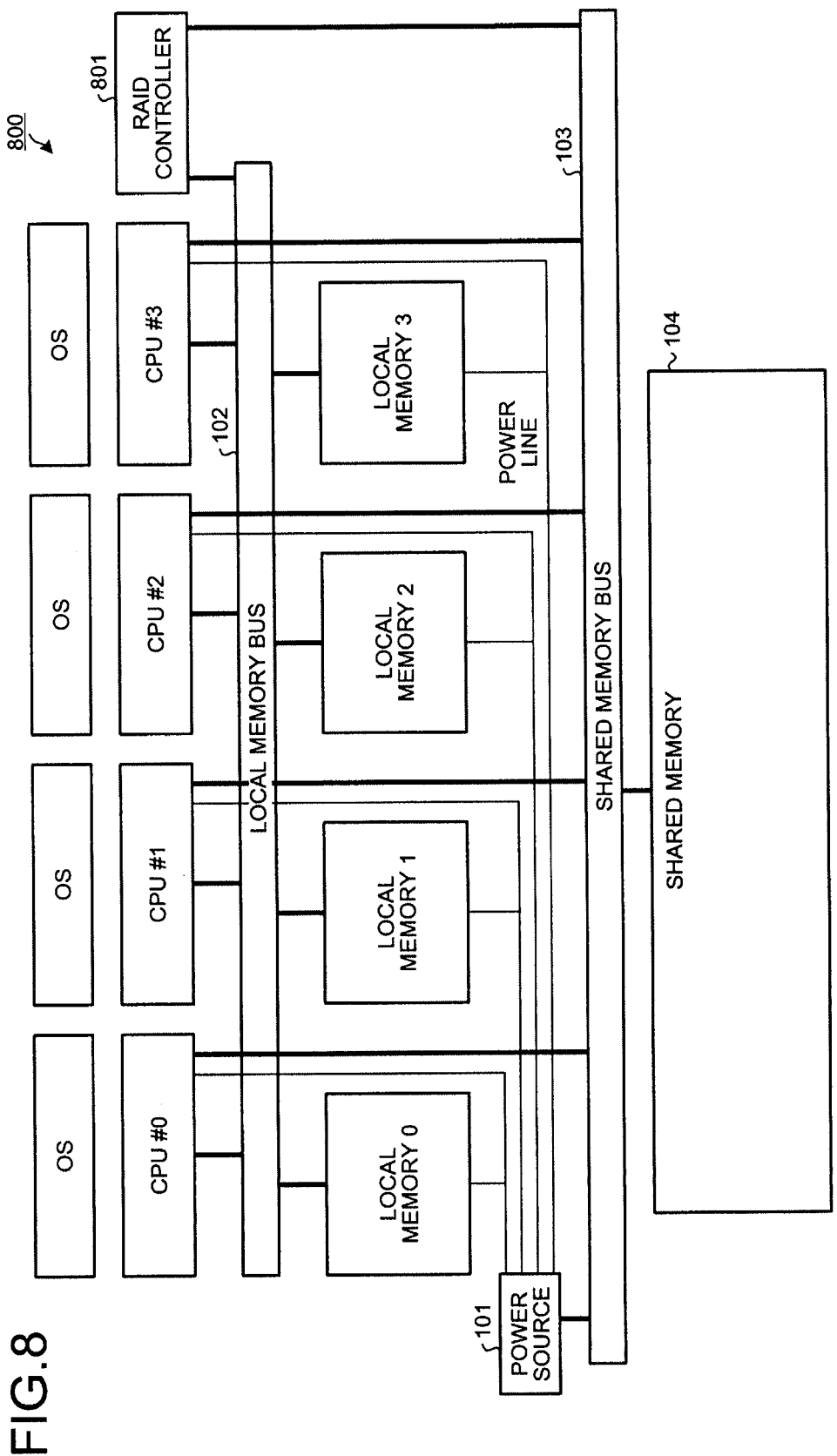
FIG. 8 is a block diagram of an example of configuration of a multicore processor including a RAID controller.

FIG. 8 is a block diagram of an example of configuration of a multicore processor including a RAID controller. In Example 1, a RAID controller 801 implements the function of the data restoration apparatus 110. The RAID controller 801 of a multicore processor 800 is connected to CPUs and local memories through the local memory bus 102. The CPUs can access other CPUs and local memories via the local memory bus 102.

Figure 9:
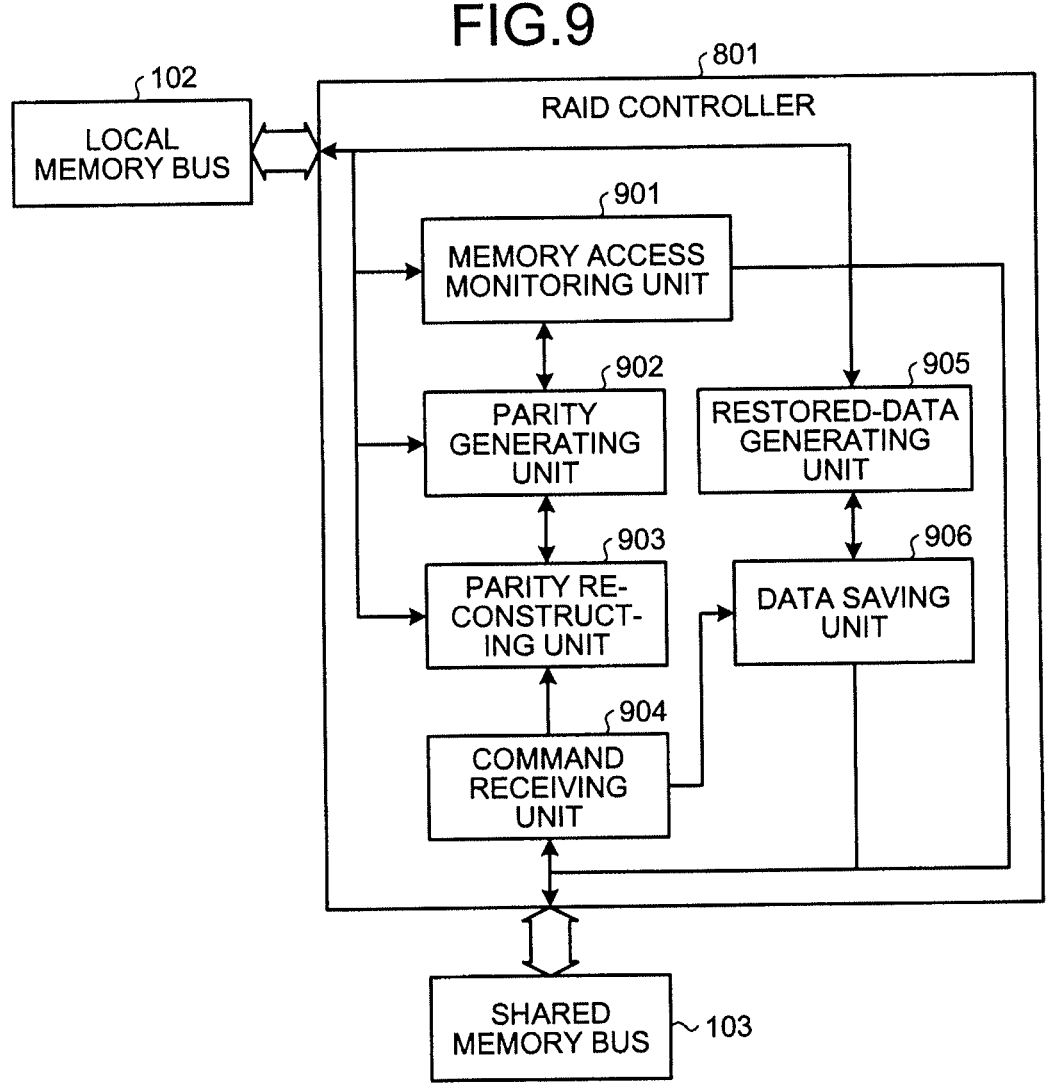
FIG. 9 is a block diagram of an example of an internal configuration of the RAID controller in Example 1.

FIG. 9 is a block diagram of an example of an internal configuration of the RAID controller in Example 1. The RAID controller 801 includes a memory access monitoring unit 901, a parity generating unit 902, a parity reconstructing unit 903, a command receiving unit 904, a restored-data generating unit 905, and a data saving unit 906.

The memory access monitoring unit 901 monitors access of a local memory by a CPU. The parity generating unit 902 generates parity data for restoring data stored in a local memory.

The parity reconstructing unit 903 updates the corresponding parity data if writing is performed with respect to a local memory. The command receiving unit 904 receives a command output from an OS to execute a process corresponding to the details of the command. The restored-data generating unit 905 utilizes the parity data to restore in the shared memory 104, the data stored in the suspended local memory. The data saving unit 906 temporarily saves data stored in a local memory at the time of power-supply suspension. Detailed process procedures of the functional units will be described hereinafter.

A data area of a local memory is divided into an area utilized as a normal data area, and a parity data area. If N local memories are currently in operation and a value of an address x is rewritten in an m-th local memory among the currently operating local memories, the parity data is generated by reading data from a location of a combination of x and m causing the same integer portion of $(N \times x+m)/(N-1)$ (Eq. 1).

If the integer portion of $(N \times x+m)/(N-1)$ 2 (Eq. 2) is y and a remainder is k, the parity data is written at a y-th address of a N−1−k-th local memory. Although several techniques of generating parity data are known, the parity data is generated by exclusive OR in Examples 1 to 3 described herein as is the case with the RAID 5 technology.

For example, the parity generating unit 902 reconstructs the parity data at a y-th address of a k-th local memory when the number of currently operating local memories is N from Eq. 1 and Eq. 2 described above. The parity generating unit 902 uses exclusive OR to generate the parity data by reading data from the local memory/address of a combination of m and x satisfying $N \times x+m=(N \times x+m)/(N-1)$ from back calculation of Eq. 1 and Eq. 2.

<Operation During Normal Operation>

Figure 10:
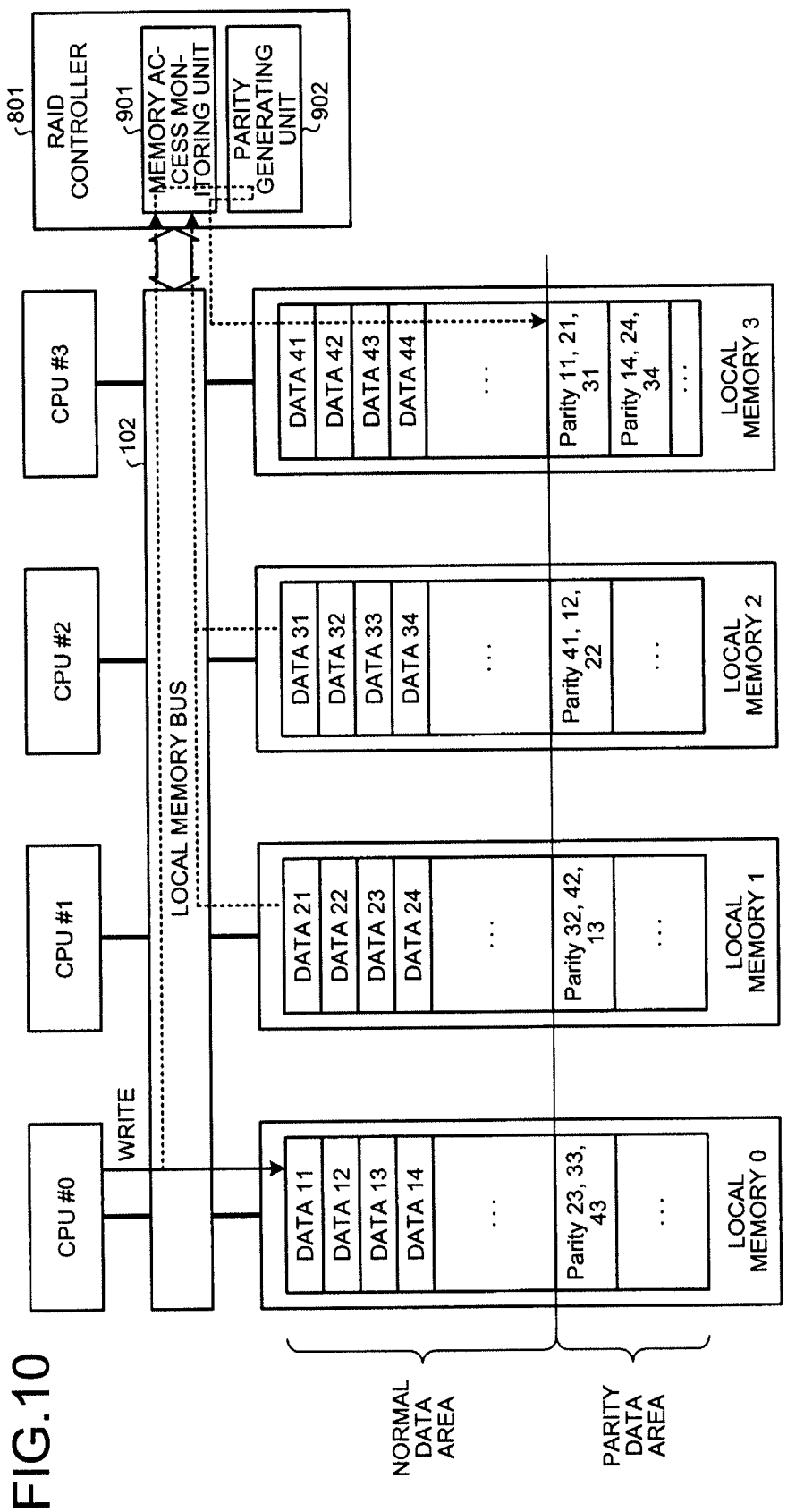
FIG. 10 is an explanatory view of an operation example during normal operation.

FIG. 10 is an explanatory view of an operation example during normal operation. The operation of the RAID controller 801 during normal operation will first be described. As depicted in FIG. 10, during normal operation, when a local memory is accessed by an operating CPU, the RAID controller 801 generates parity data according to details of the access.

For example, if the CPU #0 executes a write process to the local memory 0 as depicted in FIG. 10, the contents of data of the local memory 0 are updated by the write process. In this case, the memory access monitoring unit 901 detects the access by the CPU #0. Since the detected access is the write process, the parity generating unit 902 generates parity data (Parity 11, 21, and 31) for restoring the data after the write process. The parity generating unit 902 stores the generated parity data into the parity data area of the CPU #3.

Figure 11:
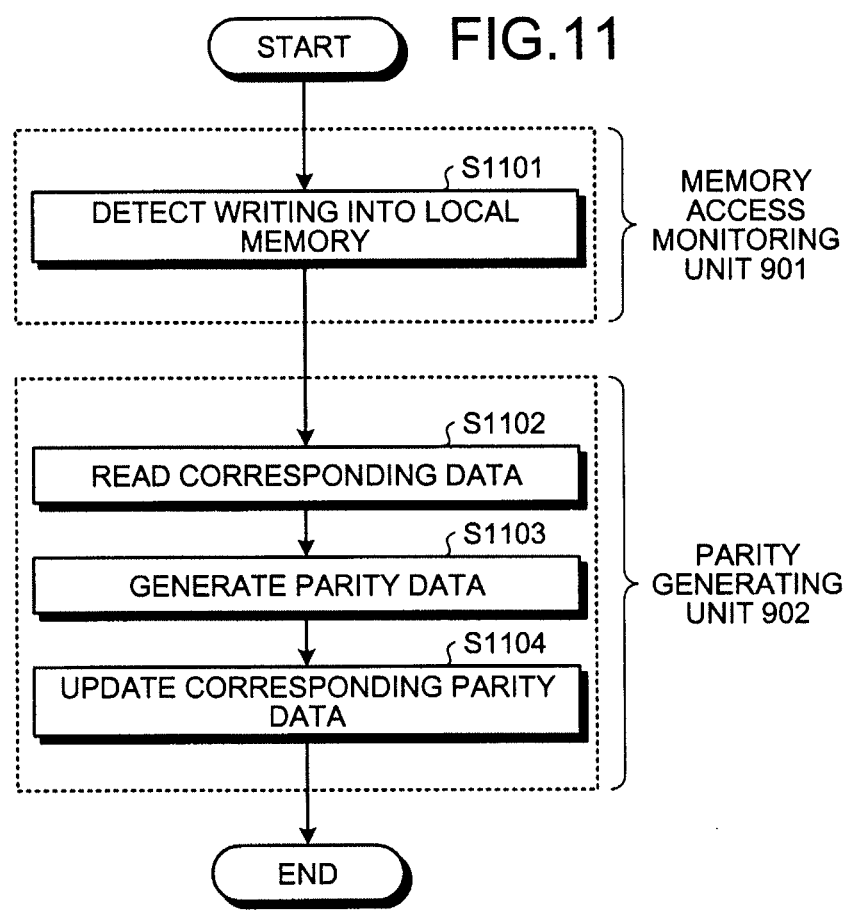
FIG. 11 is a flowchart of an operation procedure of the RAID controller during normal operation.

FIG. 11 is a flowchart of an operation procedure of the RAID controller during normal operation. Normal time indicates that a multicore processor operates only with operating CPUs and means that no operation such as a suspension of a CPU or a recovery of a suspended CPU occurs.

In FIG. 11, the RAID controller 801 detects writing into a local memory at the memory access monitoring unit 901 (step S1101). The RAID controller 801 then reads corresponding data (step S1102) and generates parity data (step S1103) in the parity generating unit 902. The RAID controller 801 updates the corresponding parity data (step S1104) and terminates the series of processes.

As described, each time writing into a local memory is detected during normal operation, the RAID controller 801 generates the parity data for restoring the written data and updates the generated parity data as the latest parity data. Therefore, the latest data can be restored regardless of the timing of occurrence of power-supply suspension.

<Operation at the Time of Power-Supply Suspension>

Figure 12:
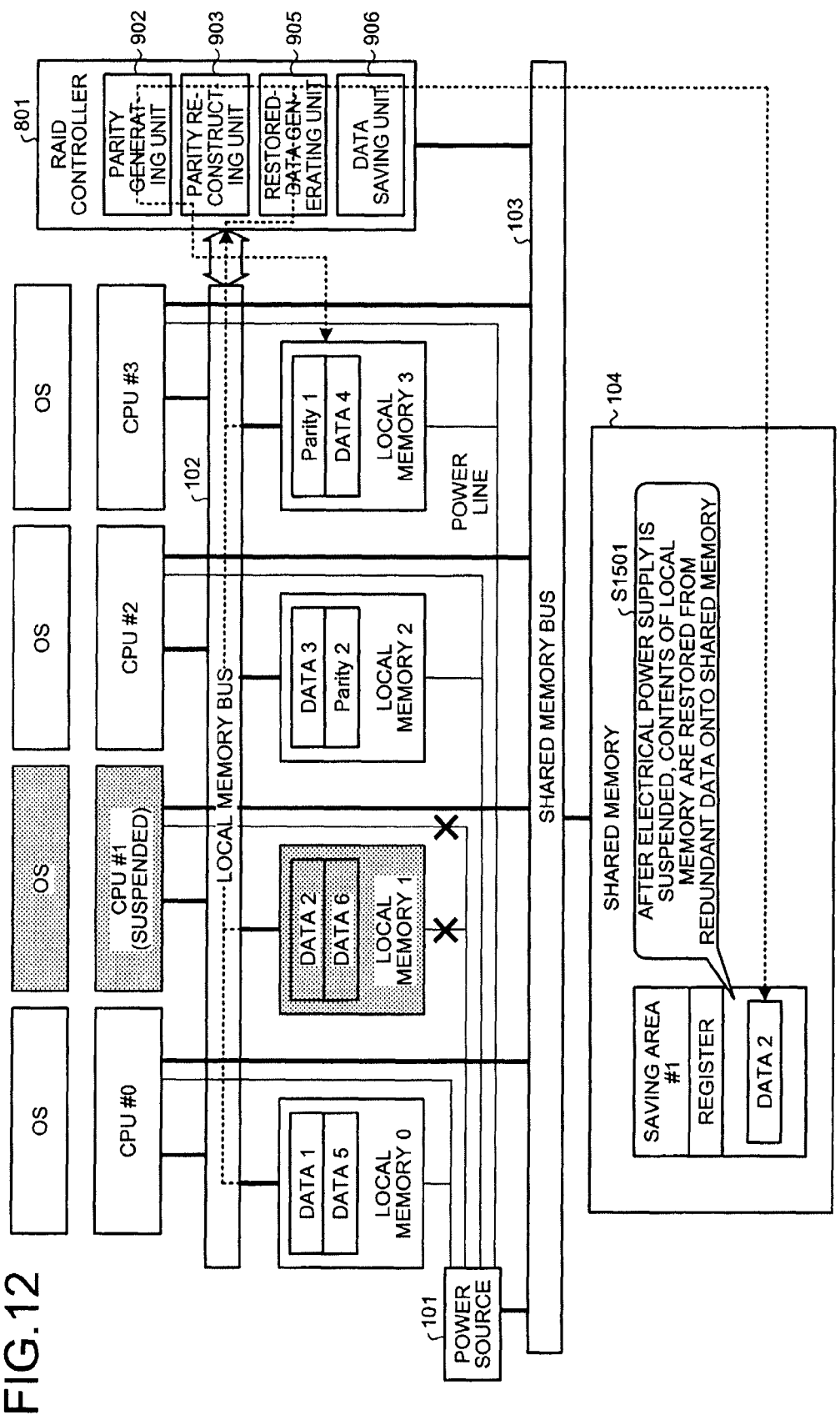
FIG. 12 is an explanatory view of an operation example at the time of power-supply suspension.

FIG. 12 is an explanatory view of an operation example at the time of power-supply suspension. As illustrated in FIG. 12, if the power supply to any one of the CPUs is suspended among operating CPUs, the electrical power supply to the local memory of the suspended PC is also immediately suspended without saving the stored data and the local memory enters the power-supply suspension state. After the electrical power supply is suspended, the RAID controller 801 restores on the shared memory 104, the contents of data stored in the power-supply suspended local memory from redundant data stored in the operating local memories (step S1201).

Figure 13:
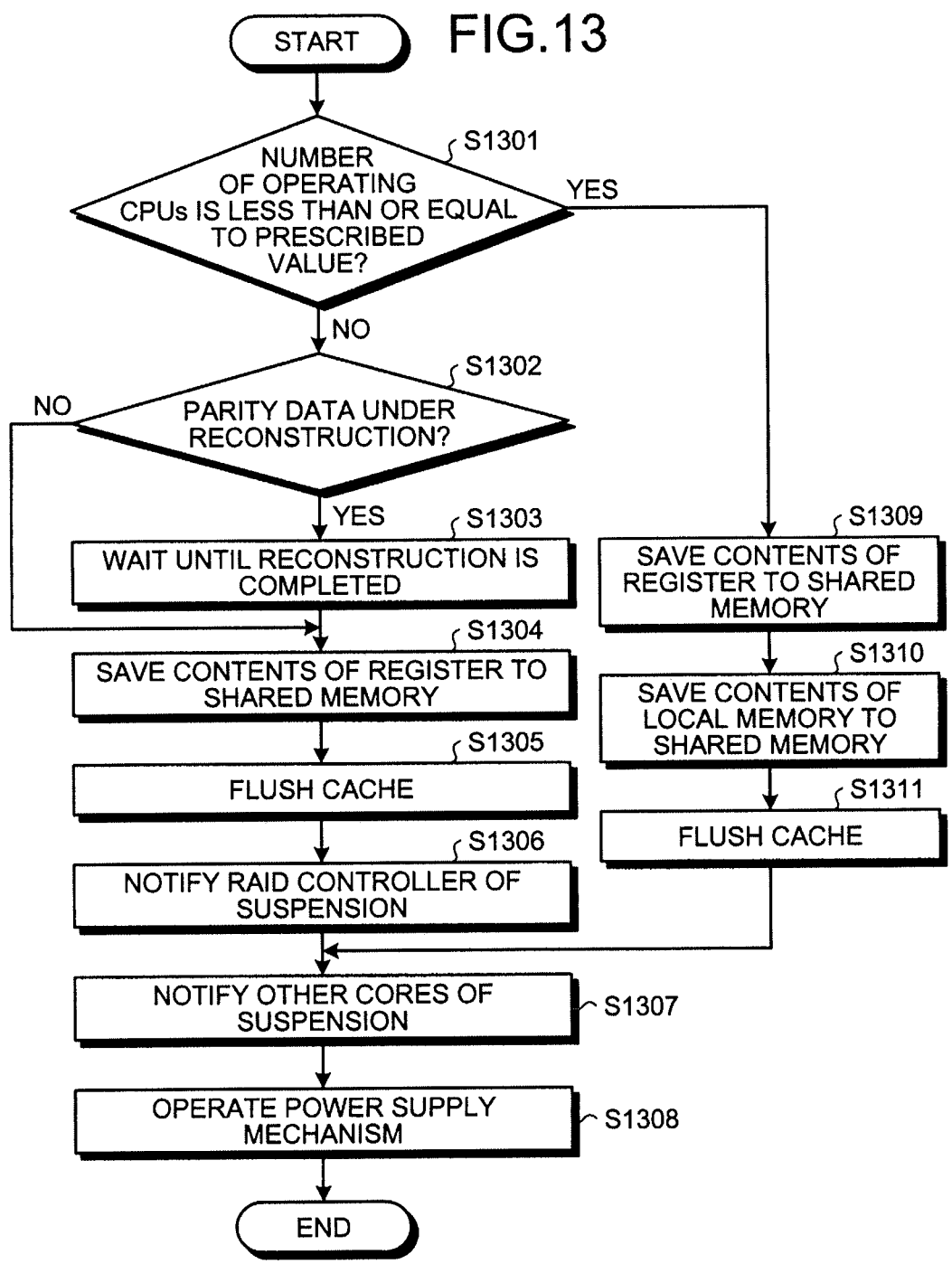
FIG. 13 is a flowchart of an operation procedure of an OS at the time of power-supply suspension in Example 1.

FIG. 13 is a flowchart of an operation procedure of the OS at the time of power-supply suspension in Example 1. The flowchart in FIG. 13 represents details of instructions output from the OS to the RAID controller 801 at the time of power-supply suspension and the procedure thereof.

In FIG. 13, the OS first determines if the number of operating CPUs is less than or equal to a prescribed value (step S1301). At step S1301, if it is determined that the number of operating CPUs is not less than or equal to the prescribed value (step S1301: NO), the OS determines whether parity data is under reconstruction (step S1302).

If it is determined that the parity is under reconstruction at step S1302 (step S1302: YES), the OS waits until the reconstruction is completed (step S1303) and saves the contents of the register to the shared memory 104 (step S1304). If it is determined that the parity is not under reconstruction at step S1302 (step S1302: NO), the OS goes to the process at step S1304 without waiting at step S1303.

The OS flushes the cache (step S1305) and notifies the RAID controller 801 of the suspension of the given CPU (step S1306). The OS notifies the other cores of the suspension of the given CPU (step S1307), operates a power supply mechanism (step S1308) to completely suspend the electrical power supply to the given CPU, and terminates the series of the processes.

On the other hand, if it is determined that the number of CPUs is less than or equal to the prescribed value at step S1301 (step S1301: YES), the OS saves the contents of the register to the shared memory 104 (step S1309) and saves the contents of the local memory to the shared memory 104 (step S1310). The OS flushes the cache (step S1311) and goes to the process at step S1307.

Figure 14:
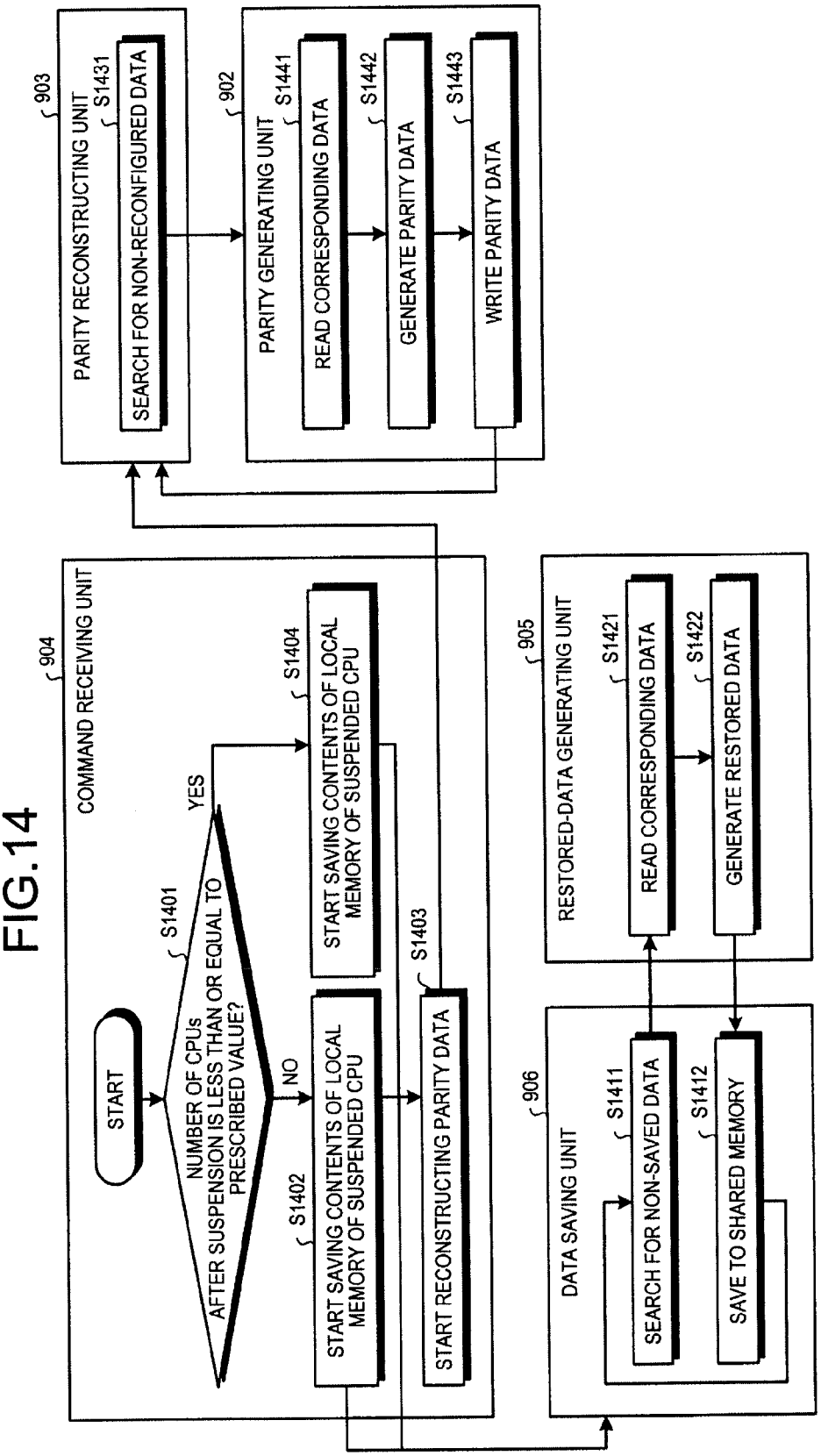
FIG. 14 is a flowchart of an operation procedure by the RAID controller at the time of power-supply suspension.

FIG. 14 is a flowchart of an operation procedure by the RAID controller at the time of power-supply suspension. The flowchart of FIG. 14 depicts processes executed by the functional units in the RAID controller 801 at the time of power-supply suspension.

In FIG. 14, the RAID controller 801 is triggered by reception of a power suspend command at the command receiving unit 904 and starts operation. First, the command receiving unit 904 determines if the number of CPUs after the suspension is less than or equal to the prescribed value (step S1401). If the number of CPUs is not less than or equal to the prescribed value at step S1410 (step S1401: NO), the command receiving unit 904 starts saving the contents of the local memory of the suspended CPU (step S1402) and starts reconstructing the parity data (step S1403).

When the saving of the contents of the local memory is started at step S1402, the data saving unit 906 searches for non-saved data (step S1411). The restored-data generating unit 905 utilizes the search result at step S1411 to read corresponding data (step S1421) and generates restored data (step S1422). Once the restored-data generating unit 905 generates the restored data, the data saving unit 906 saves the restored data to the shared memory 104 (step S1412). The saving process of the data saving unit 906 is repeatedly executed until non-saved data no longer remain.

On the other hand, if it is determined that the number of CPUs is less than or equal to the prescribed value (step S1401: YES), the saving of the contents of the local memory of the suspended CPU is started as in step S1402 (step S1404). At step S1404, unlike step S1402, the conventional saving process is executed. Therefore, the electrical power supply to the local memory is continued until the saving process at step S1404 is completed.

On the other hand, if the saving process at step S1402 is started, the parity reconstructing unit 903 searches for non-reconfigured data after the process at step S1403 (step S1431). Subsequently, the parity generating unit 902 reads the corresponding data (step S1441) and generates parity data (step S1442). The parity generating unit 902 then writes the generated parity data into the local memories (step S1443). The generation of parity data described above is repeatedly performed until non-reconfigured data no longer remain.

Figure 15:
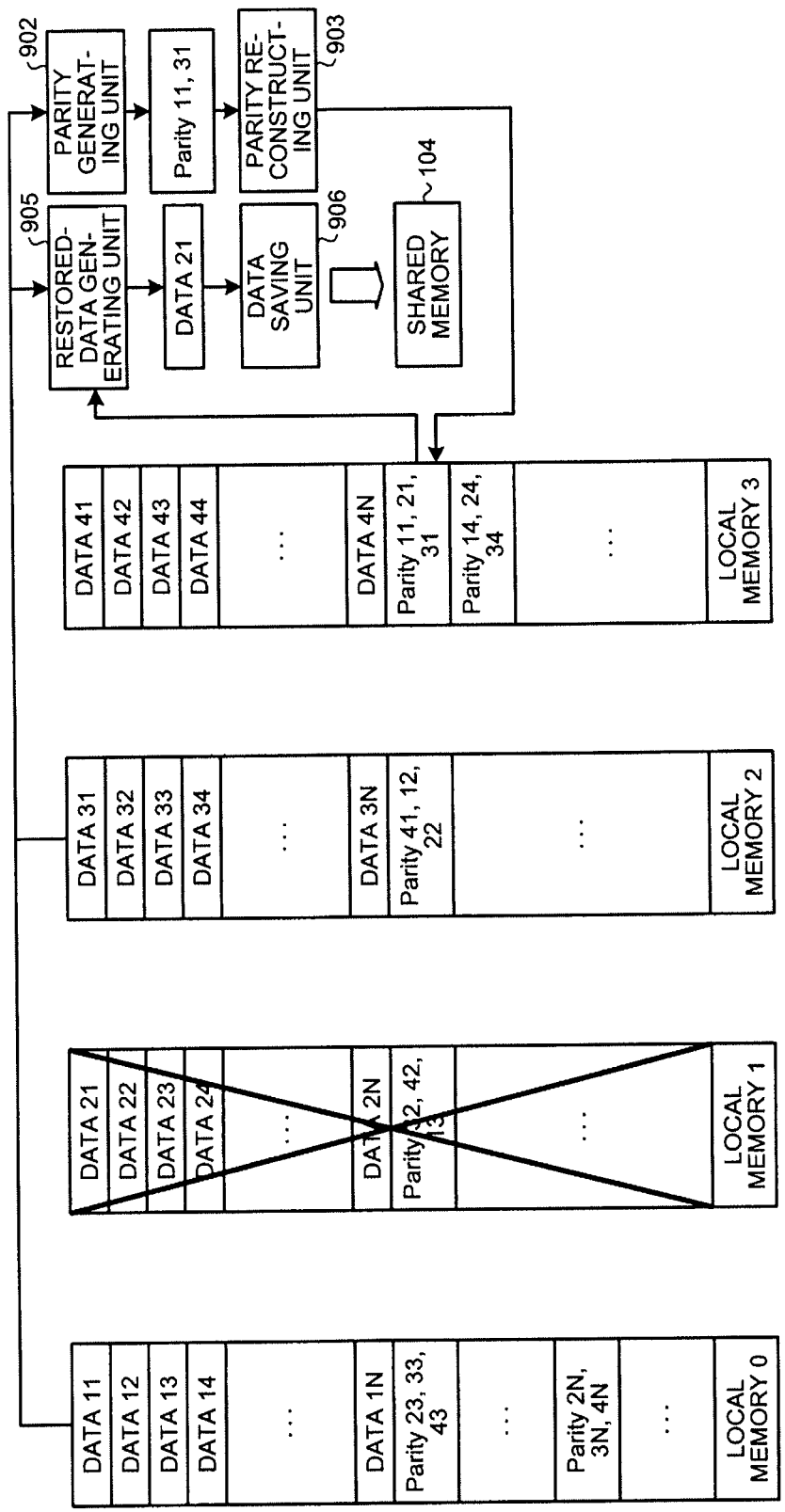
FIG. 15 is an explanatory view of the procedure of suspension operation of CPU #1 (part 1)

FIGS. 15 to 18 are explanatory views of the procedure of the suspension operation of the CPU #1. FIG. 15 depicts a state in which the local memory 1 is suspended. Due to the suspension of the local memory 1, the data stored in the local memory 1 has to be restored. The parity data has to be reconstructed at the same time so as to enable restoration of stored data even if an operating local memory is suspended.

The restored-data generating unit 905 restores DATA 21 from DATA 11 and 31, and Parity 11, 21, and 31. The restored data is stored into the shared memory 104 by the data saving unit 906. The parity generating unit 902 generates parity data (Parity 11 and 31) restoring the data stored in the operating local memories. The generated parity data is stored into the local memory 3 by the parity reconstructing unit 903.

Figure 16:
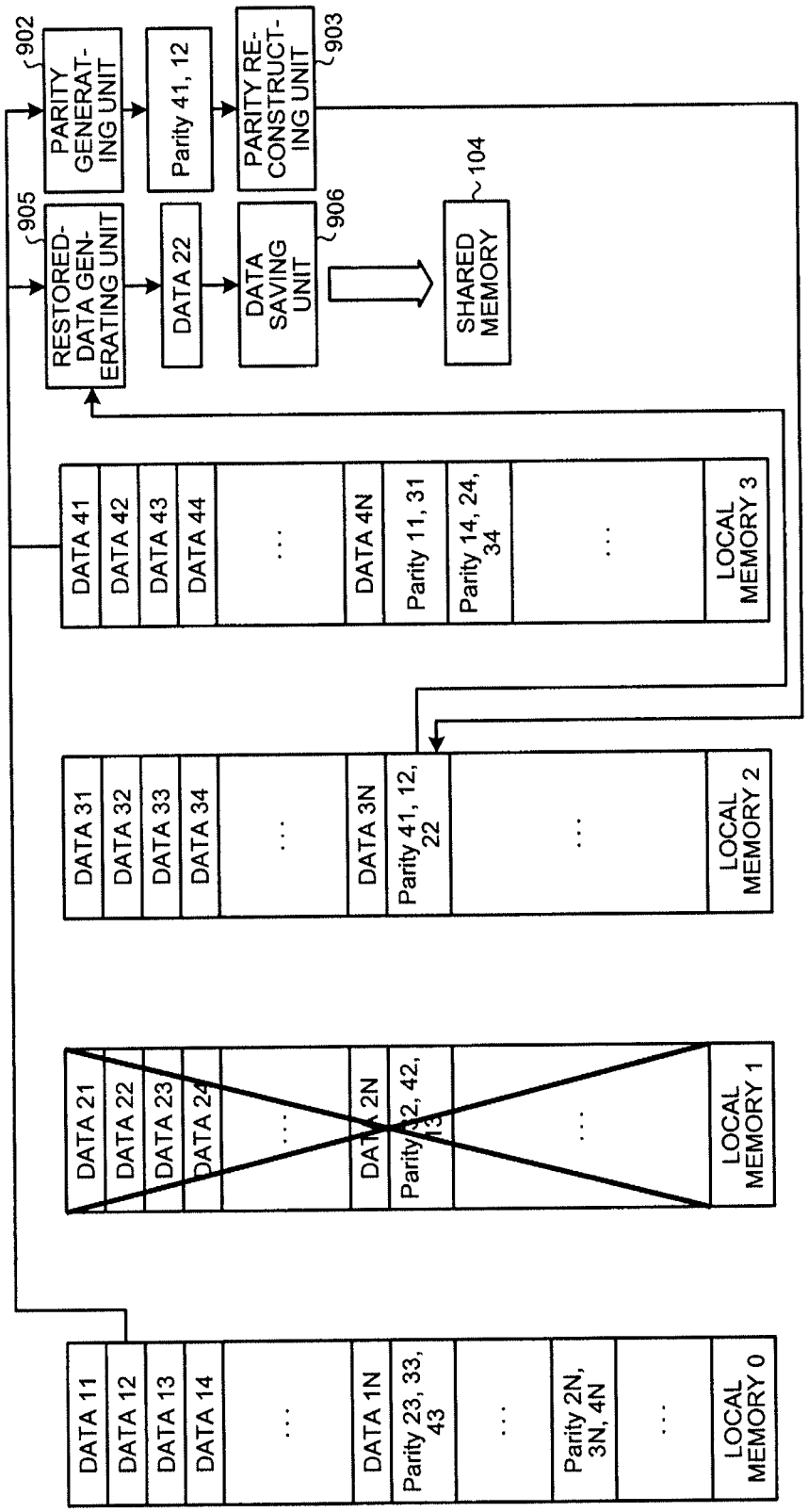
FIG. 16 is an explanatory view of the procedure of the suspension operation of CPU #1 (part 2)

As depicted in FIG. 16, the restored-data generating unit 905 continuously restores DATA 22 from DATA 12 and 41, and Parity 41, 12, and 22. The restored data is stored into the shared memory 104 by the data saving unit 906. The parity generating unit 902 generates parity data (Parity 41 and 12) restoring the data stored in the operating local memories. The generated parity data is stored into the local memory 2 by the parity reconstructing unit 903.

Figure 17:
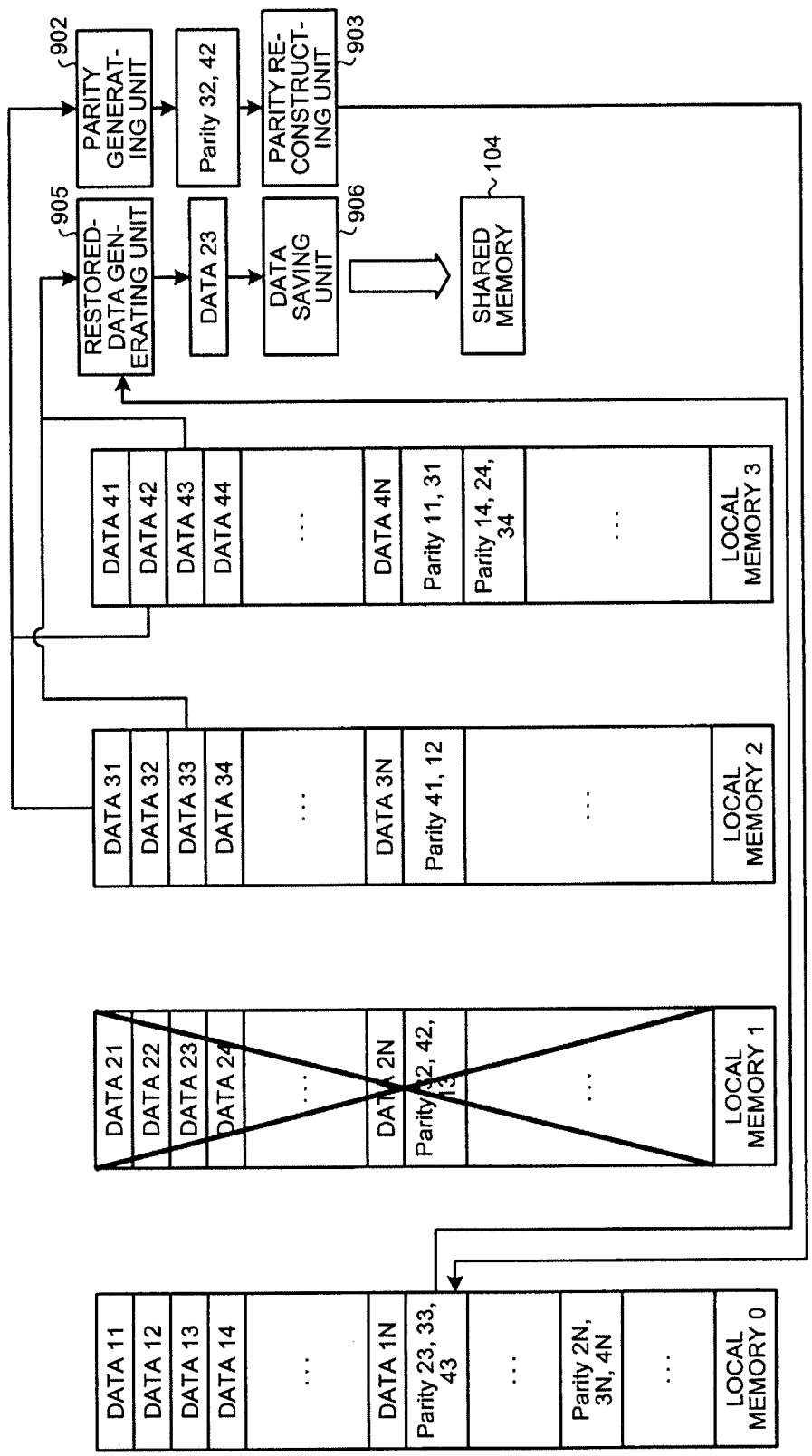
FIG. 17 is an explanatory view of the procedure of the suspension operation of CPU #1 (part 3)

As depicted in FIG. 17, the restored-data generating unit 905 continuously restores DATA 23 from DATA 32 and 43, and Parity 23, 33, and 43. The restored data is stored into the shared memory 104 by the data saving unit 906. The parity generating unit 902 generates parity data (Parity 32 and 42) restoring the data stored in the operating local memories. The generated parity data is stored into the local memory 0 by the parity reconstructing unit 903.

Figure 18:
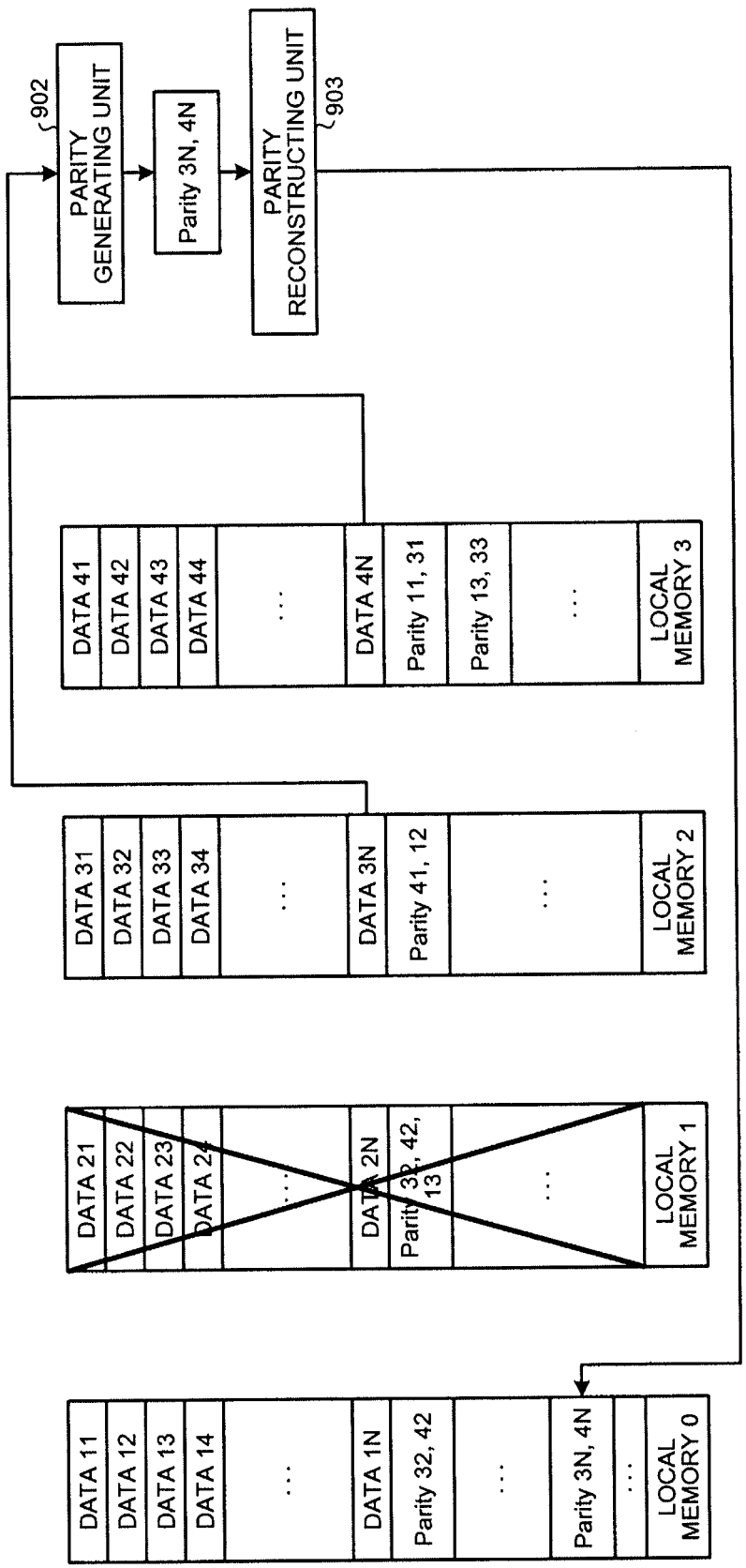
FIG. 18 is an explanatory view of the procedure of the suspension operation of CPU #1 (part 4)

Lastly, as depicted in FIG. 18, when the process is completed up to DATA 2N stored in the suspended local memory, the process of the restored-data generating unit 905 is terminated and the parity generating unit 902 generates parity data (Parity 3N and 4N) that restores the data stored in the operating local memories. The generated parity data is stored into the local memory 0 by the parity reconstructing unit 903.

As described with reference to FIGS. 13 to 18, the OS inputs an instruction for the suspension of the electrical power supply to the RAID controller 801 at the time of power-supply suspension. The RAID controller 801 responds to the instruction from the OS with the command receiving unit 904 and reconstructs the parity data. Therefore, since it is not necessary to wait for the saving of the data in the local memory, high-speed power-supply suspension can be achieved.

<Access During Power-Supply Suspension>

Figure 19:
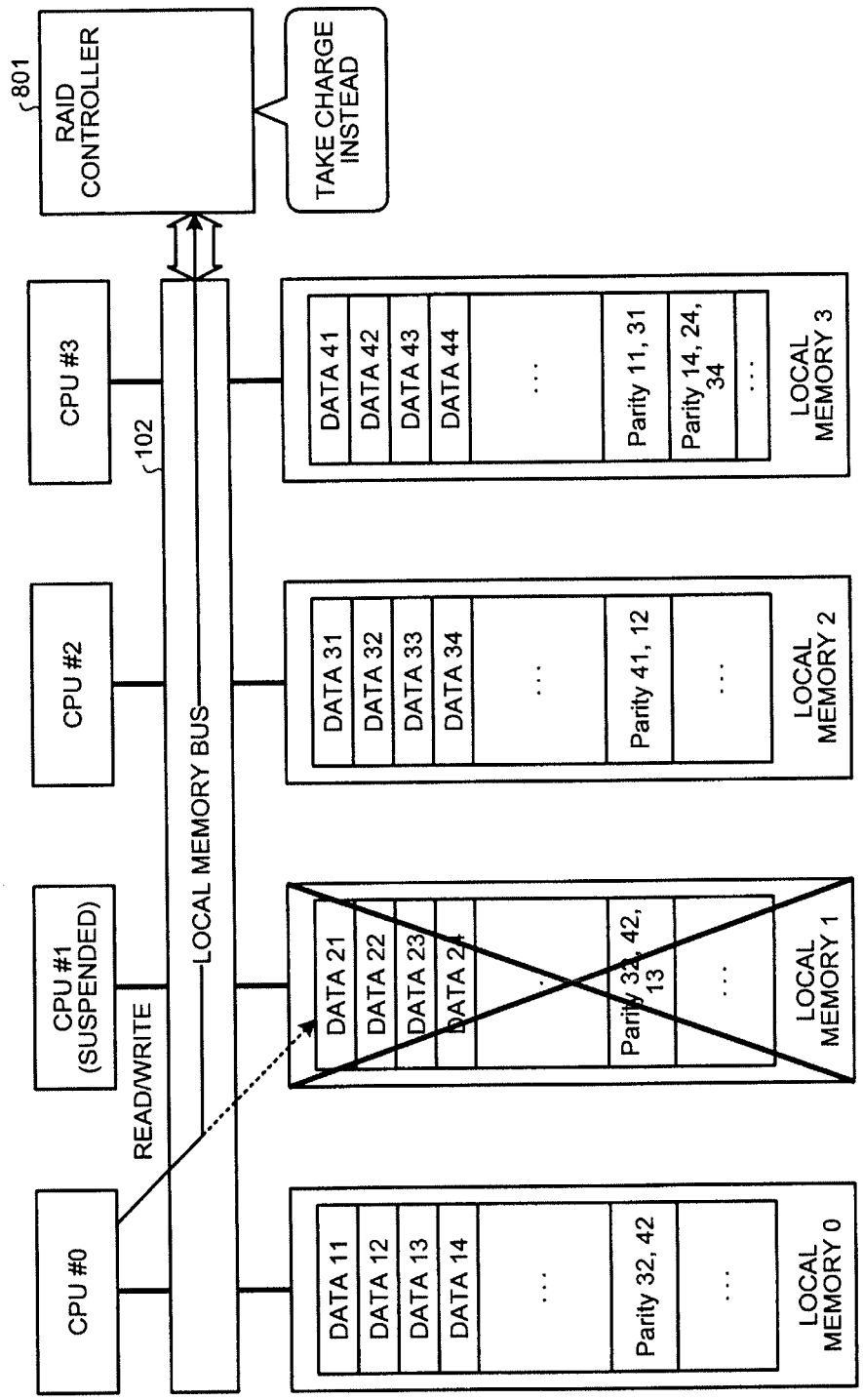
FIG. 19 is an explanatory view of an example of access of a local memory during power-supply suspension.

FIG. 19 is an explanatory view of an example of access of a local memory during power-supply suspension. Access to a power-supply suspended local memory may occur as depicted in FIG. 19 according to details of a process executed by the multicore processor 800. The access means a read process of reading data and a write process of writing data.

In either case of the read core the write process, the actual access destination, i.e., the local memory 1, is suspended and the given data does not exist. Therefore, the RAID controller 801 detects the access by the CPU #0, takes charge of the request from the CPU #0 instead of the local memory 1, and guides the access to a memory where the given data actually exists (e.g., the shared memory 104).

Figure 20:
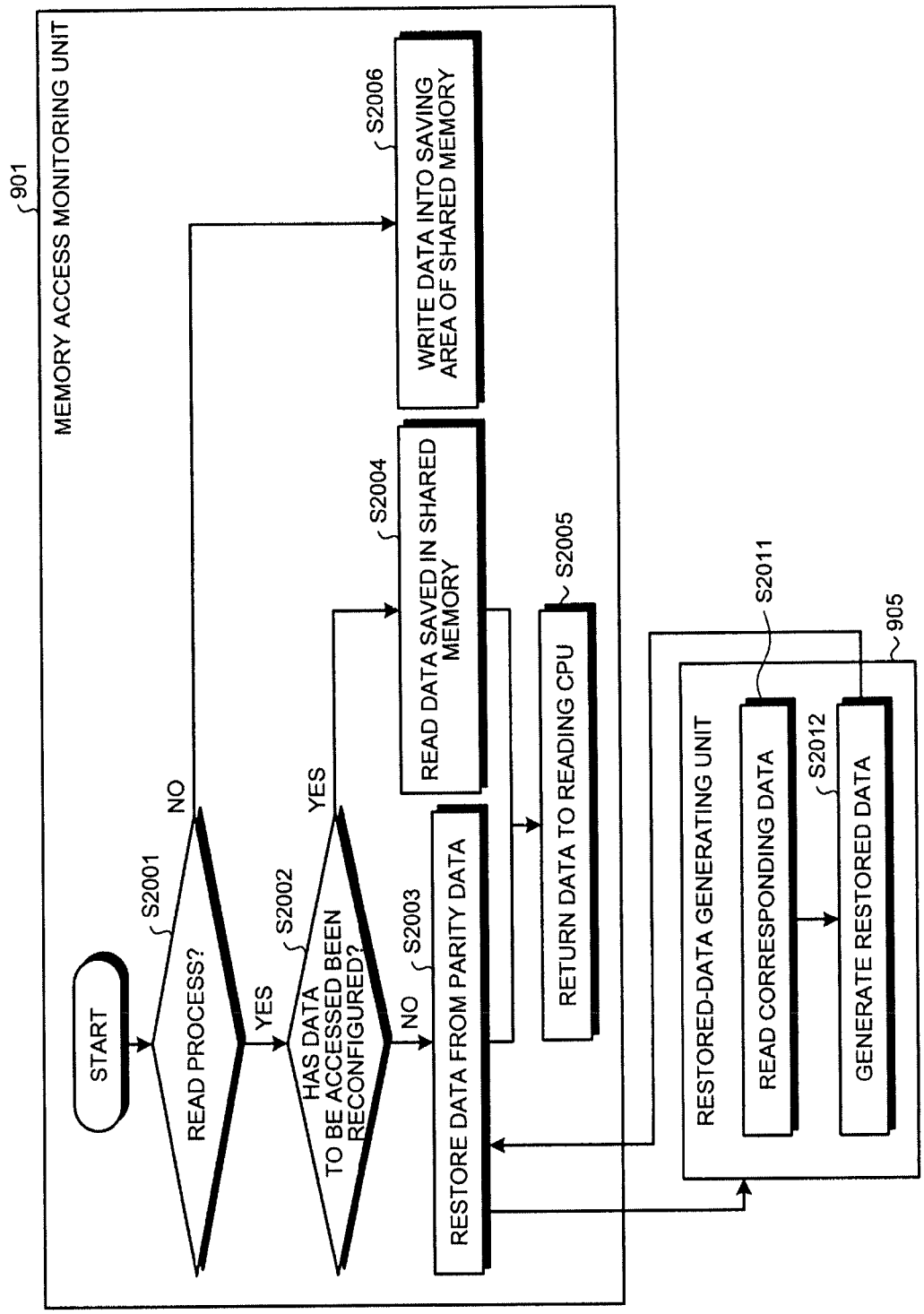
FIG. 20 is a flowchart of an access procedure by the RAID controller during power-supply suspension.

FIG. 20 is a flowchart of an access procedure by the RAID controller during the power-supply suspension. The flowchart in FIG. 20 depicts a difference in the operation of the RAID controller 801 according to details of access when access of a suspended local memory occurs.

In FIG. 20, the memory access monitoring unit 901 is triggered by the detection of access of a suspended local memory and starts a process. The memory access monitoring unit 901 first determines whether the detected access is a read process (step S2001). If it is determined that the detected access is a read process and starts process at step S2001 (step S2001: YES), the memory access monitoring unit 901 determines whether given data to be accessed has been reconfigured (step S2002).

At step S2002, if it is determined that the data has not been reconfigured (step S2002: NO), the given data to be accessed does not exist and therefore, the memory access monitoring unit 901 restores the data stored in the local memory from parity data (step S2003). On the other hand, if it is determined that the data has been reconfigured (step S2002: YES), this means that the given data has been restored in the shared memory 104. Therefore, the memory access monitoring unit 901 reads the data saved in the shared memory 104 (step S2004).

If it is determined that the access is a read process at step S2001, the given data is read at step S2003 or S2004. Therefore, the memory access monitoring unit 901 returns the data to the reading CPU (step S2005) and terminates the series of processes.

At step S2001, if it is determined that the access is not a read process (step S2001: NO), the memory access monitoring unit 901 determines that this detected access is a write process. Therefore, the memory access monitoring unit 901 writes given data into the saving area of the shared memory 104 (step S2006) and terminates the series of the processes. If the access is a write process, the given data is updated by this access. Therefore, it is not necessary to restore the data stored in the local memory as in the case of the read process.

As described, if the detected access is a read process and the given data is not reconfigured, the data is restored at step S2003. The process of restoring the data at step S2003 is mainly executed by the restored-data generating unit 905.

In particular, the restored-data generating unit 905 is triggered by the process at step S2003 and starts a series of processes. The restored-data generating unit 905 first reads corresponding data (parity data) (step S2011) and utilizes the read data to generate, as restored data, the data stored in the local memory (step S2012). The data generated at step S2012 is returned to the memory access monitoring unit 901 and utilized for the process at step S2005. The procedures of the read process and the write process for the suspended local memory will hereinafter be described with examples.

Figure 21:
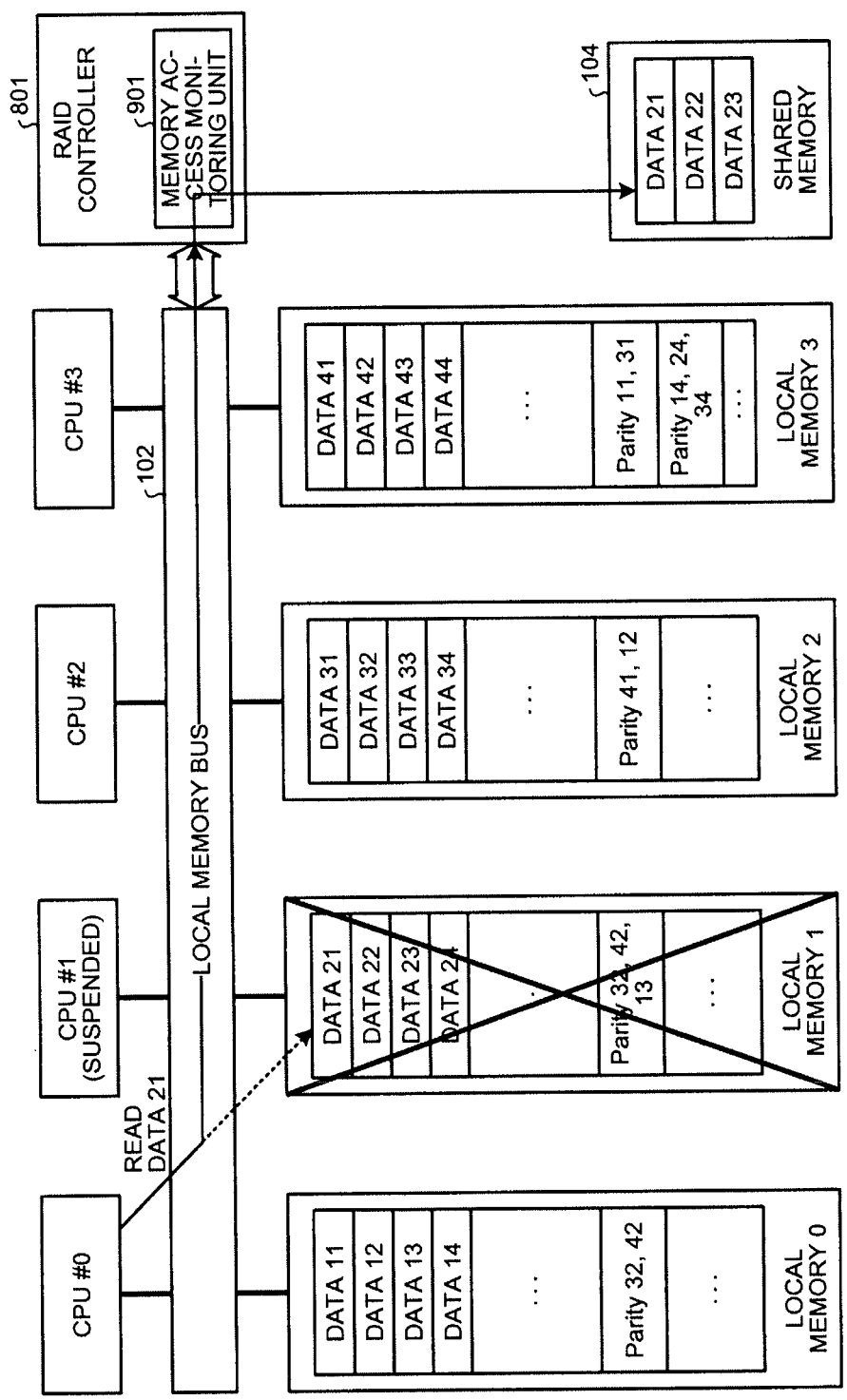
FIG. 21 is an explanatory view of a read procedure for a local memory during power-supply suspension (part 1)
Figure 22:
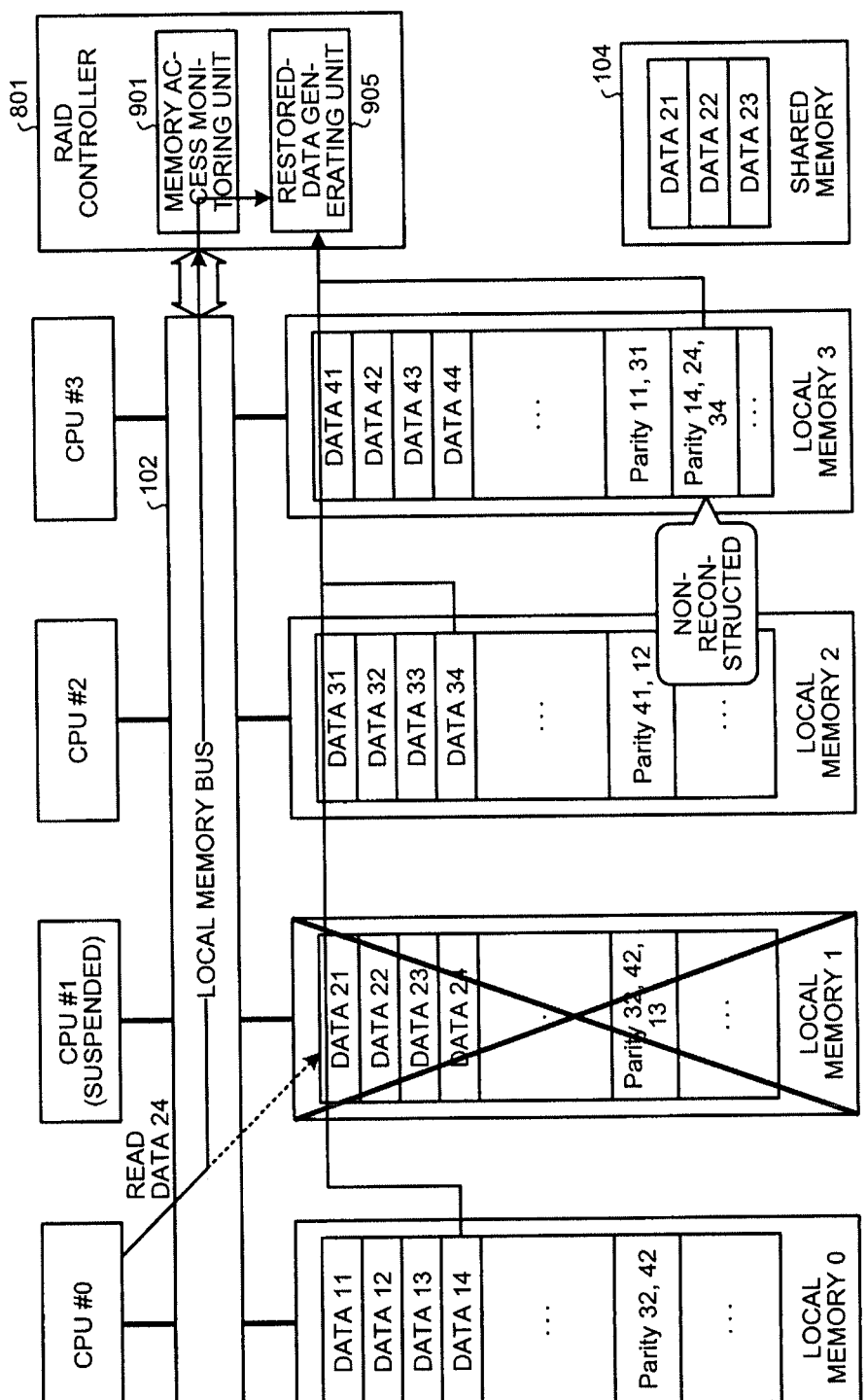
FIG. 22 is an explanatory view of the read procedure for a local memory during power-supply suspension (part 2)

FIGS. 21 and 22 are explanatory views of the read procedure for a local memory during power-supply suspension. In FIG. 21, a request is issued from the CPU #0, requesting the reading of the local memory 1 of the suspended CPU #1. The CPU #0 regards the head data, DATA 21, as the targeted data of the read process so as to sequentially read the stored data (actually, that was stored) in the local memory 1.

When detecting the read process by the CPU #0, the memory access monitoring unit 901 determines whether DATA 21 is data that has been reconfigured in the shared memory 104. In the example of FIG. 21, DATA 21 to 23 in the local memory 1 are data that have been reconfigured in the shared memory 104. Therefore, the memory access monitoring unit 901 causes the CPU #0 to read DATA 21 stored in the shared memory 104.

Although the CPU #0 sequentially reads the data stored in the local memory 1 from DATA 21, the CPU #0 cannot read DATA 24 or hereinafter from the shared memory 104 as illustrated in FIG. 22. Therefore, the RAID controller 801 uses the restored-data generating unit 905 to restore the data not yet reconfigured.

For example, as depicted in FIG. 22, to restore DATA 24, the restored-data generating unit 905 can generate data satisfying exclusive OR of DATA 14 and 34 and Parity 14, 24, and 34 stored in the local memories 0, 2, and 3 of the operating CPUs #0, #2, and #3 to acquire DATA 24. DATA 25 or hereinafter can also be restored with the same procedure. The memory access monitoring unit 901 causes the CPU #0 to read the data restored by the restored-data generating unit 905 and the data can be read even in the case of the suspended local memory 1 in the same way as the operating local memory.

Figure 23:
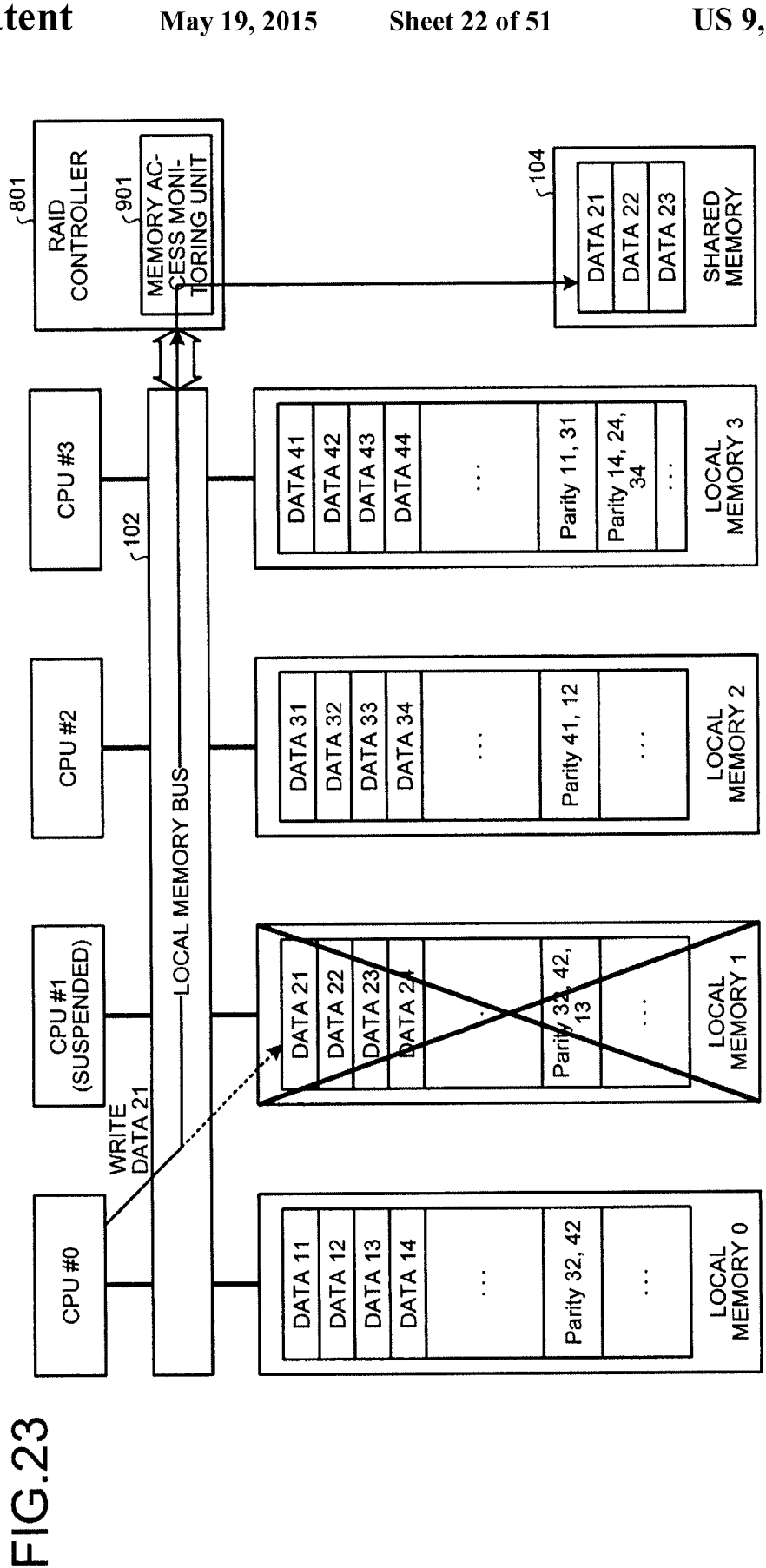
FIG. 23 is an explanatory view of a write procedure for a local memory during power-supply suspension (part 1)
Figure 24:
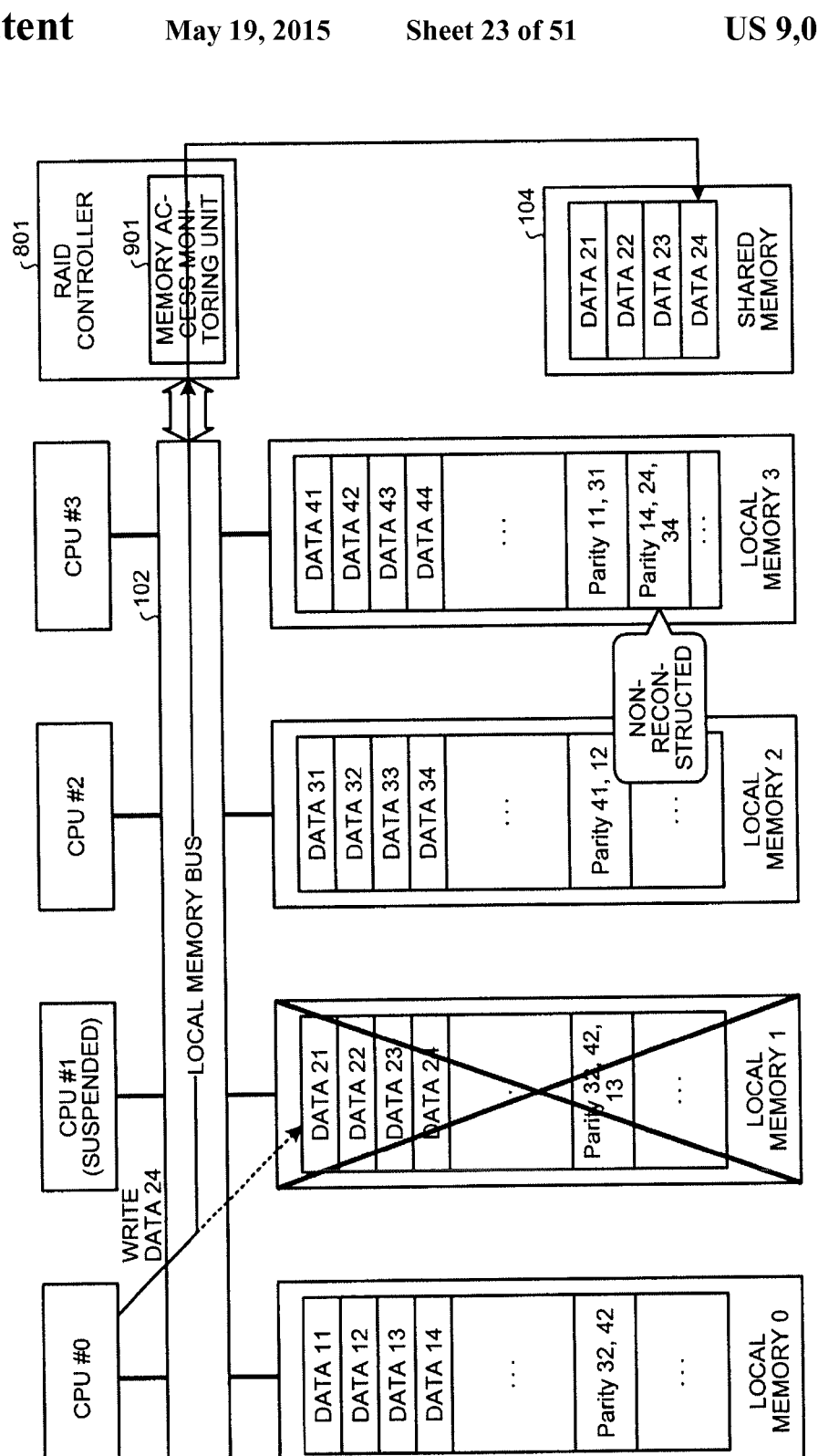
FIG. 24 is an explanatory view of the write procedure for a local memory during power-supply suspension (part 2)

FIGS. 23 and 24 are explanatory views of the write procedure for a local memory during the power-supply suspension. In FIG. 23, a request for the write process is generated from the CPU #0 to the local memory of the suspended CPU #1. The CPU #0 regards the head data, DATA 21, as the targeted data of the write process so as to sequentially perform writing in the order of addresses of the stored data (actually, that was stored) in the local memory 1.

When detecting the write process from the CPU #0, the memory access monitoring unit 901 causes DATA 21 to be written into the shared memory 104. Even if the targeted data is subsequently shifted to DATA 24 as depicted in FIG. 24, the memory access monitoring unit 901 causes DATA 24 to be written into the shared memory as is the case with the process of FIG. 23.

Unlike the read process, in the case of the write process, the written data is the latest data and therefore, it is not necessary to determine whether the targeted data is already reconfigured in the shared memory 104. The memory access monitoring unit 901 may guide the CPU #0 to similarly write any data into the shared memory 104.

As described, if access to a suspended local memory occurs, the details of the process of the RAID controller 801 vary according to whether the access is the read core the write process. In the case of the read process, if the given data of the read process is reconfigured data, the access may simply be guided such that the data is read from the shared memory 104; however, if the data has not been reconfigured, restored data has to be generated in each case and the accessing CPU has to be driven to read the restored data.

However, since the data itself does not change after the read process is completed, the series of the processes can directly be terminated. Even if the data itself is changed by the write process, it is not necessary to reconstruct parity data since the local memories of the operating CPUs are not affected.

<Operation at the Time of Power-Supply Recovery>

Figure 25:
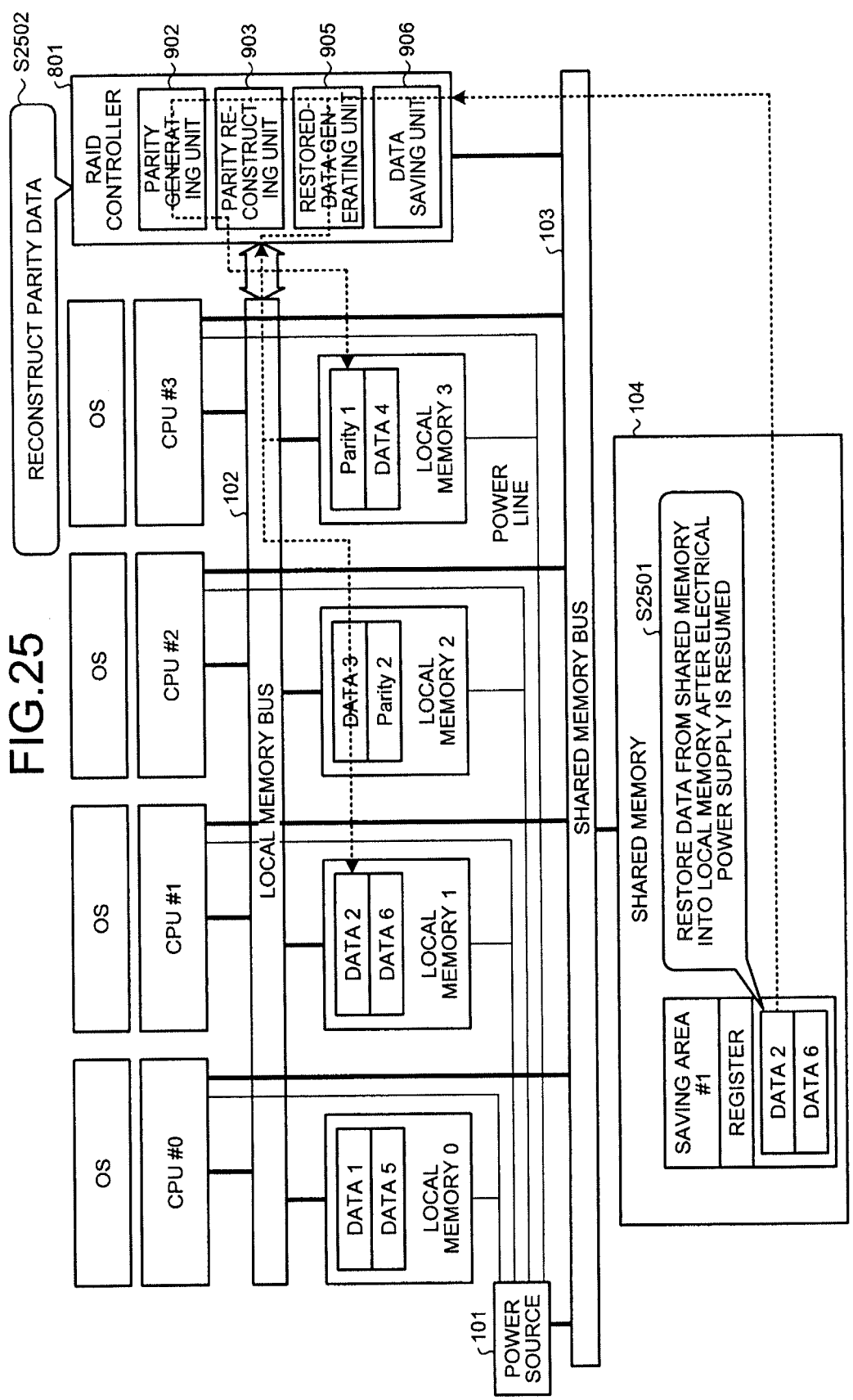
FIG. 25 is an explanatory view of an operation example at the time of power-supply recovery.

FIG. 25 is an explanatory view of an operation example at the time of power-supply recovery. Description will be made of the operation at the time of power-supply recovery when electrical power is supplied again to a CPU after suspension. As depicted in FIG. 25, when the electrical power supply to the CPU #1 and the local memory 1 is resumed, the RAID controller 801 first restores into the local memory 1, the data saved to the shared memory (step S2501).

The RAID controller 801 reconstructs the parity data according to the number of operating CPUs after the power-supply recovery (step S2502). Since the CPU #1 is recovered, the CPUs #0 to #3 are in operation. Therefore, a local memory of each of the CPUs stores into the parity areas of three local memories other than the local memory thereof, the parity data for restoring the data stored in the local memory.

Figure 26:
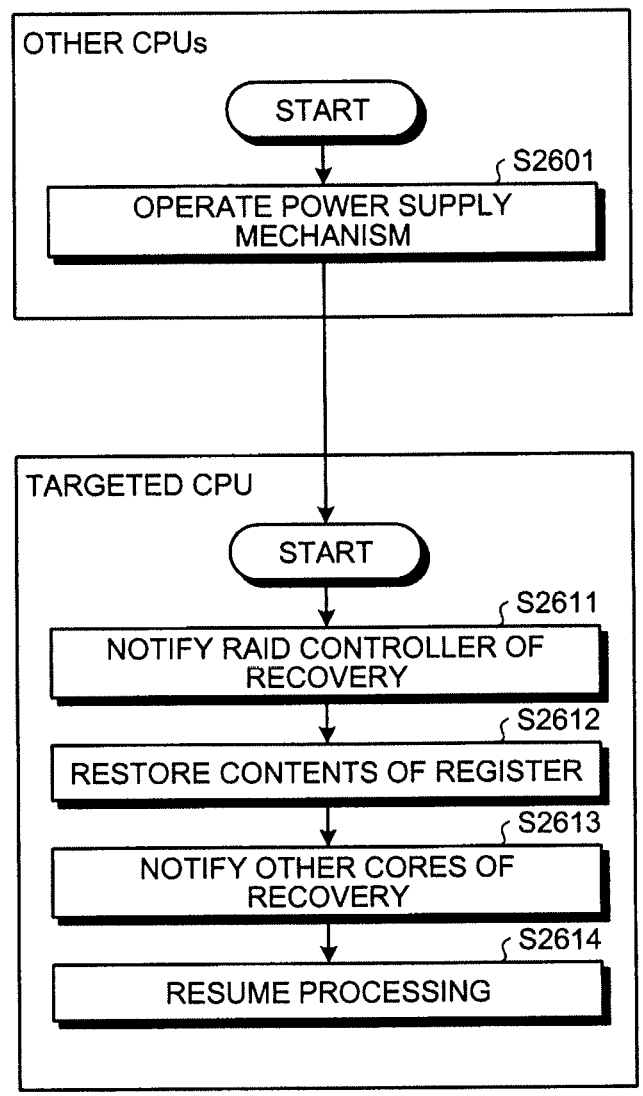
FIG. 26 is a flowchart of an operation procedure of the OS at the time of power-supply recovery in Example 1.

FIG. 26 is a flowchart of an operation procedure of the OS at the time of power-supply recovery in Example 1. The flowchart in FIG. 26 depicts a procedure when a suspended CPU receives a recovery instruction from another CPU and resumes the process of normal operation.

In FIG. 26, the OS is triggered by a power-supply recovery determination process at a CPU other than the suspended CPU and starts the operation. The OS causes another CPU described above to operate a power supply mechanism of the suspended CPU (step S2601).

Subsequently, in the targeted CPU of the power-supply recovery, the OS notifies the RAID controller 801 of the recovery (step S2611). The OS then restores the contents of the register (step S2612) and notifies the other cores (other CPUs) of the recovery (step S2613). The OS resumes the processing of the recovered CPU (step S2614) and terminates the series of the recovery processes.

Figure 27:
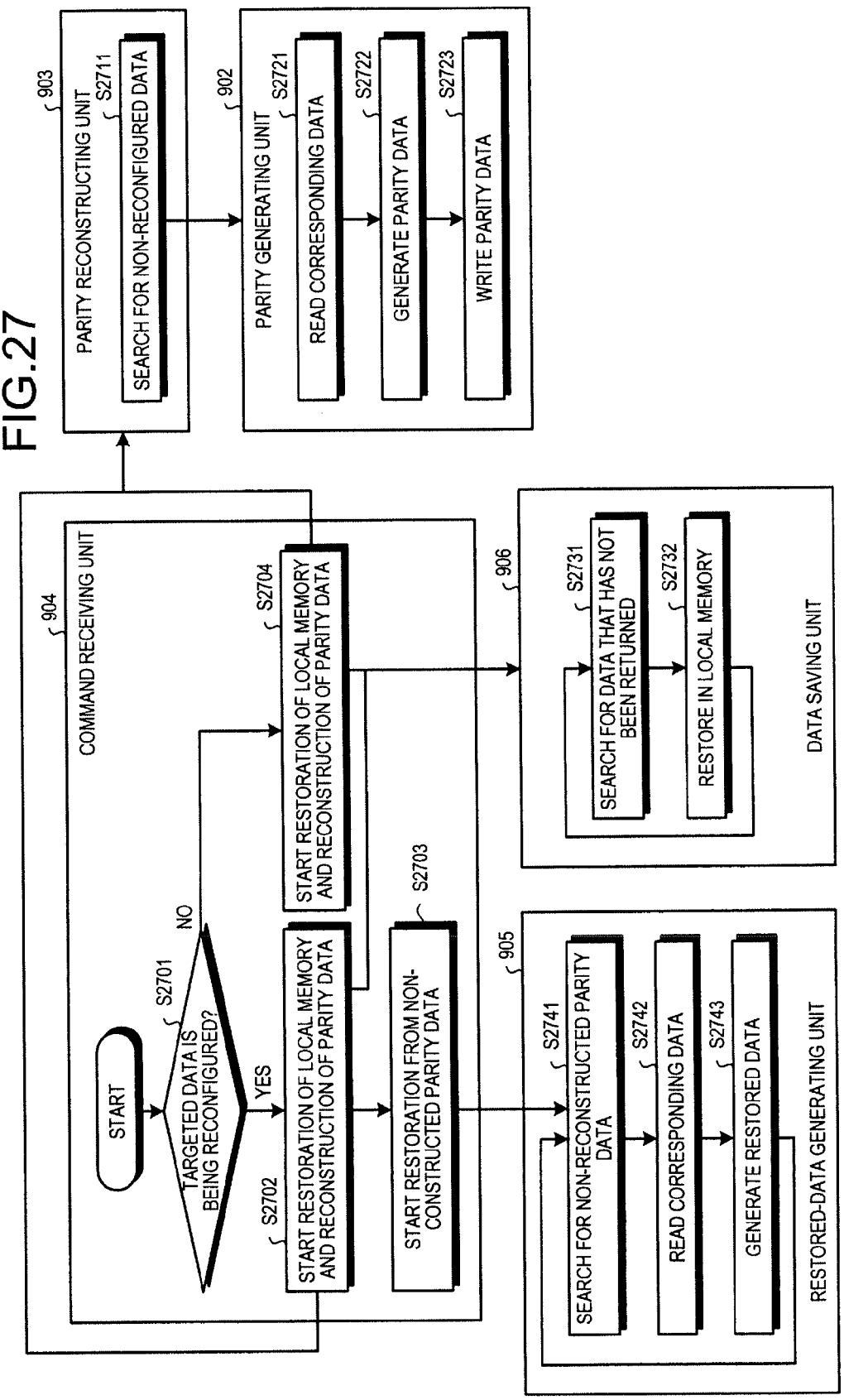
FIG. 27 is a flowchart of an operation procedure by the RAID controller at the time of power-supply recovery.

FIG. 27 is a flowchart of an operation procedure by the RAID controller at the time of power-supply recovery. The flowchart in FIG. 27 depicts the operation of the RAID controller 801 when a power-supply recovery instruction is received from the OS.

In FIG. 27, the RAID controller 801 is triggered by reception of a command related to power-source recovery output from the OS in the command receiving unit 904 and starts the process. First, the command receiving unit 904 determines whether the targeted data of the recovery process is being reconfigured (step S2701). The targeted data means data stored in a local memory accessed by a CPU instructed by the OS to perform the recovery.

If it is determined that the data is being reconfigured at step S2701 (step S2701: YES), the command receiving unit 904 starts the restoration of the local memory and the reconstruction of the parity data (step S2702). On the other hand, if it is determined that the data is not being reconfigured (step S2701: NO), the command receiving unit 904 starts the restoration of the local memory and the reconstruction of the parity data in the same way (step S2704). As described hereinafter, at step S2702, the data being reconfigured is restored by utilizing the parity data before going to the process of the data saving unit 906. On the other hand, at step S2704, it is not necessary to handle the data being reconfigured and therefore, the procedure directly goes to the process of the data saving unit 906.

After the process at step S2702, the command receiving unit 904 starts the restoration of the data stored in the local memory (step S2703) and the restored-data generating unit 905 is caused to generate the restored data.

The restored-data generating unit 905 first searches for non-reconstructed parity data (step S2741) and reads corresponding data (step 2742). The restored-data generating unit 905 then generates the restored data by using the data read at step S2742 (step S2743). The generation of the restored data at step S2743 is repeatedly performed until the non-reconstructed parity data no longer remain.

Returning to the process of the command receiving unit 904, if it is determined that the data is not being reconfigured at step S2701 (step S2701: NO), the command receiving unit 904 starts the restoration of the data stored in the local memory (step S2704). As described above, in the case at step S2704, since the data being reconfigured does not exist unlike the process at step S2702, the generation of the restored data is not performed by the restored-data generating unit 905.

When the processes at step S2702 and step S2704 are started by the command receiving unit 904, the parity reconstructing unit 903 searches for non-reconfigured data (step S2711). The non-reconfigured data at step S2711 means among the data stored in the local memories, data with parity data not reconstructed according to the number of operating CPUs after the power-supply recovery.

The parity generating unit 902 generates parity data for the non-reconfigured data retrieved by the parity reconstructing unit 903. First, the parity generating unit 902 reads the corresponding data (step S2721) and generates the parity data for restoring the corresponding data (step S2722). The parity generating unit 902 writes the generated parity data into the local memories of the CPUs (step S2723) and terminates the series of processes.

After the process at step S2702 or S2704 of the command receiving unit 904, the data saving unit 906 starts a data saving process. The data saving unit 906 searches for data that has not been returned to the local memory (step S2731). The data saving unit 906 returns to the local memory, the data retrieved at step S2731 (step S2732). The data saving process described above is repeatedly executed until unrecovered data no longer remain.

Figure 28:
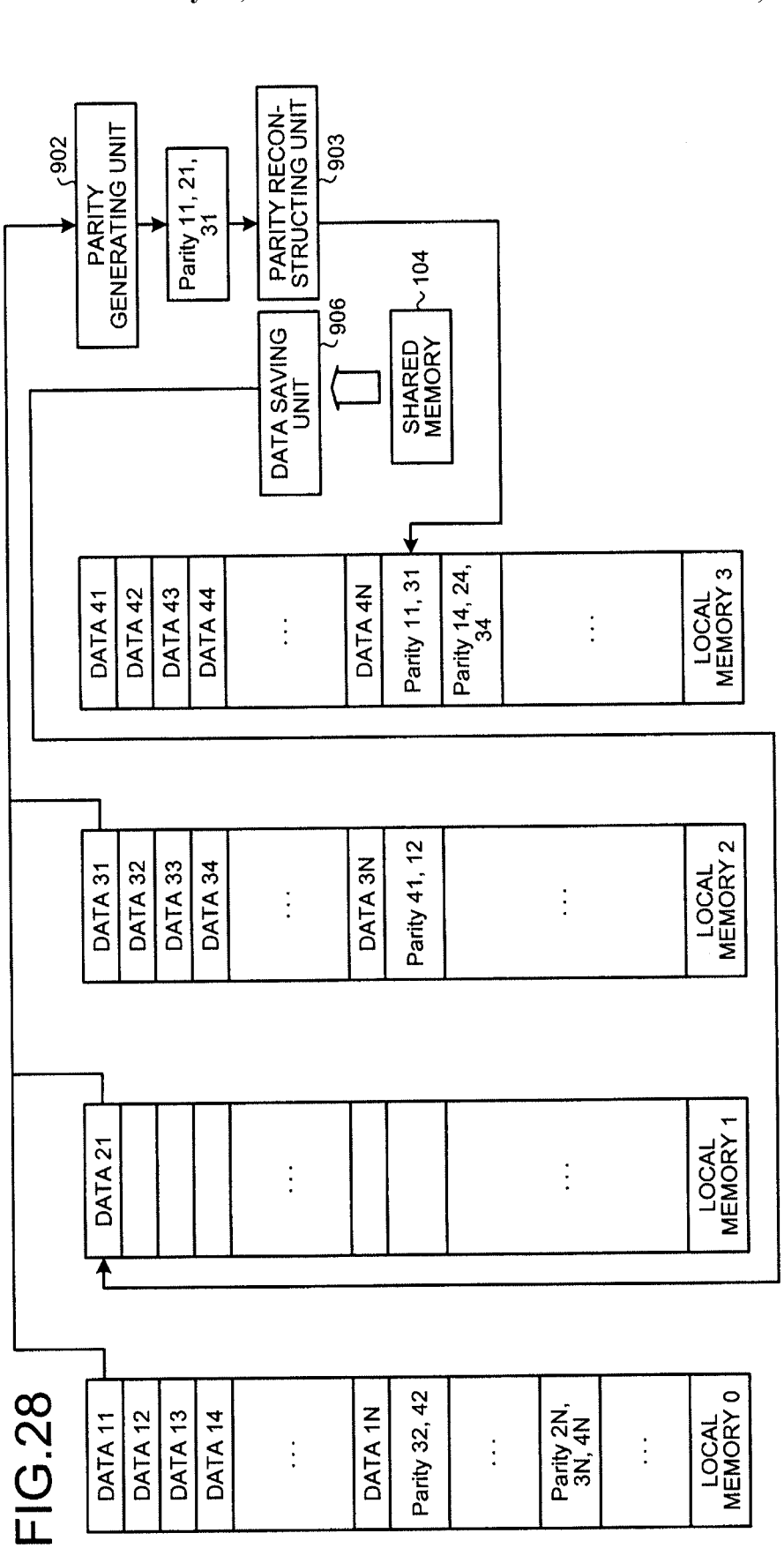
FIG. 28 is an explanatory view of a procedure of recovery operation of the CPU #1 (part 1)
Figure 29:
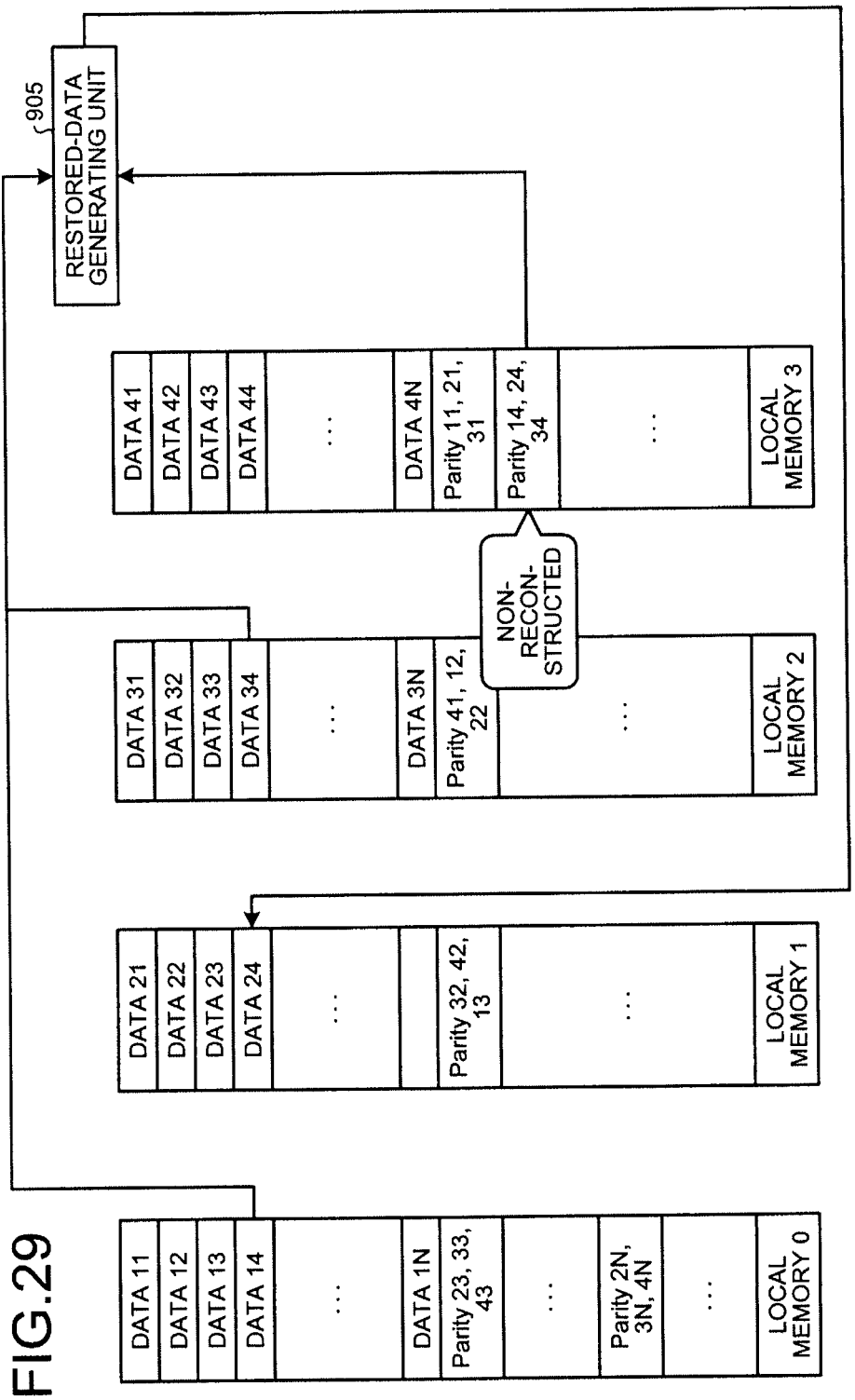
FIG. 29 is an explanatory view of the procedure of the recovery operation of the CPU #1 (part 2)

FIGS. 28 and 29 are explanatory views of the procedure of the recovery operation of the CPU #1. In FIG. 28, a recovery instruction of the suspended CPU #1 is given and the electrical power supply to the CPU #1 and the local memory 1 is started. The data stored in the local memory 1 are completely lost at the time of power-supply suspension. Therefore, when the local memory 1 transitions to the recover state, the RAID controller 801 sequentially restores the data saved to the shared memory 104 in the local memory.

For example, as depicted in FIG. 28, the RAID controller 801 uses the data saving unit 906 to read and return DATA 21 from the shared memory 104 into the local memory 1. The parity generating unit 902 then generates the parity data for restoring the data currently stored in the local memories.

In the example of FIG. 28, the parity generating unit 902 generates Parity 11, 21, and 31 by utilizing DATA 11 stored in the local memory 0, DATA 21 stored in the local memory 1, and DATA 31 stored in the local memory 2. The generated parity data (Parity 11, 21, and 31) are rewritten by the parity reconstructing unit 903 at the position of the parity data (Parity 11 and 31) currently stored in the local memory 3.

The RAID controller 801 also reads and stores the data after DATA 21 from the shared memory 104 into the local memory 1. Subsequently, non-reconfigured data may be processed. The non-reconfiguration means data having no restored data generated in the shared memory 104 from parity data after the power-supply suspension. Data stored in a suspended local memory is normally reconfigured in the shared memory 104 from parity data. However, if a period from the power-supply suspension to the recovery is short, the recovery process may start in a state before all the data are reconfigured in the shared memory 104.

FIG. 29 represents the case where DATA 24 is not reconfigured in the shared memory 104. Such non-reconfigured data cannot simply be read from the shared memory 104 and recovered in the local memory 1. Therefore, the restored-data generating unit 905 generates DATA 24 from the parity data.

For example, DATA 24 is acquired by performing the exclusive OR calculation of DATA 14 stored in the local memory 0, DATA 34 stored in the local memory 2, and Parity 14, 24, and 34 stored in the local memory 3. As depicted in FIG. 28, in the case of the parity data reconstructed after the power supply of CPU is suspended, the given data is restored based on Parity 11 and 31 stored in the local memory 3 of FIG. 28 and DATA in two local memories other than its own local memory.

Therefore, if parity data restored from data stored in three local memories such as Parity 14, 24, and 34 is stored, this means that data having parity data not yet reconstructed after the suspension is present as in the case of data after DATA 24.

As described with reference to FIGS. 25 to 29, an instruction related to the restart of the electrical power supply is input from the OS to the RAID controller 801 at the time of power-supply recovery. The RAID controller 801 uses the command receiving unit 904 to restore data and reconstruct parity data in response to the instruction from the OS. If the suspended local memory is accessed by another CPU and the data contents are updated during the power-supply suspension, the RAID controller 801 guides the access such that the write process is executed with respect to data restored in the shared memory 104 (see <Access during power-supply suspension> described above for details). Therefore, by only recovering the data saved in the shared memory 104 to a local memory, the data reflecting the latest updated contents is immediately stored to the local memory.

<Access During Power-Supply Recovery>

Figure 30:
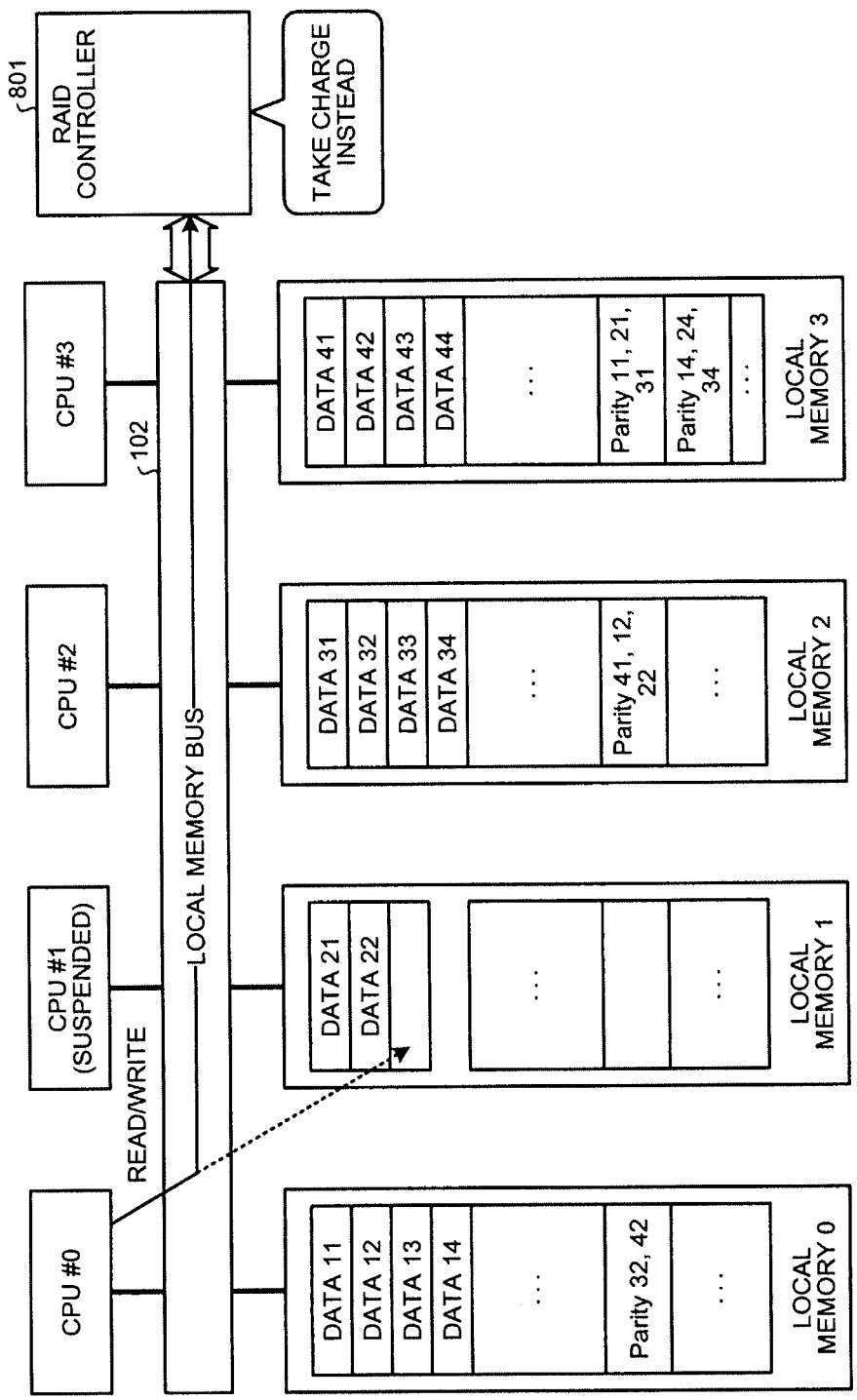
FIG. 30 is an explanatory view of an example of access of a local memory during restoration.

FIG. 30 is an explanatory view of an example of access of a local memory during restoration. Access of a recovering local memory may occur as depicted in FIG. 30 according to details and timing of a process executed by the multicore processor 800. Access of data already recovered to a local memory by a recovering process causes no problem.

However, as depicted in FIG. 30, in the case of access of data not recovered to a local memory, the given data does not exist. Therefore, the RAID controller 801 detects the access from the CPU #0 to take charge of the request of CPU #0 instead of the local memory 1 and actually restores the given data to enable the access.

Figure 31:
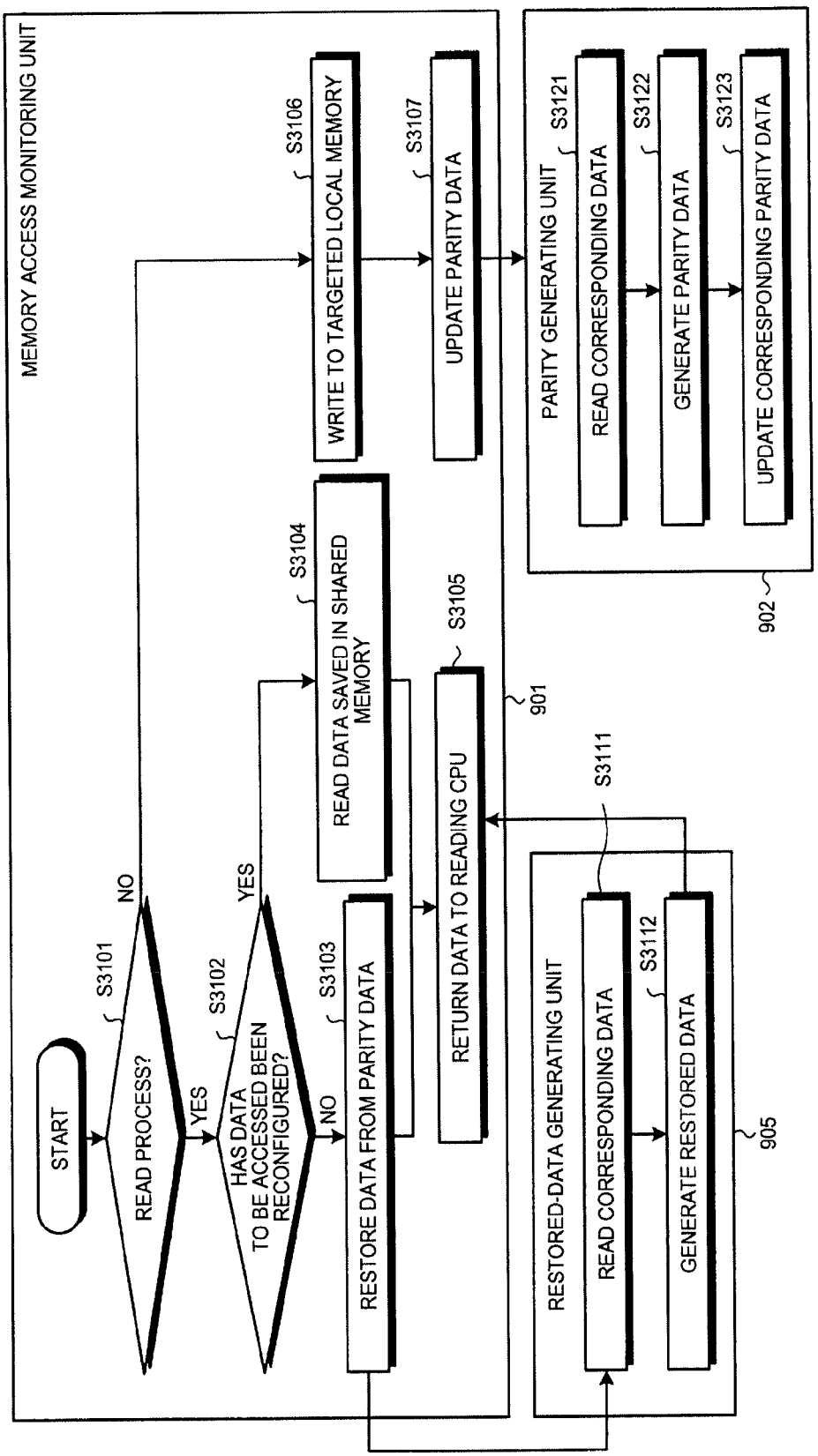
FIG. 31 is a flowchart of an access procedure by the RAID controller during restoration.

FIG. 31 is a flowchart of an access procedure by the RAID controller during restoration. The flowchart in FIG. 31 depicts a difference in the operation of the RAID controller 801 according to details of access when access of a local memory during restoration occurs.

In FIG. 31, the memory access monitoring unit 901 is triggered by a detection of access of a local memory during restoration and starts a process. The memory access monitoring unit 901 first determines whether the detected access is the read process (step S3101). If it is determined that the detected access is the read process (step S3101: YES), the memory access monitoring unit 901 determines whether data to be accessed has been reconfigured (step S3102).

If it is determined that the data has not been reconfigured (step S3102: NO), the data to be accesses does not exist and therefore, the memory access monitoring unit 901 restores the data stored in the local memory from parity data (step S3103). On the other hand, if it is determined that the data has been reconfigured (step S3102: YES), this means that the given data has been restored in the shared memory 104. Therefore, the memory access monitoring unit 901 reads the data saved in the shared memory 104 (step S3104).

If it is determined that the access is the read process at step S3101, the given data is read at the process at step S3103 or S3104. Therefore, the memory access monitoring unit 901 returns the data to the reading CPU (step S3105) and terminates the series of processes.

If it is determined that the access is not the read process (step S3101: NO), the memory access monitoring unit 901 determines that the detected access is the write process. Therefore, the memory access monitoring unit 901 performs writing into the targeted local memory (step S3106) and terminates the series of processes. Since the data written at step S3106 is the latest data, the memory access monitoring unit 901 subsequently generates parity data for restoring the latest data and updates the current parity data (step S3107).

If an instruction for updating the parity data is given at step S3107, the parity generating unit 902 generates parity data for restoring the latest data as described above. The parity generating unit 902 reads the given data (step S3121).

The parity generating unit 902 then generates the parity data by using the data read at step S3121 (step S3122). Lastly, the parity generating unit 902 updates the corresponding parity data with the parity data generated at step S3122 (step S3123) and terminates the series of processes.

As described, if the detected access is the read process and the given data is not reconfigured, the data is restored at step S3103. The process of restoring the data at step S3103 is mainly executed by the restored-data generating unit 905.

In particular, the restored-data generating unit 905 is triggered by the process at step S3103 and starts a series of processes. The restored-data generating unit 905 reads corresponding data (parity data) (step S3111) and utilizes the read data to generate the data stored in the local memory as restored data (step S3112).

The data generated at step S3112 is returned to the memory access monitoring unit 901 and utilized for the process at step S3105. The procedures of the read process and the write process for the local memory during restoration will be described with specific examples.

Figure 32:
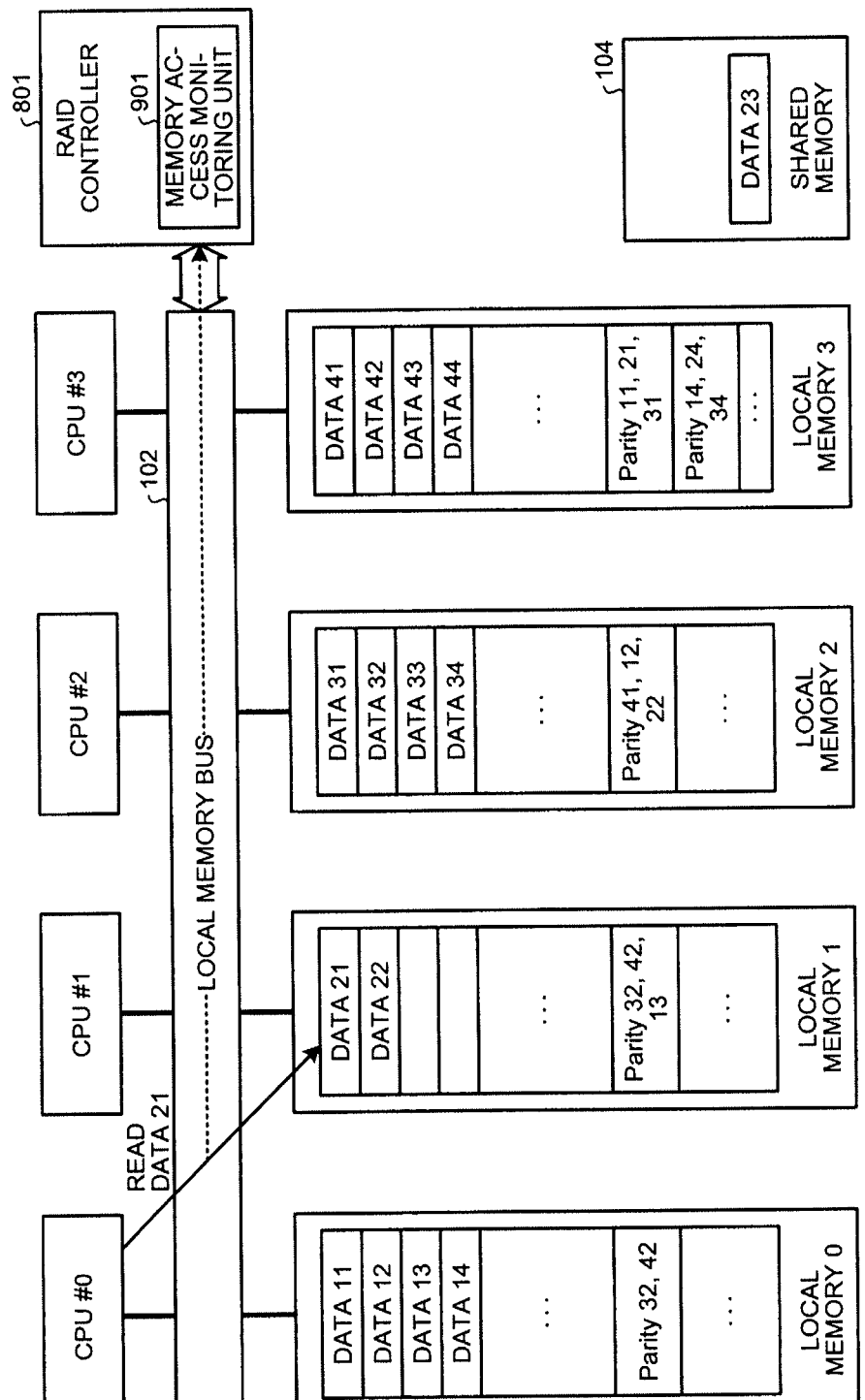
FIG. 32 is an explanatory view of a procedure of the read operation with respect to the CPU #1 during restoration (part 1)
Figure 33:
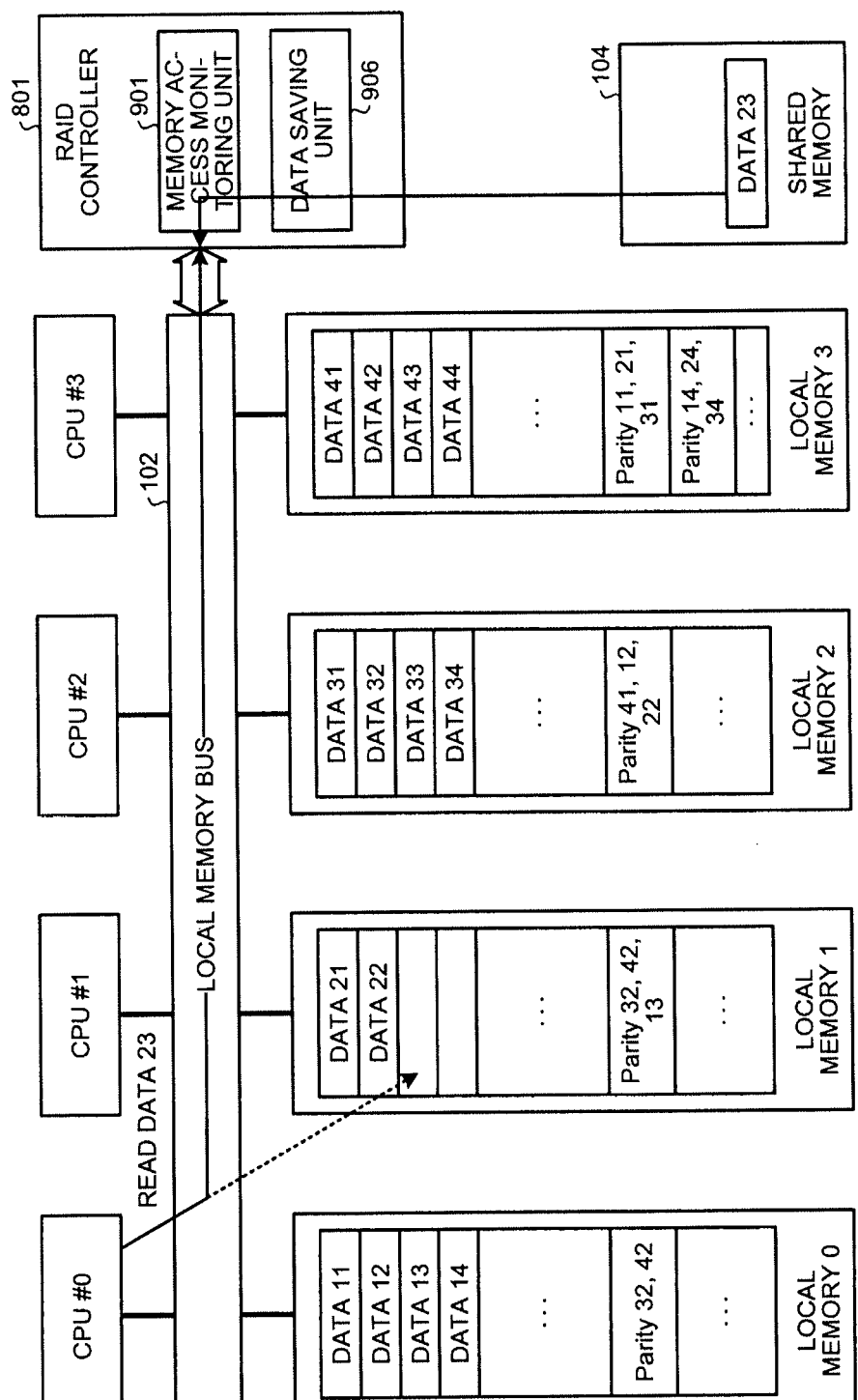
FIG. 33 is an explanatory view of the procedure of the read operation with respect to the CPU #1 during restoration (part 2)
Figure 34:
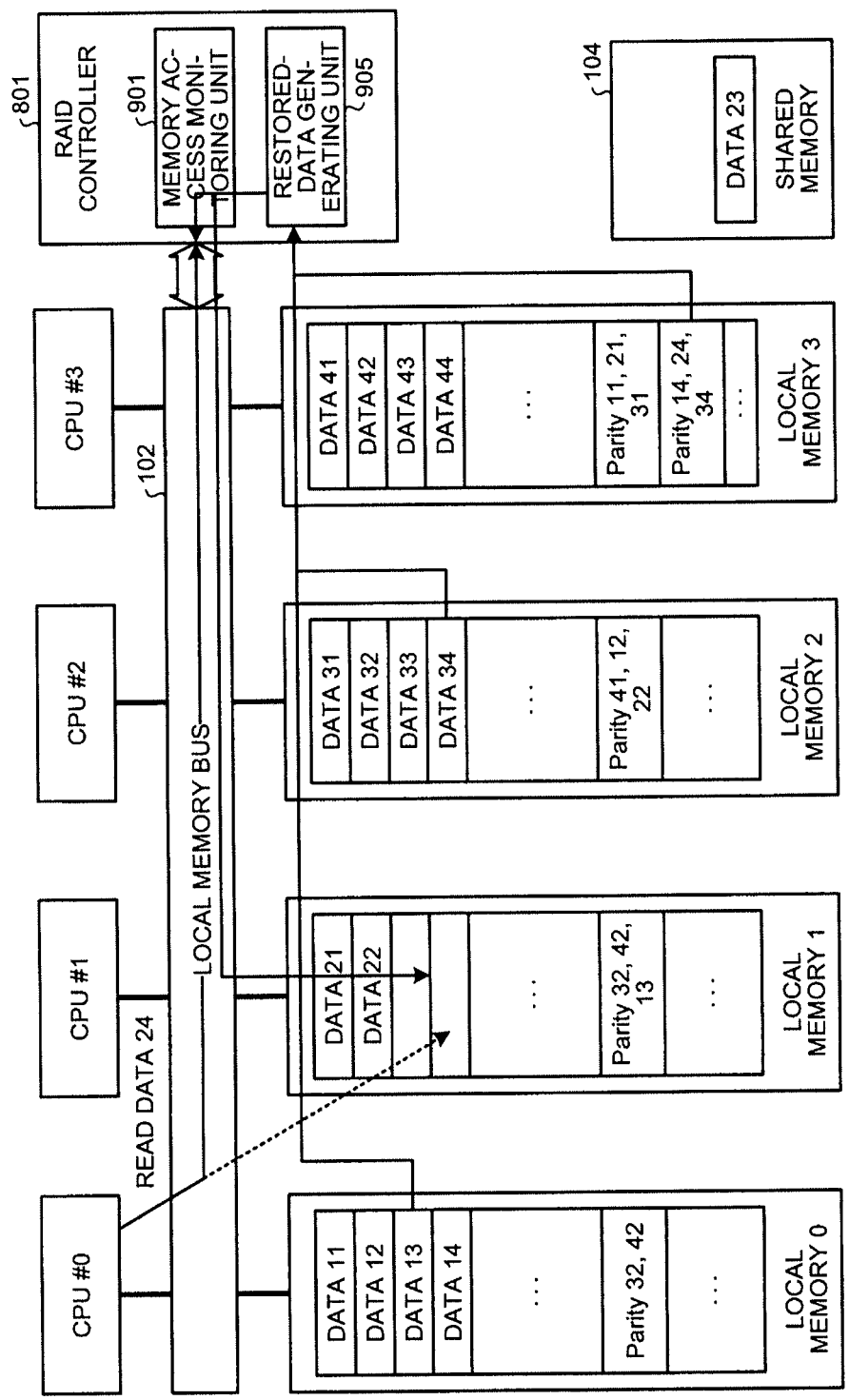
FIG. 34 is an explanatory view of the procedure of the read operation with respect to the CPU #1 during restoration (part 3)

FIGS. 32 to 34 are explanatory views of a procedure of the read operation with respect to the CPU #1 during restoration. In FIG. 32, the read operation occurs from the CPU #0 to the local memory 1 accessed by the CPU #1. As depicted in FIG. 32, the data of DATA 21 and 22 are already restored in the local memory 1. Therefore, the CPU #0 refers to the local memory 1 when reading DATA 21. At this point, the memory access monitoring unit 901 of the RAID controller 801 detects the occurrence of the read operation by the CPU #0.

As depicted in FIG. 33, when the CPU #0 reads DATA 23, the memory access monitoring unit 901 notifies the CPU #0 and causes the data saving unit 906 to read DATA 23 recovered in the shared memory 104.

As depicted in FIG. 34, when reading DATA 24, which is not restored in the local memory 1 or the shared memory 104, the RAID controller 801 uses the memory access monitoring unit 901 to detect access of the data during restoration.

The restored-data generating unit 905 restores DATA 24 from DATA 13, DATA 33, and Parity 14, 24, and 34 stored in the operating local memories (local memories 0, 2, and 3) other than the local memory 1. The restored data is stored into the local memory 1 and read by the CPU #0.

Figure 35:
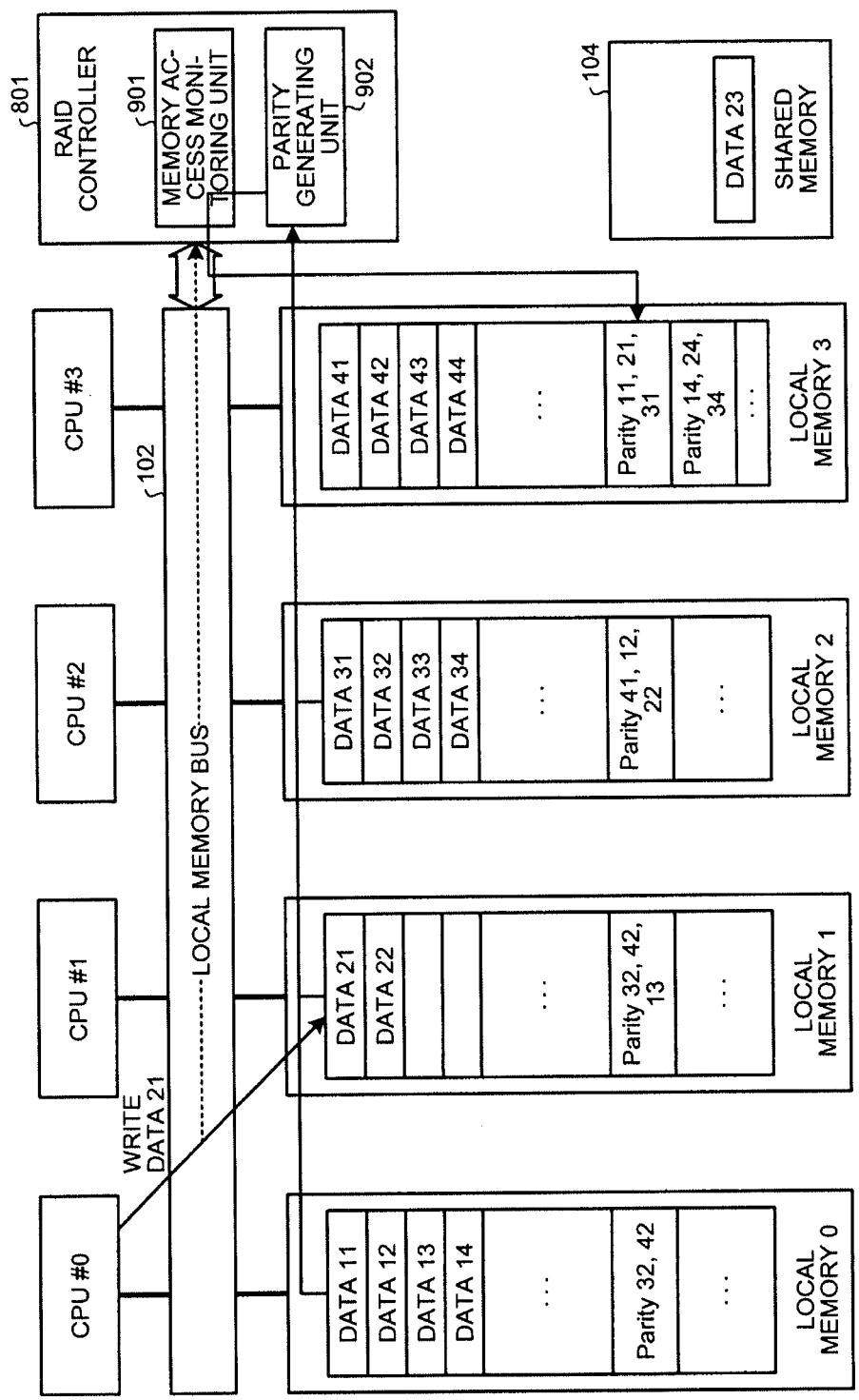
FIG. 35 is an explanatory view of a procedure of the write operation to the CPU #1 during restoration (part 1)
Figure 36:
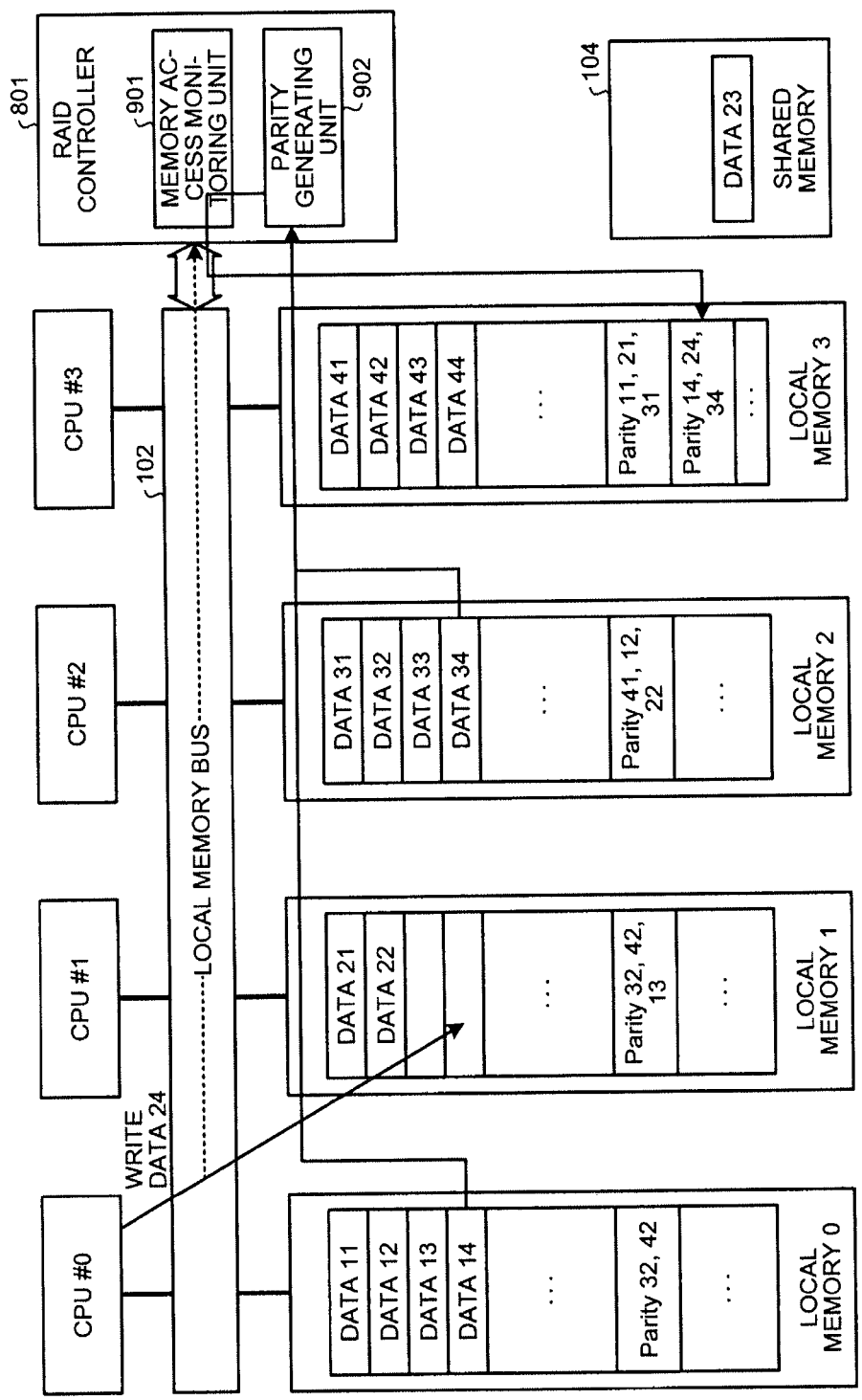
FIG. 36 is an explanatory view of the procedure of the write operation to the CPU #1 during restoration (part 2)

FIGS. 35 and 36 are explanatory views of a procedure of the write operation to the CPU #1 during restoration. In FIG. 35, the write operation occurs from the CPU #0 to the data stored in the local memory 1 accessed by the CPU #1. As depicted in FIG. 35, the data of DATA 21 and 22 are already restored in the local memory 1. Therefore, the CPU #0 directly accesses the local memory 1 when performing writing to DATA 21. At this point, the memory access monitoring unit 901 of the RAID controller 801 detects the occurrence of the write operation by the CPU #0.

As depicted in FIG. 35, when the contents of DATA 21 are updated, the parity generating unit 902 generates new parity data and overwrites the current parity data so that the updated data can be restored.

Subsequently, as depicted in FIG. 36, if a write process for DATA 24, which is not restored in the local memory 1, occurs, the CPU #0 directly executes the write process to the local memory 1. Since the data contents are overwritten in the case of the write process unlike the read process, it is not necessary to restore DATA 24. If DATA 24 is newly written, the parity generating unit 902 generates new parity data and overwrites the current parity data so that the updated data can be restored.

As described, if access to a local memory during restoration occurs, the details of the process of the RAID controller 801 vary according to whether the access is the read core the write process. In the case of the read process, if the targeted data of the read process is reconfigured data, the access may simply be guided such that the data is read from the shared memory 104; however, if the data is not reconfigured data, the restored data must be generated and read by the accessing CPU in each case.

However, since the data itself does not change after the read process is completed, a series of the processes can directly be terminated. If the data itself is changed by the write process, the latest parity data reflecting the write process can be generated and stored in the local memories of the operating CPUs to quickly restore the latest data even if the power supply to a CPU is suddenly suspended.

As described, Example 1 is configured to suspend the electrical power supply to a local memory in association with a power-supply suspension of a CPU such that the power consumption is reduced. If the electrical power supply is suspended to the local memory that is a volatile memory, stored data are lost and cannot be restored. However, the data restoration apparatus 110 of Example 1 stores parity data for restoring the data stored in the local memories, into the respective operating local memories in advance. Therefore, even if the CPU 1 is powered off and the electrical power supply to the local memory 1 is suddenly terminated, the stored data can immediately be restored although the data stored in the local memory 1 itself is lost.

The multicore processor 800 is assumed to have a utilization form such that the power-supply suspension and power-supply recovery of CPUs frequently occur so as to suspend unnecessary CPUs and increase the power efficiency. Therefore, even when the restoration of data from parity data or the reconstruction of the parity data are not yet fully completed, access may occur to a local memory while the restoration of data is incomplete.

Therefore, in Example 1, the RAID controller 801 manages the current state of the targeted data. Therefore, appropriate and efficient access can be supported without an access error and an omission of updating by a CPU.

Example 2

Figure 37:
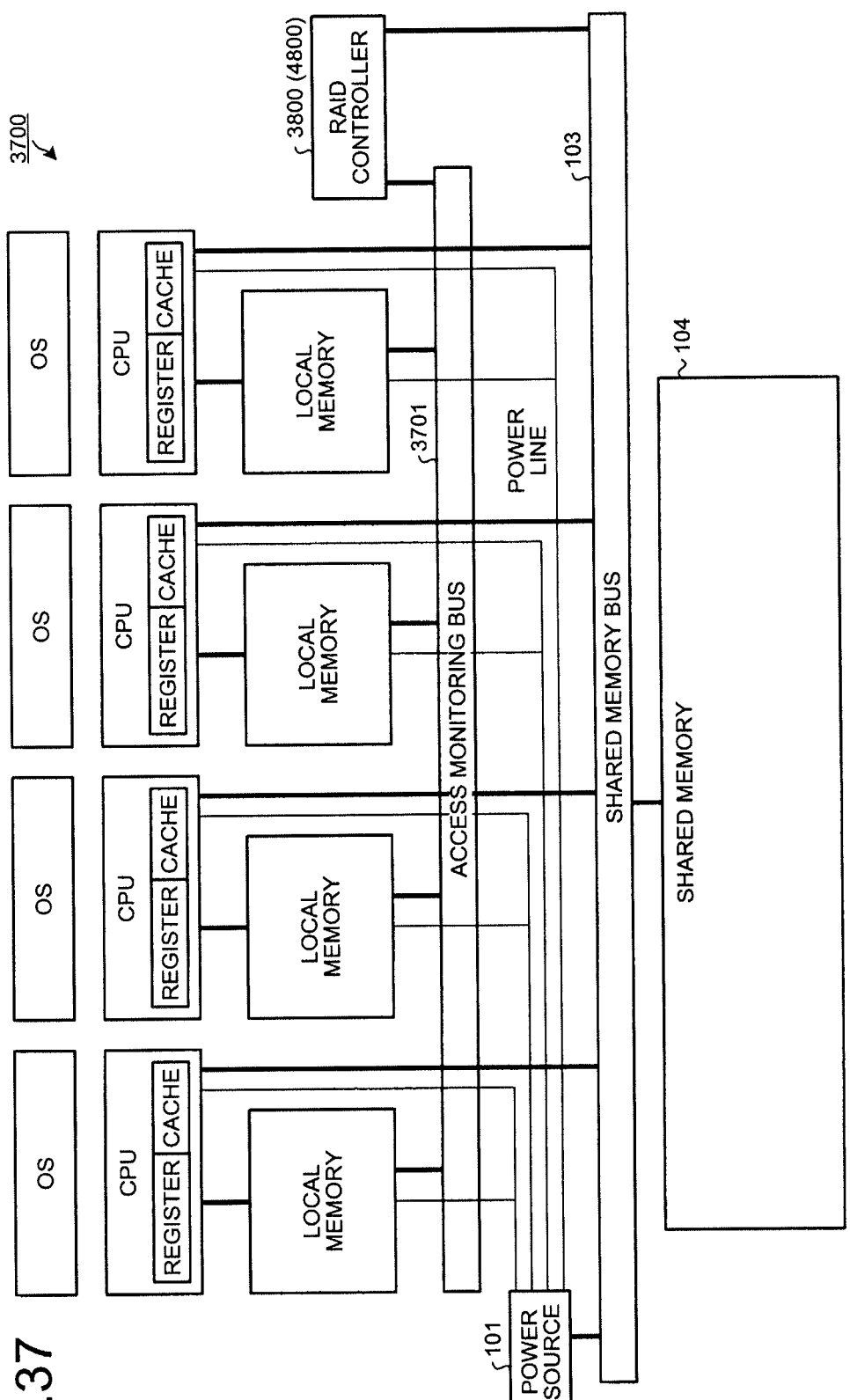
FIG. 37 is an explanatory view of an example of configuration of a multicore processor including an access monitoring bus.

FIG. 37 is an explanatory view of an example of configuration of a multicore processor including an access monitoring bus. In Example 2 and Example 3 described hereinafter, the case of utilizing a multicore processor 3700 without the local memory bus 102 unlike Example 1 will be described. Some multicore processers do not include the local memory bus 102 as described in Example 1 because of design or structural limitations. In Examples 2 and 3, description will be made of examples of the data restoration process intended for a multicore processor without the local memory bus 102 as described above.

The absence of the local memory bus 102 means that local memories cannot access each other. Therefore, each CPU cannot comprehend what access is performed by CPUs other than the CPU.

Therefore, in the case of a multicore processor 3700 of Example 2, an access monitoring bus 3701 is newly added to enable a RAID controller 3800 to monitor access to local memories, to update parity data, and to save data at the time of power-supply suspension of a local memory.

Figure 38:
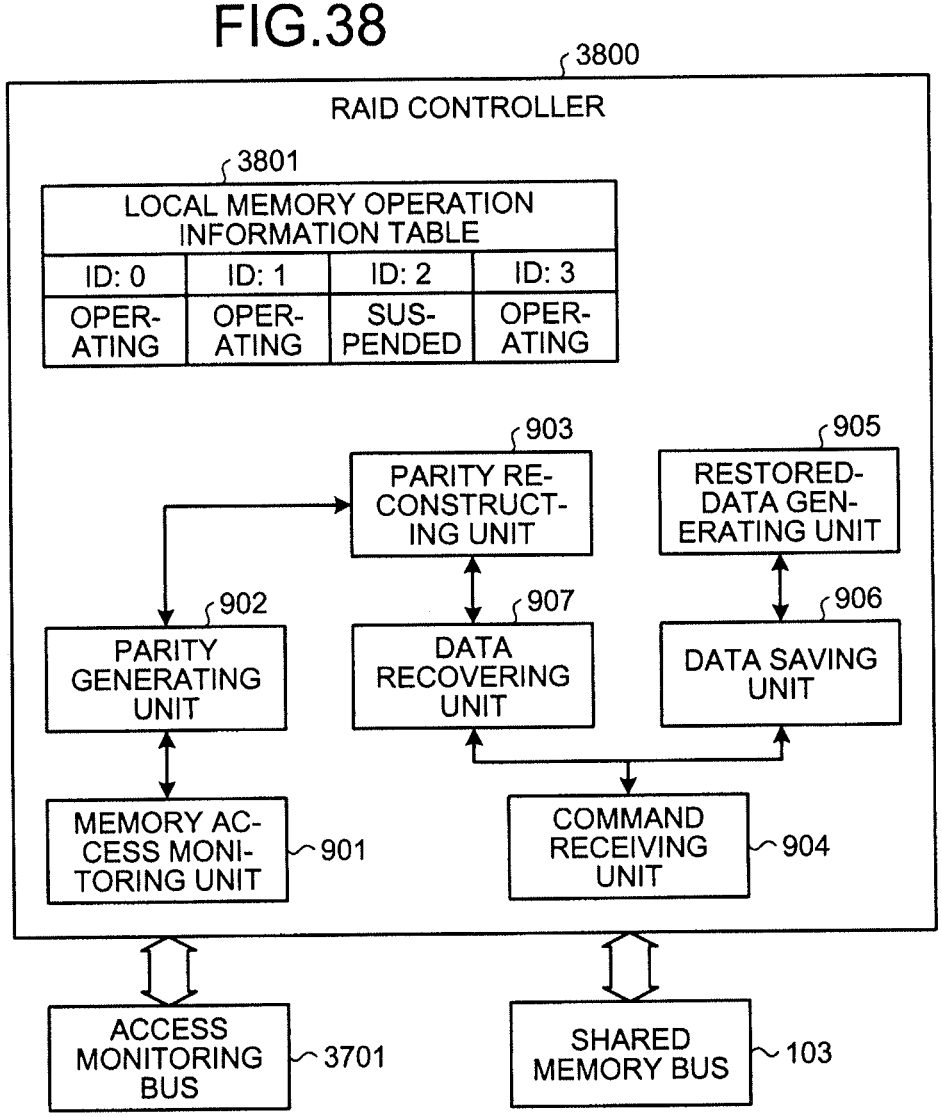
FIG. 38 is a block diagram of an example of internal configuration of the RAID controller in Example 2.

FIG. 38 is a block diagram of an example of internal configuration of the RAID controller in Example 2. As depicted in FIG. 38, as is the case of Example 1, the RAID controller 3800 includes the memory access monitoring unit 901 monitoring the update of the local memories, the parity generating unit 902 generating the parity data, the parity reconstructing unit 903 reconstructing the parity data, the command receiving unit 904 receiving a command of power-supply suspension from a CPU, the restored-data generating unit 905 restoring the data stored in a local memory from the parity data, and the data saving unit 906 saving contents of a local memory at the time of power-supply suspension.

The RAID controller 3800 of Example 2 additionally includes a data recovering unit 907 that restores the contents of a local memory at the time of power-supply restart, and a local memory operation information table 3801 that records the operating state of the local memories. The local memory operation information table 3801 is a data table for managing the operating statuses of the CPUs #0 to #3. Therefore, information indicative of either "OPERATING" or "SUSPENDED" is set according to the operating status of the corresponding CPU.

<Operation at the Time of Power-Supply Suspension>

Figure 39:
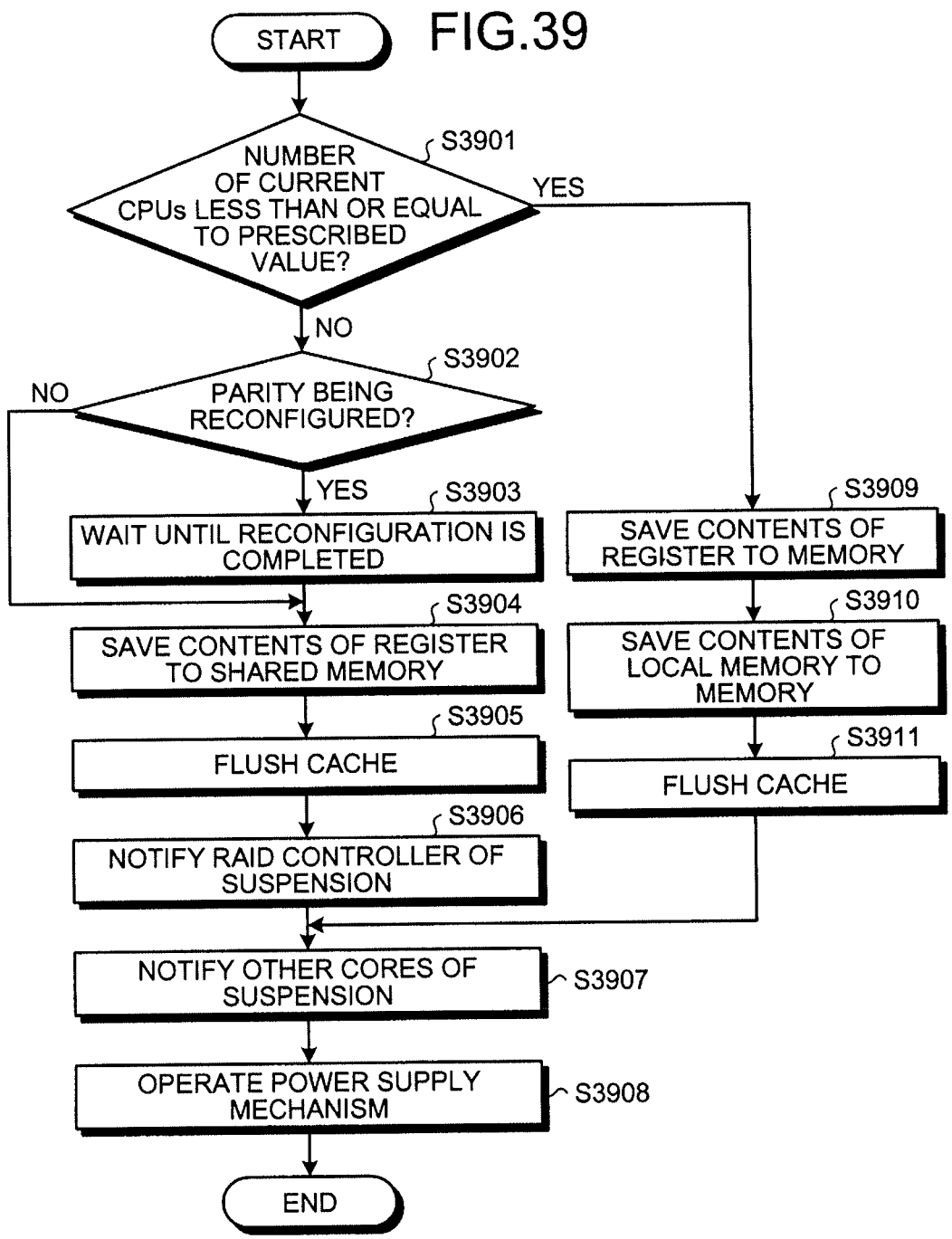
FIG. 39 is a flowchart of an operation procedure of the OS at the time of power-supply suspension in Example 2.

FIG. 39 is a flowchart of an operation procedure of the OS at the time of power-supply suspension in Example 2. The flowchart in FIG. 39 depicts details of instructions output from the OS to the RAID controller 3800 at the time of power-supply suspension of any one of the CPUs in the multicore processor 3700 and the procedure thereof.

In FIG. 39, the OS is triggered by determination of a power-supply suspension and starts operation. The OS first determines if the number of current CPUs is less than or equal to a prescribed value (step S3901). At step S3901, if it is determined that the number of CPUs is not less than or equal to the prescribed value (step S3901: NO), the OS determines whether parity is being reconfigured (step S3902).

If it is determined that the parity is being reconfigured at step S3902 (step S3902: YES), the OS waits until the reconfiguration is completed (step 3903) and saves the contents of the register to the shared memory 104 (step S3904). If it is determined that the parity is not being reconfigured at step S3902 (step S3902: NO), the OS goes to the process at step S3904 without waiting at step S3903.

The OS subsequently flushes the cache (step S3905) and notifies the RAID controller 3800 of the suspension of the given CPU (step S3906). The OS notifies the other cores of the suspension of the given CPU (step S3907), operates the power supply mechanism (step S3908) to completely suspend the electrical power supply to the given CPU, and terminates the series of processes.

On the other hand, if it is determined that the number of CPUs is less than or equal to the prescribed value at step S3901 (step S3901: YES), the OS saves the contents of the register to the memory (step S3909) and saves the contents of the local memory to the memory (step S1310). The OS then flushes the cache (step S3911) and goes to the process at step S3907.

As described, if a CPU of the multicore processor 3700 is suspended to terminate the electrical power supply to any one of the operating local memories, a higher program such as an OS saves the register and flushes the cache in a conventional manner. Subsequently, the OS notifies the RAID controller 3800 of the suspension of the CPU on which the OS is running and then turns off the power without saving the contents of the local memory.

When the power is turned off, if power supply to another CPU is suspended immediately before the powering off and the parity data is under reconstruction, a query about a current state is made to the RAID controller 3800. The OS waits for the completion of the reconstruction and then turns off the CPU on which the OS is running. As described in Example 1, as the number of suspended CPUs increases, the area necessary for parity data per local memory (the size/operating number of data areas) increases.

Therefore, in preparation for a case where parity data areas prepared in advance are exceeded, if the number of the currently operating local memories is less than or equal to the prescribed value, the RAID controller 3800 is not utilized and a process is employed that suspends the power supply after saving the data stored in the local memory to the shared memory 104 in a conventional manner. Details of processes of the functional units at the time of power-supply suspension described above will be described respectively.

Figure 40:
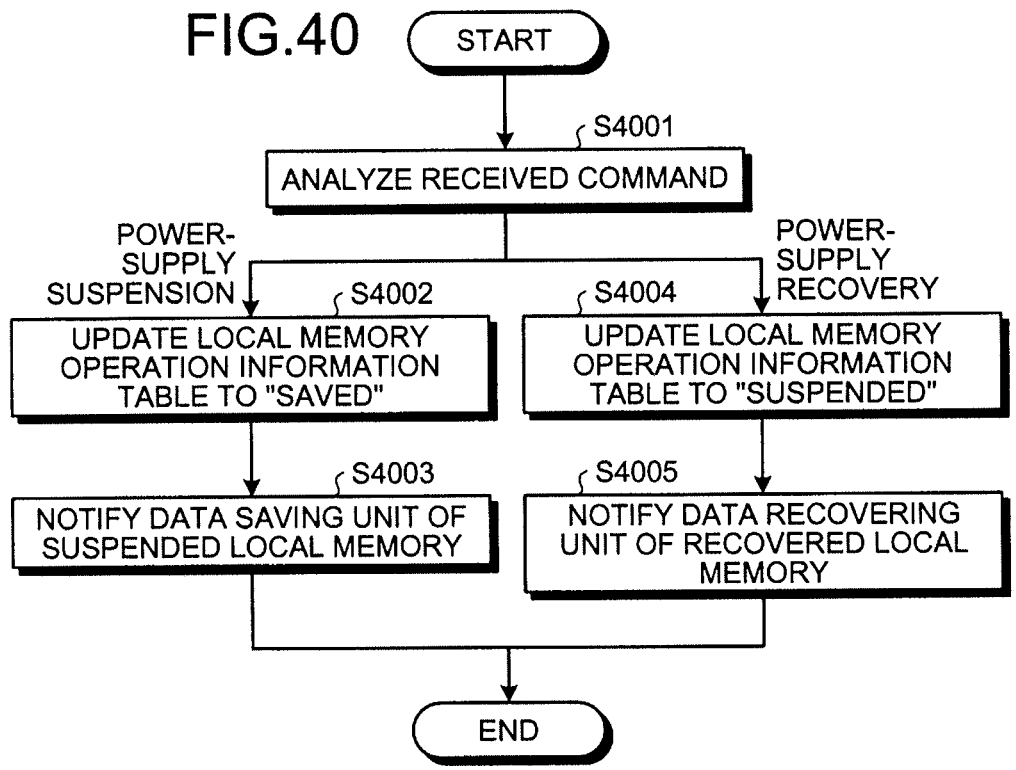
FIG. 40 is a flowchart of an operation procedure of a command receiving unit.

FIG. 40 is a flowchart of an operation procedure of the command receiving unit. The flowchart in FIG. 40 depicts details of processes executed by the command receiving unit 904 at the time of power-supply suspension. As depicted in FIG. 40, the process of the power-supply suspension is executed with a power-supply suspension command from an OS to a CPU. Therefore, the RAID controller 3800 starts a series of operations with command reception by the command receiving unit 904.

In FIG. 40, the command receiving unit 904 is triggered by reception of some kind of command and starts operation. First, the command receiving unit 904 analyzes the received command (step S4001). As a result of the analysis at step S4001, if the command is an instruction for power-supply suspension (step S4001: POWER-SUPPLY SUSPENSION), the command receiving unit 904 updates the local memory operation information table 3801 to SAVED (step S4002). The command receiving unit 904 notifies the data saving unit 906 of the suspended local memory (step S4003) and terminates the series of processes.

On the other hand, as a result of the analysis at step S4001, if the command is an instruction for power-supply recovery (step S4001: POWER-SUPPLY RECOVERY), the command receiving unit 904 updates the local memory operation information table 3801 to SUSPENDED (step S4004). The command receiving unit 904 notifies the data recovering unit 907 of the recovered local memory (step S4005) and terminates the series of processes.

Figure 41:
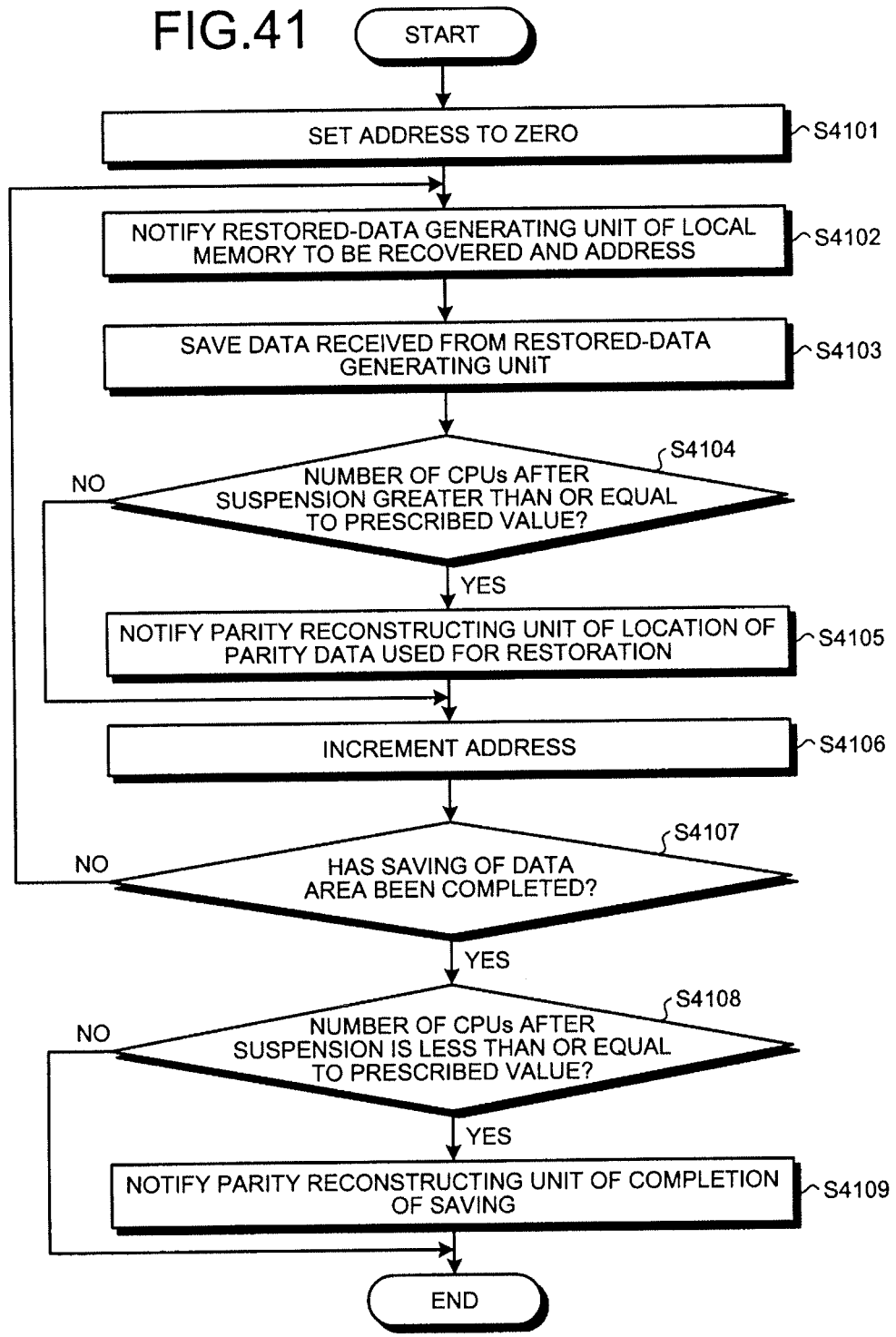
FIG. 41 is a flowchart of an operation procedure of a data saving unit in Example 2.

FIG. 41 is a flowchart of an operation procedure of the data saving unit in Example 2. The flowchart in FIG. 41 depicts details of processes executed by the data saving unit 906 at the time of power-supply suspension.

In FIG. 41, the data saving unit 906 first sets an address to zero (step S4101) and notifies the restored-data generating unit 905 of a local memory to be recovered and the address (step S4102). The data saving unit 906 saves to the shared memory 104, data received from the restored-data generating unit 905 (step S4103).

The data saving unit 906 then determines if the number of CPUs after the suspension is greater than or equal to a prescribed value (step S4104). If it is determined that the number of CPUs is greater than or equal to the prescribed value at step S4104 (step S4104: YES), the data saving unit 906 notifies the parity reconstructing unit 903 of a location of the parity data used for restoration (step S4105).

The data saving unit 906 increments the address (step S4106) and determines whether the saving of the data area has been completed (step S4107). If it is determined that the number of CPUs is not greater than or equal to the prescribed value at step S4104 (step S4104: NO), the data saving unit 906 goes to the process at step S4106 without executing the process at step S4105 and increments the address.

The data saving unit 906 returns to the process at step S4102 until the saving of the data area is determined to have been completed at step 4107 and repeats the process for the incremented address (step S4107: NO).

At step S4107, if it is determined that the saving of the data area has been completed (step S4107: YES), the data saving unit 906 determines if the number of CPUs after the suspension is less than or equal to the prescribed value (step S4108). If it is determined that the number of CPUs after the suspension is less than or equal to the prescribed value at step S4108 (step S4108: YES), the data saving unit 906 notifies the parity reconstructing unit 903 of the completion of saving (step S4109) and terminates the series of processes.

If it is determined that the number of CPUs after the suspension is not less than or equal to the prescribed value at step S4108 (step S4108: NO), the data saving unit 906 directly terminates the series of processes without executing the process at step S4109.

Figure 42:
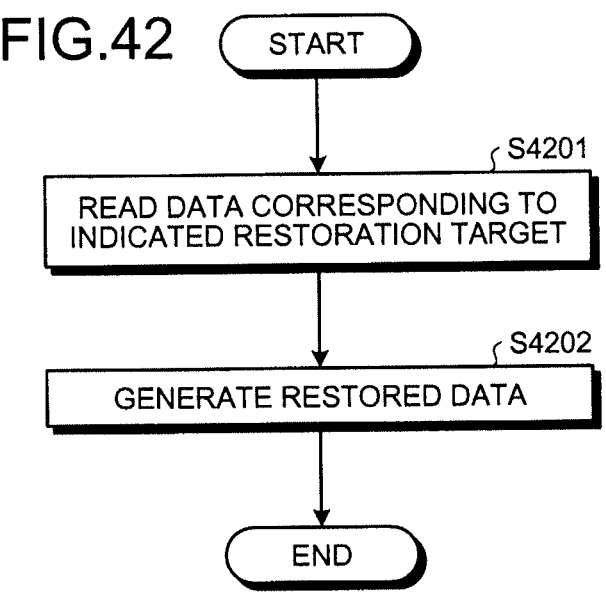
FIG. 42 is a flowchart of an operation procedure of a restored-data generating unit in Example 2.

FIG. 42 is a flowchart of an operation procedure of the restored-data generating unit in Example 2. The flowchart in FIG. 42 depicts details of processes executed by the restored-data generating unit 905 at the time of power-supply suspension.

In FIG. 42, the restored-data generating unit 905 reads data corresponding to an indicated restoration target (step S4201). The restored-data generating unit 905 then generates restored data (step S4202) and terminates the series of processes.

Figure 43:
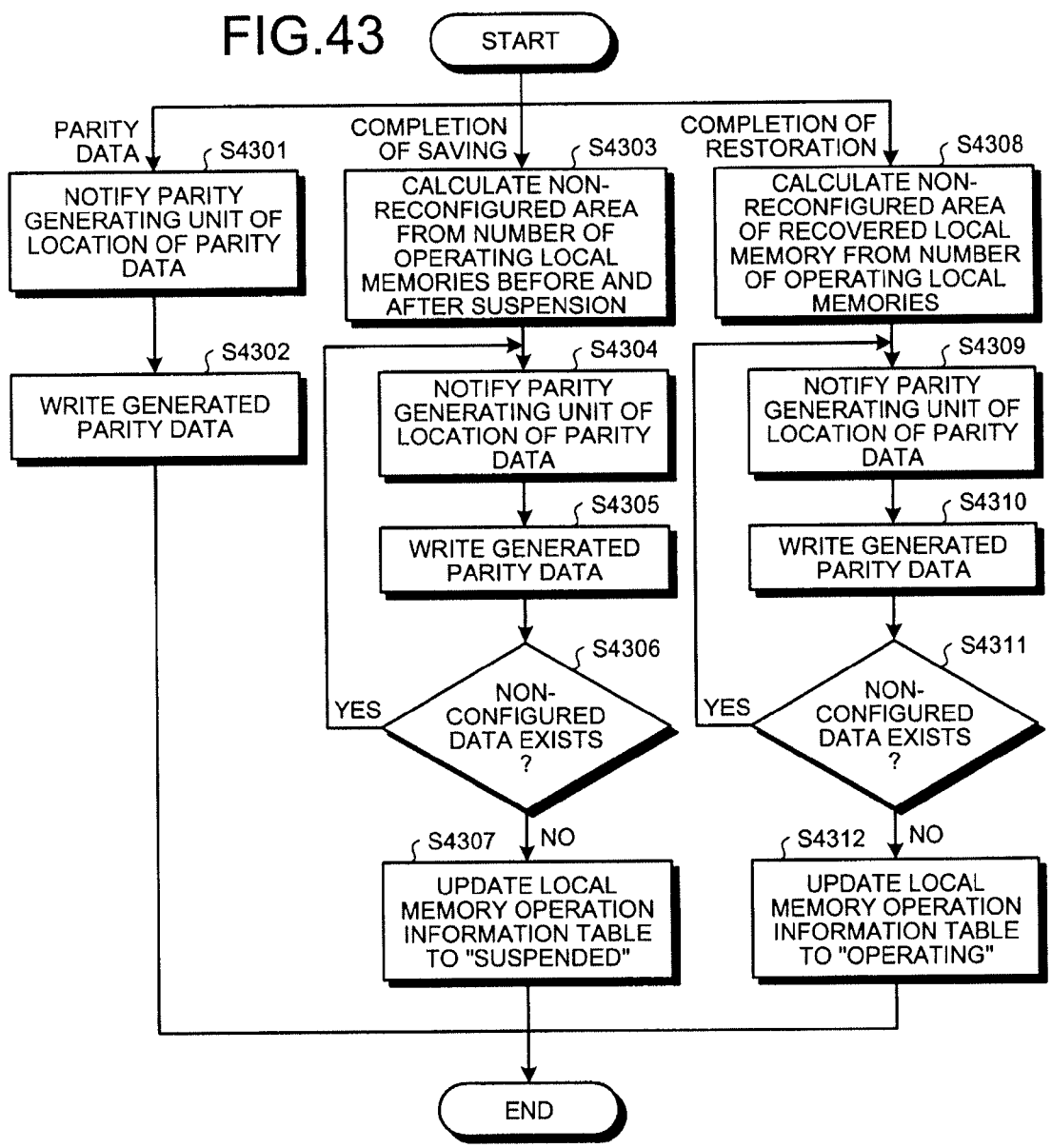
FIG. 43 is a flowchart of an operation procedure of a parity reconstructing unit.

FIG. 43 is a flowchart of an operation procedure of the parity reconstructing unit. The flowchart in FIG. 43 depicts a process related to parity data corresponding to details of the notification from the parity reconstructing unit 903. The execution of processes of FIG. 43 enables the parity reconstructing unit 903 to generate appropriate parity data and to store the generated parity data into an appropriate location.

In FIG. 43, the parity reconstructing unit 903 is triggered by reception of some kind of notification from another functional unit and starts operation. The parity reconstructing unit 903 receives three types of notifications, which include notification of generation of parity data, notification of completion of saving, and notification of completion of restoration. Therefore, the details of the operation of the parity reconstructing unit 903 vary according to which notification is received.

When notified of generation of parity data, the parity reconstructing unit 903 notifies the parity generating unit 902 of the location of the parity data (step S4301). The parity reconstructing unit 903 writes the generated parity data (step S4302) and terminates the series of processes.

If notified of completion of saving, the parity reconstructing unit 903 calculates a non-reconfigured area from the number of operating local memories before and after the suspension (step S4303). The parity reconstructing unit 903 notifies the parity generating unit 902 of the location of parity data (step S4304) and writes the generated parity data (step S4305).

The parity reconstructing unit 903 determines whether non-configured data exists (step S4306). If it is determined that non-configured data exists at step S4306 (step S4306: YES), the parity reconstructing unit 903 returns to the process at step S4304 and continues the process for the non-configured data.

On the other hand, if it is determined that non-configured data does not exist at step S4306 (step S4306: NO), the parity reconstructing unit 903 updates the local memory operation information table 3801 to SUSPENDED (step S4307) and terminates the series of processes.

If notified of completion of restoration, the parity reconstructing unit 903 calculates a non-reconfigured area of a recovered local memory from the number of operating local memories (step S4308). The parity reconstructing unit 903 then notifies the parity generating unit 902 of the location of parity data (step S4309) and writes the generated parity data (step S4310).

The parity reconstructing unit 903 determines whether non-configured data exists (step S4311). If it is determined that non-configured data exists at step S4311 (step S4311: YES), the parity reconstructing unit 903 returns to the process at step S4309 and continues the process for the non-configured data.

On the other hand, if it is determined that non-configured data does not exist at step S4311 (step S4311: NO), the parity reconstructing unit 903 updates the local memory operation information table 3801 to OPERATING (step S4312) and terminates the series of processes.

Figure 44:
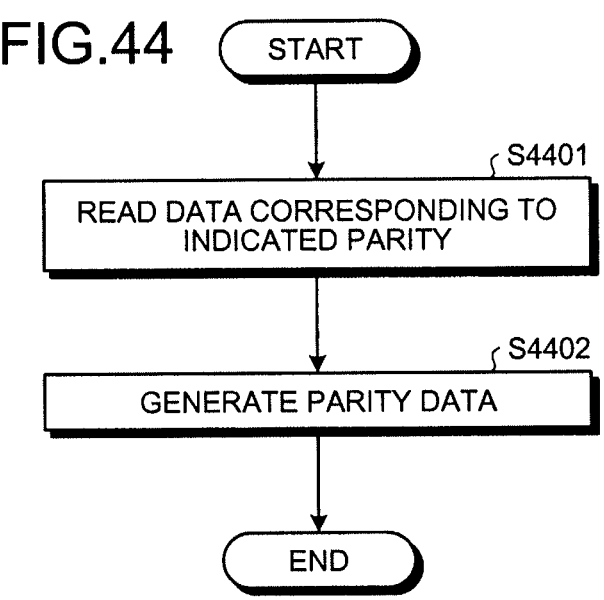
FIG. 44 is a flowchart of an operation procedure of a parity generating unit.

FIG. 44 is a flowchart of an operation procedure of the parity generating unit. The flowchart in FIG. 44 depicts details of processes executed by the parity generating unit 902.

In FIG. 44, the parity generating unit 902 reads data corresponding to an indicated parity (step S4401). The parity generating unit 902 then generates parity data (step S4402) and terminates the series of processes.

As described with reference to FIGS. 40 to 44, when the RAID controller 3800 is notified of a power-supply suspension, the command receiving unit 904 updates the local memory operation information table 3801 according to information of a command received by the command receiving unit 904. The command receiving unit 904 instructs the data saving unit 906 to save the contents of the suspended local memory. If the number of operating local memories after the suspend is greater than or equal to the prescribed value, the command receiving unit 904 also instructs the parity reconstructing unit 903 to concurrently reconstruct the parity data.

The parity reconstructing unit 903 reconstructs the parity data corresponding to data returned from the saving area by the data recovering unit 907. When the reconstruction of the data returned from the saving area is completed, the parity reconstructing unit 903 reconstructs the parity data corresponding to the parity area of the recovered local memory.

With regard to the data saving unit 906 and the parity reconstructing unit 903, the data saving unit 906 performs the saving from the head of the data area of the suspended local memory. At this point, the data recovering unit 907 is utilized to save data to a predetermined saving area after the data is restored. The data recovering unit 907 reads the parity data for restoring the data indicated by the data saving unit 906 and the data corresponding to the parity data from the operating local memories to recover the data of the suspended local memory.

The parity reconstructing unit 903 sequentially reconstructs the parity data by utilizing the parity generating unit 902 in the completely saved parity data area. If the saving of all the data areas of the suspended local memory has been completed, the parity reconstructing unit 903 sequentially reconstructs the parity data for the remaining areas.

<Operation at the Time of Power-Supply Recovery>

Figure 45:
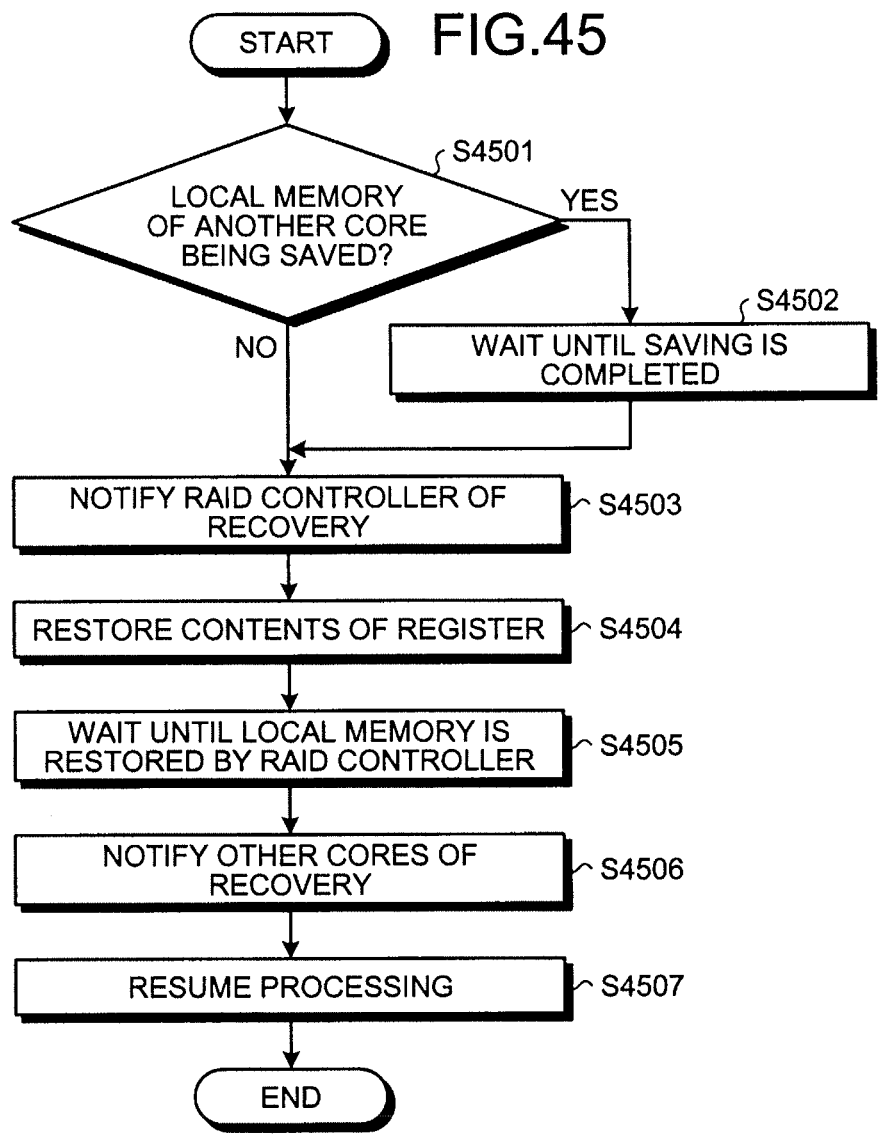
FIG. 45 is a flowchart of an operation procedure of the OS at the time of power-supply recovery in Example 2.

FIG. 45 is a flowchart of an operation procedure of the OS at the time of power-supply recovery in Example 2. The flowchart in FIG. 45 depicts details of processes of the OS when the power supply of a suspended CPU in the multicore processor 3700 is recovered in Example 2.

In FIG. 45, the OS is triggered by a recovery from a power-supply suspension and starts the process. First, the OS determines whether a local memory of another core is being saved (step S4501). If it is determined that a local memory of another core is being saved (step S4501: YES), the OS enters a waiting state until the saving is completed (step S4502).

If a local memory of another core is not being saved (step S4501: NO) or after waiting for the completion of the saving (step S4502), the OS notifies the RAID controller 3800 of the recovery (step S4503). The OS then restores the contents of the register of the core (step S4504).

The OS further waits until the local memory is restored by the RAID controller 3800 (step S4505) and notifies the other cores of the recovery (step S4506). Subsequently, the OS resumes normal processing (step S4507) and terminates the series of processes.

As described, in Example 2, if the electrical power supply to a CPU is resumed, the contents of the register are restored by the OS executed by the CPU to which the electrical power supply is resumed. Since the OS notifies the RAID controller 3800 of the recovery of the OS at the same time, the process before the suspension can be resumed after waiting for the completion of restoration of the RAID controller 3800.

Figure 46:
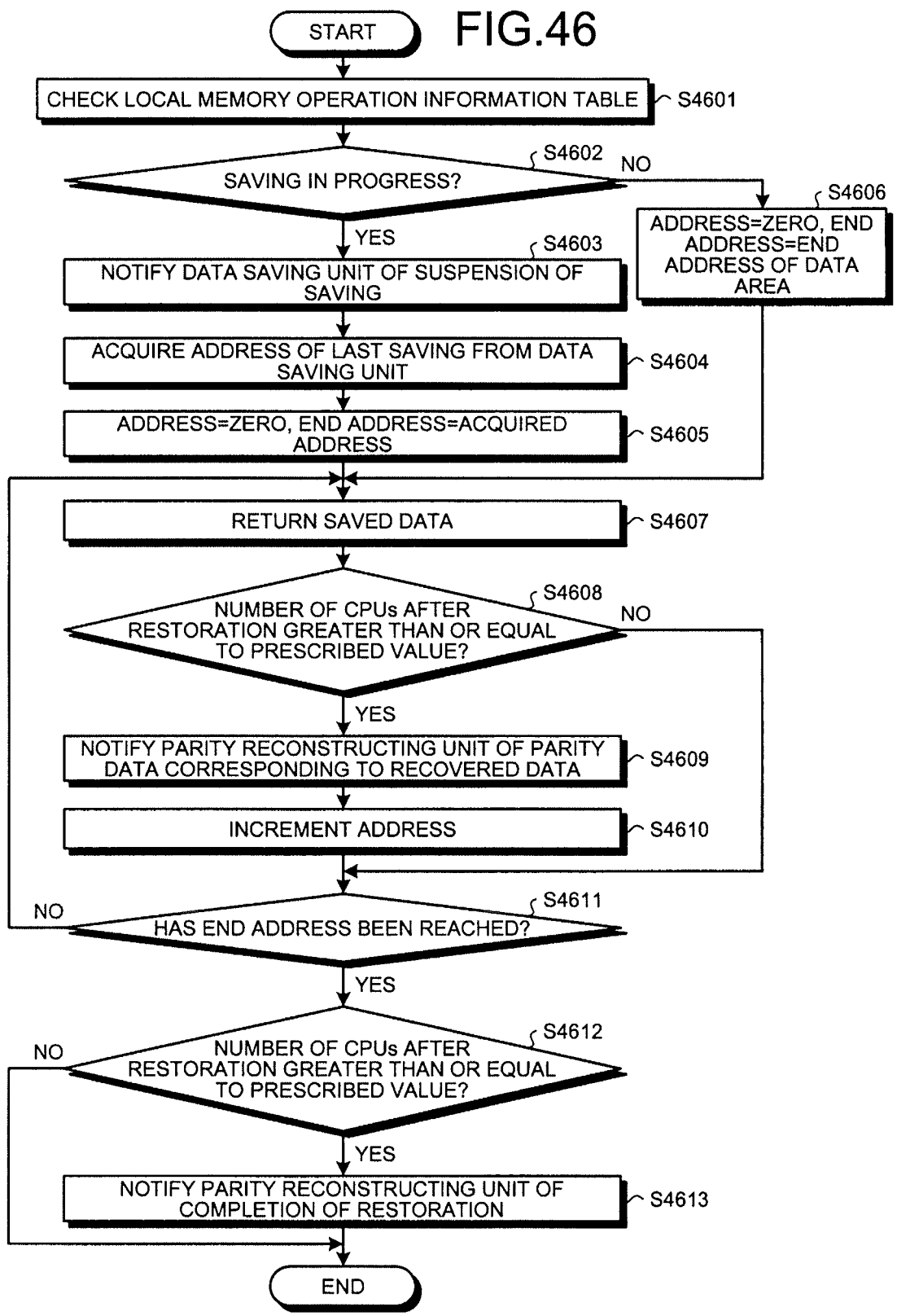
FIG. 46 is a flowchart of the process procedure of the data recovering unit.

FIG. 46 is a flowchart of the process procedure of the data recovering unit. FIG. 46 depicts details of processes executed by the data recovering unit 907 at the time of power-supply recovery.

In FIG. 46, the data recovering unit 907 checks the local memory operation information table 3801 (step S4601) and determines whether saving is in progress (step S4602). If it is determined that the local memory operation information table 3801 indicates saving in progress at step S4602 (step S4602: YES), the data recovering unit 907 notifies the data saving unit 906 of a suspension of the saving (step S4603).

The data recovering unit 907 acquires the address of the last saving from the data saving unit 906 (step S4604) and then sets the address to zero and an end address to the address acquired at step S4604 (step S4605).

On the other hand, if it is determined that saving is not in progress at step S4602 (step S4602: NO), the data recovering unit 907 sets the address to zero and the end address to the end address of the data area (step S4606).

When the addresses are set at step S4605 or step S4606, the data recovering unit 907 returns the saved data to the local memory (step S4607). The data recovering unit 907 determines if the number of CPUs after the restoration is greater than or equal to the prescribed value (step S4608).

If it is determined that the number of CPUs after the restoration is greater than or equal to the prescribed value at step S4608 (step S4608: YES), the data recovering unit 907 notifies the parity reconstructing unit 903 of the parity data corresponding to the recovered data (step S4609). The data recovering unit 907 then increments the address (step S4610).

On the other hand, if it is determined that the number of CPUs after the restoration is not greater than or equal to the prescribed value at step S4608 (step S4608: NO), the data recovering unit 907 goes to the process at step S4611 without executing the process at step S4609.

The data recovering unit 907 determines whether the end address has been reached (step S4611). If the end address has not been reached (step S4611: NO), the data recovering unit 907 returns to step S4607 to execute the process for an incremented address.

If it is determined that the end address has been reached (step S4611: YES), the data recovering unit 907 determines if the number of CPUs after the restoration is greater than or equal to the prescribed value (step S4612). If it is determined that the number of CPUs is greater than or equal to the prescribed value at step S4612 (step S4612: YES), the data recovering unit 907 notifies the parity reconstructing unit 903 of the completion of restoration (step S4613) and terminates the series of processes. On the other hand, if it is determined that the number of CPUs is not greater than or equal to the prescribed value at step S4612 (step S4612: NO), the data recovering unit 907 terminates the series of processes without executing the process at step S4613.

As described, the data recovering unit 907 of Example 2 determines that all the data are saved unless the recovered local memory is suspended immediately before the operation of referring to the local memory operation information table 3801. Therefore, the data recovering unit 907 performs the restoration from the saved data into the local memory. In the case of a CPU suspended immediately before the operation, the data saving unit 906 refers to the local memory operation information table 3801. If non-saved data exists, the restored-data generating unit 905 can restore the data from unprocessed, non-reconstructed parity data into the local memory to recover the data without omission.

Example 3

In Example 3, the configuration of the multicore processor 3700 depicted in FIG. 37 is utilized as in Example 2. However, unlike Example 2, saving recovery information 4801 (see FIG. 48) recording the saving recovery statuses of the local memories is added to the RAID controller 3800. By recording the saving recovery statuses of the local memories into the saving recovery information 4801 and causing the memory access monitoring unit 901 to monitor both the read process and the write process, it is expected that the data restoration into a local memory is accelerated at the time of power-supply recovery.

<Operation at the Time of Power-Supply Suspension>

Figure 47:
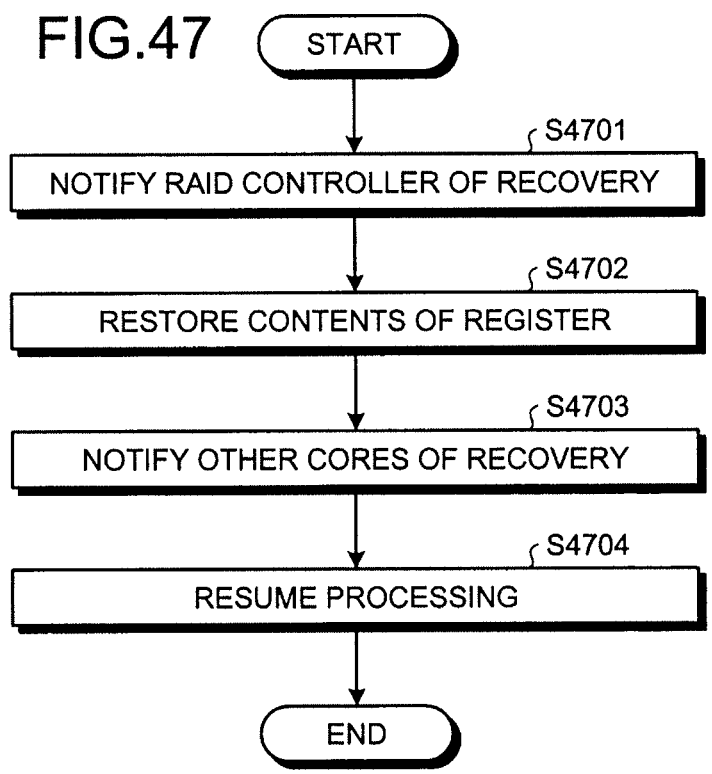
FIG. 47 is a flowchart of an operation procedure of the OS at the time of power-supply suspension in Example 3.

FIG. 47 is a flowchart of an operation procedure of the OS at the time of power-supply suspension in Example 3. The flowchart in FIG. 47 depicts details of instructions output from the OS to a RAID controller 4800 (see FIG. 37) at the time of power-supply suspension of any one of the CPUs in the multicore processor 3700 and the procedure thereof.

In FIG. 47, the OS of the multicore processor is triggered by an instruction for recovery from power-supply suspension and starts operation. First, the OS notifies the RAID controller 4800 of the recovery (step S4701). The OS restores the contents of the register of the recovered core (e.g., CPU #1) (step S4702) and notifies the other cores of the recovery (step S4703). The OS resumes normal processing by the recovered core (step S4704) and terminates the series of processes at the time of power-supply recovery. As described, in the case of Example 3, the OS at the time of power-supply recovery starts processing without waiting for the recovery of contents of the local memory by the RAID controller 4800.

Figure 48:
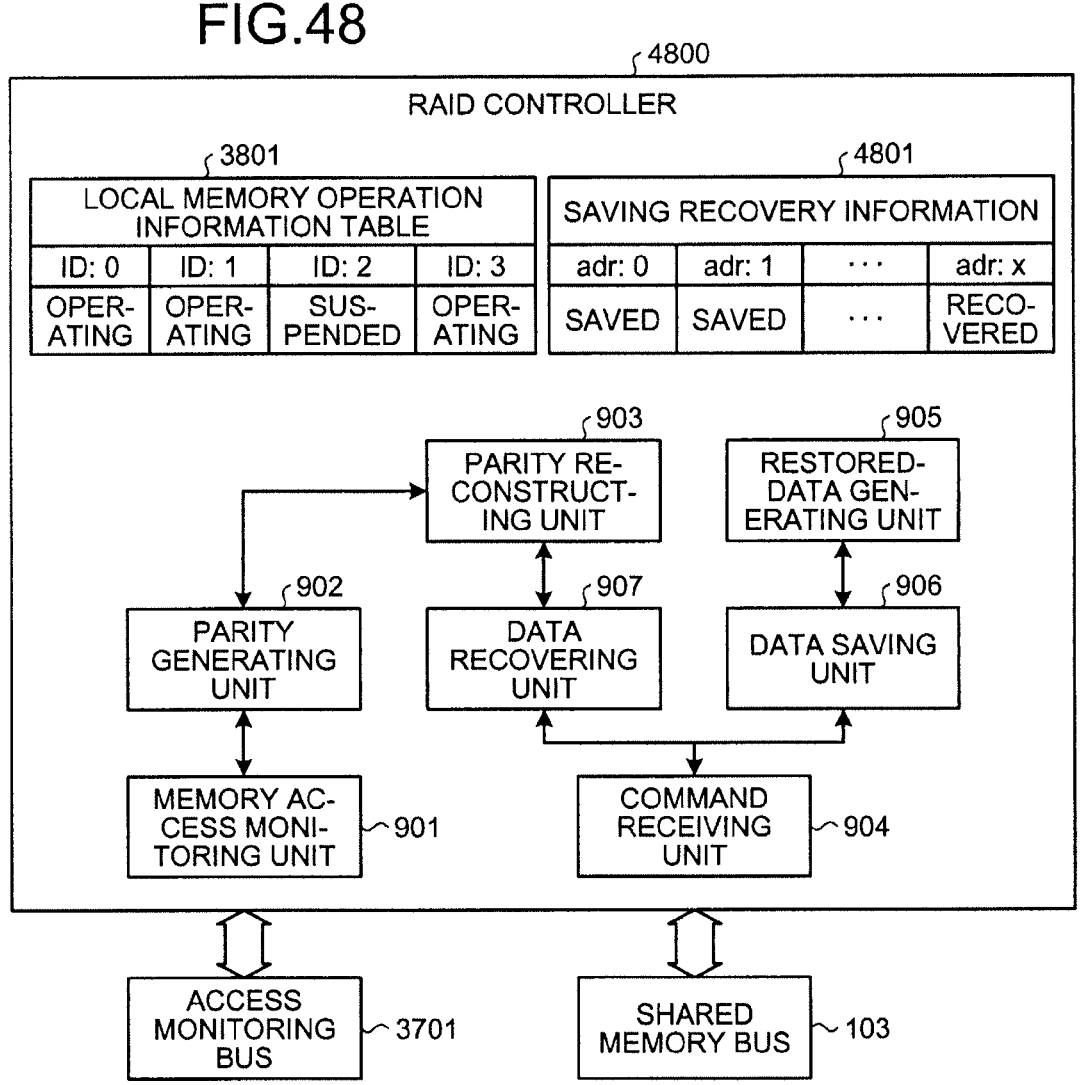
FIG. 48 is a block diagram of an internal configuration of the RAID controller in Example 3.

FIG. 48 is a block diagram of an internal configuration of the RAID controller in Example 3. As depicted in FIG. 48, in the case of Example 3, the RAID controller 4800 has a configuration acquired by adding the saving recovery information 4801 to the RAID controller 3800 of Example 2.

In the case of the RAID controller 4800, the memory access monitoring unit 901 can monitor access of a local memory being recovered in addition to the monitoring process described in Example 2. When the access of a local memory being recovered is monitored, if local memory data is read before recovery, the RAID controller 4800 can recover the given data first and return a value. If writing is performed, the RAID controller 4800 can update the parity data in a conventional manner and update the saving recovery information such that the given data is not recovered.

Figure 49:
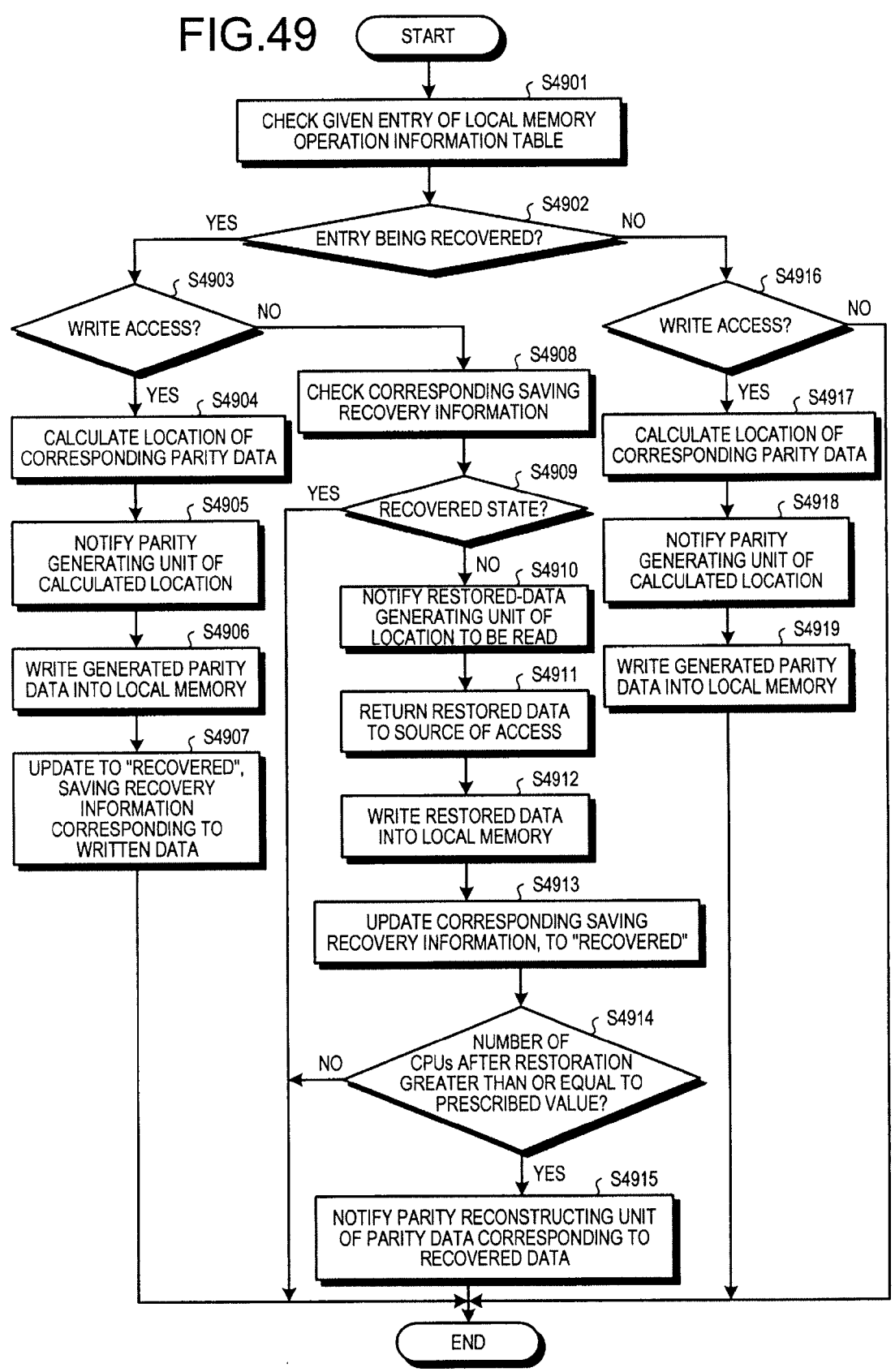
FIG. 49 is a flowchart of an operation procedure of a memory access monitoring unit.

FIG. 49 is a flowchart of an operation procedure of the memory access monitoring unit. The flowchart in FIG. 49 depicts details of processes executed by the memory access monitoring unit 901.

In FIG. 49, the memory access monitoring unit 901 is triggered by detection of access to any one of the local memories and starts operation. The memory access monitoring unit 901 checks a given entry of the local memory operation information table 3801 (step S4901). The memory access monitoring unit 901 then determines whether the entry checked at step S4901 is being recovered (step S4902).

If it is determined that the checked entry is being recovered at step S4902 (step S4902: YES), the memory access monitoring unit 901 subsequently determines whether the checked entry is a write access to any one of the local memories (step S4903). If it is determined that the checked entry is the write access at step S4903 (step S4903: YES), the memory access monitoring unit 901 calculates a location of corresponding parity data (step S4904).

When the location of the parity data is calculated at step S4904, the memory access monitoring unit 901 notifies the parity generating unit 902 of the calculated location (step S4905). The memory access monitoring unit 901 then writes the generated parity data into a local memory (step S4906), updates the saving recovery information 4801 corresponding to the written data to RECOVERED (step S4907), and terminates the series of processes.

On the other hand, if it is determined that the checked entry is not the write access at step S4903 (step S4903: NO), the memory access monitoring unit 901 checks the corresponding saving recovery information 4801 (step S4908). The memory access monitoring unit 901 determines whether a result of the check of the saving recovery information 4801 is the recovered state (step S4909).

If the result of the check is the recovered state at step S4609 (step S4609: YES), the memory access monitoring unit 901 terminates the series of processes. On the other hand, if the result of the check is not the recovered state (step S4609: NO), the memory access monitoring unit 901 determines that this access is a read access and executes the following processes.

First, the memory access monitoring unit 901 notifies the restored-data generating unit 905 of a location to be read (step S4910). The memory access monitoring unit 901 then returns the restored data to the source of access (step S4911) and writes the restored data into the local memory (step S4912). Therefore, the memory access monitoring unit 901 updates the corresponding saving recovery information 4801 to RECOVERED (step S4913).

The memory access monitoring unit 901 then determines if the number of CPUs after the restoration is greater than or equal to the prescribed value (step S4914). If it is determined that the number of CPUs is greater than or equal to the prescribed value at step S4914 (step S4914: YES), the memory access monitoring unit 901 notifies the parity reconstructing unit 903 of the parity data corresponding to the recovered data (step S4915) and terminates the series of processes. On the other hand, if it is determined that the number of CPUs is not greater than or equal to the prescribed value at step S4914 (step S4914: NO), the memory access monitoring unit 901 directly terminates the series of processes.

If it is determined that the checked entry is not being recovered at step S4902 (step S4902: NO), the memory access monitoring unit 901 determines whether the checked entry is a write access to any one of the local memories (step S4916). If it is determined that the checked entry is the write access at step S4916 (step S4916: YES), the memory access monitoring unit 901 calculates a location of corresponding parity data (step S4917).

When the location of the parity data is calculated at step S4917, the memory access monitoring unit 901 notifies the parity generating unit 902 of the calculated location (step S4918). The memory access monitoring unit 901 then writes the generated parity data into a local memory (step S4919) and terminates the series of processes. On the other hand, if it is determined that the checked entry is not the write access at step S4916 (step S4916: NO), the memory access monitoring unit 901 directly terminates the series of processes.

Figure 50:
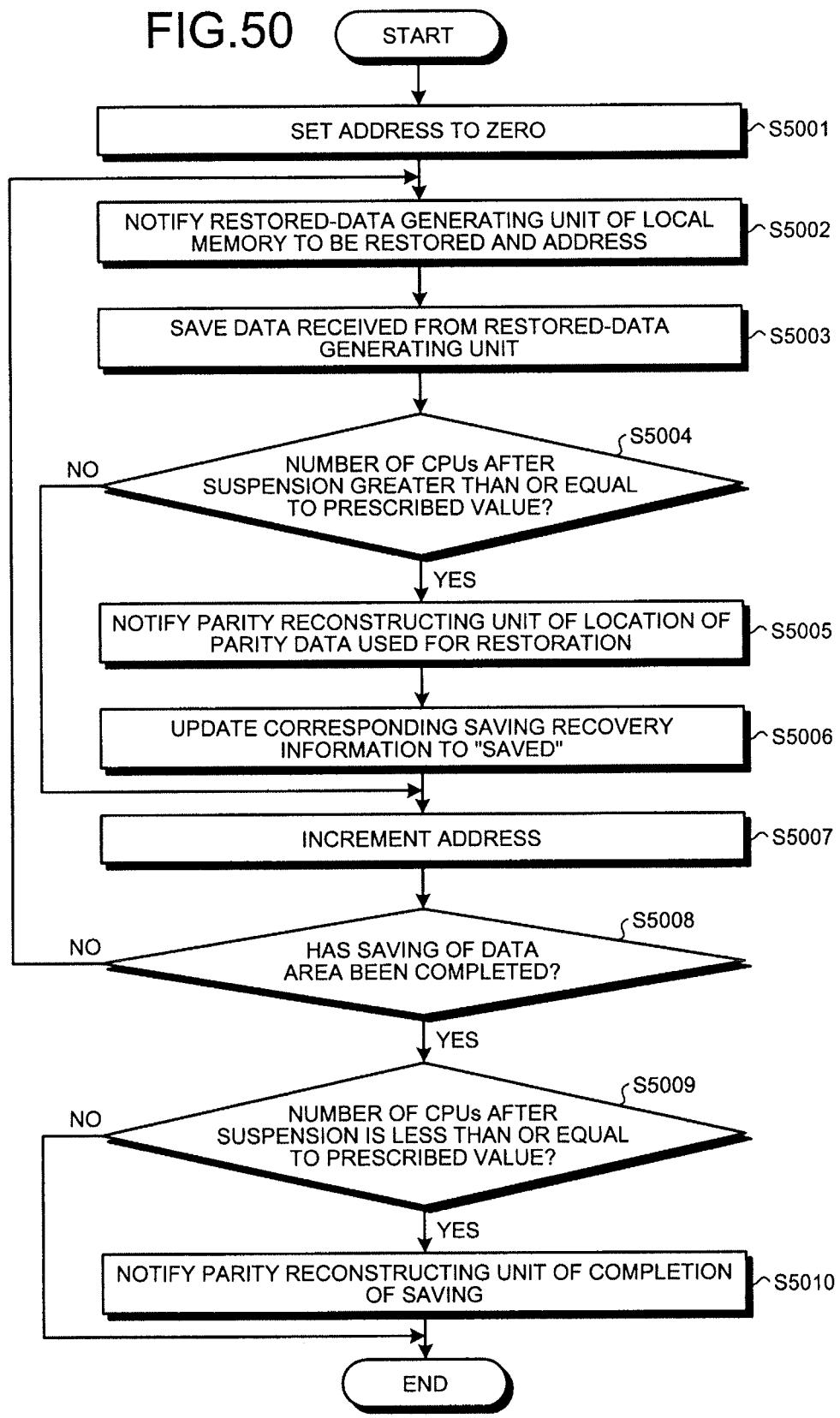
FIG. 50 is a flowchart of an operation procedure of the data saving unit in Example 3.

FIG. 50 is a flowchart of an operation procedure of the data saving unit in Example 3. The flowchart in FIG. 50 depicts details of processes executed by the data saving unit 906.

In FIG. 50, the data saving unit 906 sets an address to zero (step S5001) and notifies the restored-data generating unit 905 of a local memory to be restored and the address (step S5002). The data saving unit 906 saves data received from the restored-data generating unit 905 to the shared memory 104 (step S5003).

Subsequently, the data saving unit 906 determines if the number of CPUs after the suspension is greater than or equal to a prescribed value (step S5004). If it is determined that the number of CPUs is greater than or equal to the prescribed value at step S5004 (step S5004: YES), the data saving unit 906 notifies the parity reconstructing unit 903 of the location of the parity data used for restoration (step S5005).

The data saving unit 906 updates to SAVED, the corresponding saving recovery information 4801 (step S5006) and increments the address (step S5007). On the other hand, if it is determined that the number of CPUs is not greater than or equal to the prescribed value at step S5004 (step S5004: NO), the data saving unit 906 directly goes to step S5007 to increment the address without executing the process at steps S5005 to S5006.

After the process at step S5007, the data saving unit 906 determines whether the saving of the data area has been completed (step S5008) and, if it is determined that the saving has been completed (step S5008: YES), the data saving unit 906 determines if the number of CPUs after the suspension is less than or equal to the prescribed value (step S5009).

If it is determined that the saving of the data area has not been completed at step S5008 (step S5008: NO), the data saving unit 906 goes to the process at step S5002 to execute the process for the next address. If it is determined that the number of CPUs after the suspension is less than or equal to the prescribed value at step S5009 (step S5009: YES), the data saving unit 906 notifies the parity reconstructing unit 903 of the completion of saving (step S5010) and terminates the series of processes.

If it is determined that the number of CPUs after the suspension is not less than or equal to the prescribed value at step S5009 (step S5009: NO), the data saving unit 906 directly terminates the series of processes.

Figure 51:
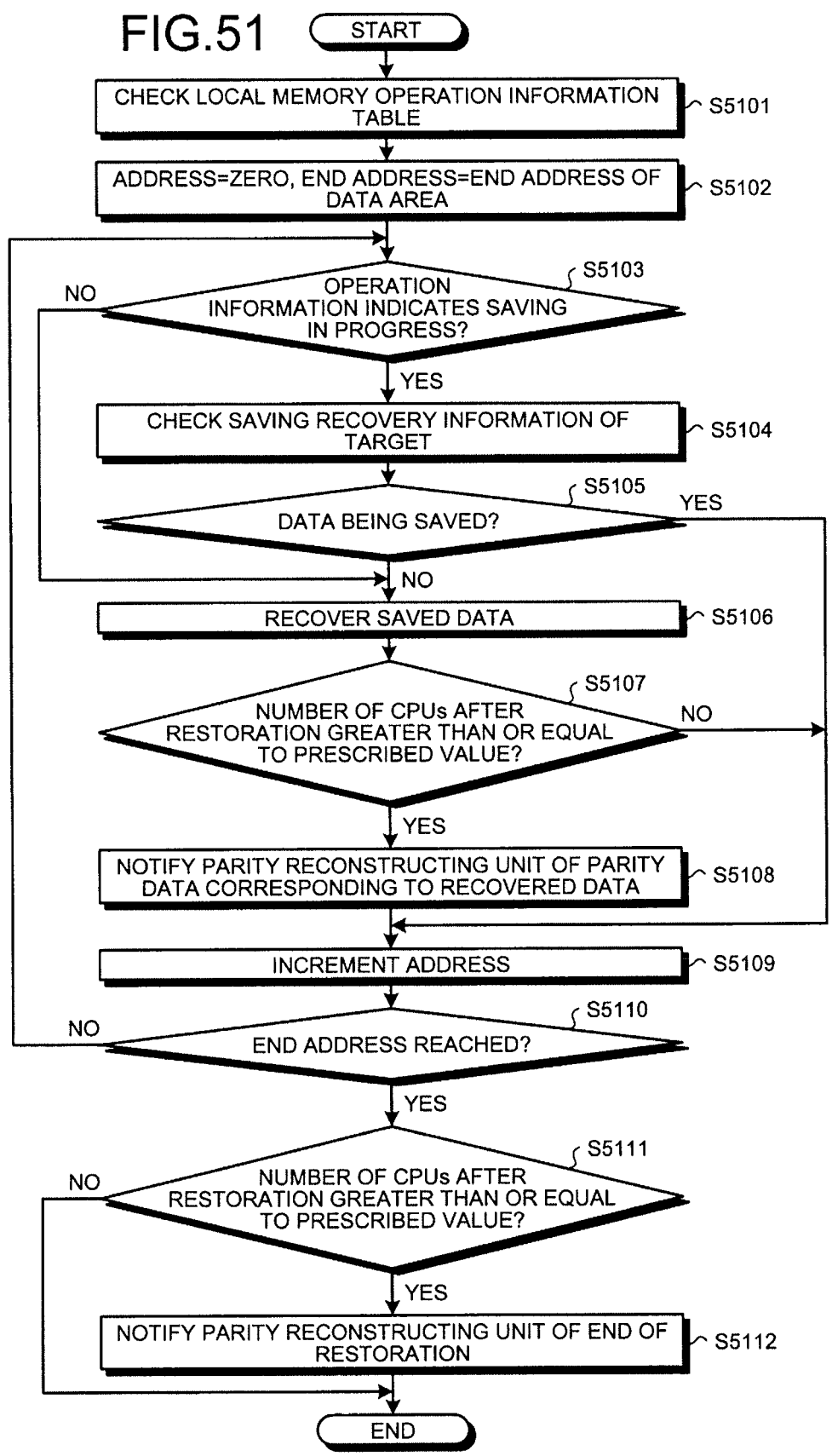
FIG. 51 is a flowchart of an operation procedure of the restored-data generating unit in Example 3.

FIG. 51 is a flowchart of an operation procedure of the restored-data generating unit in Example 3. The flowchart in FIG. 51 depicts details of processes executed by the restored-data generating unit 905 in Example 3.

In FIG. 51, the restored-data generating unit 905 first checks the local memory operation information table 3801 (step S5101). The restored-data generating unit 905 sets an address to zero and an end address to the end address of the data area (step S5102).

The restored-data generating unit 905 then determines whether the operation information indicates saving in progress (step S5103). If it is determined that the operation information indicates saving in progress at step S5103 (step S5103: YES), the restored-data generating unit 905 checks the saving recovery information 4801 of the target (step S5104) and determines whether the given data is being saved (step S5105).

If it is determined that the given data is being saved at step S5105 (step S5105: YES), the restored-data generating unit 905 goes to the process at step S5109. On the other hand, if it is determined that the given data is not being saved at step S5105 (step S5105: NO), the restored-data generating unit 905 recovers the saved data in the local memory (step S5106) and then determines if the number of CPUs after the restoration is greater than or equal to the prescribed value (step S5107).

If it is determined that the operation information does not indicate saving in progress at step S5103 (step S5103: NO), the restored-data generating unit 905 goes to the process at step S5106 to recover the saved data in the local memory.

If it is determined that the number of CPUs after the restoration is greater than or equal to the prescribed value at step S5107 (step S5107: YES), the restored-data generating unit 905 notifies the parity reconstructing unit 903 of the parity data corresponding to the recovered data (step S5108). If it is determined that the number of CPUs after the restoration is not greater than or equal to the prescribed value at step S5107 (step S5107: NO), the restored-data generating unit 905 goes to the process at step S5109.

The restored-data generating unit 905 increments the address (step S5109) and determines whether the incremented address is the end address (step S5110). If the end address is not reached at step S5110 (step S5110: NO), the restored-data generating unit 905 returns to the process at step S5103 to execute the process for the next address.

If it is determined that the end address is reached at step S5110 (step S5110: YES), the restored-data generating unit 905 determines if the number of CPUs after the restoration is greater than or equal to the prescribed value (step S5111).

If it is determined that the number of CPUs is greater than or equal to the prescribed value (step S5111: YES), the restored-data generating unit 905 notifies the parity reconstructing unit 903 of the end of restoration (step S5112) and terminates the series of processes. If it is determined that the number of CPUs is not greater than or equal to the prescribed value at step S5111 (step S5111: NO), the restored-data generating unit 905 directly terminates the series of processes.

As described, in the case of Example 3, the memory access monitoring unit 901 or the data saving unit 906 updates the saving recovery information 4801 at the time of saving of data. Therefore, the data recovering unit 907 can recover unrecovered information by reference to the saving recovery information 4801 and can update the saving recovery information. Therefore, a situation of saving wrong data can be prevented and power-supply suspension can be realized at a faster speed as compared to Example 2.

(Comparison of Electrical Power)

Figure 52:
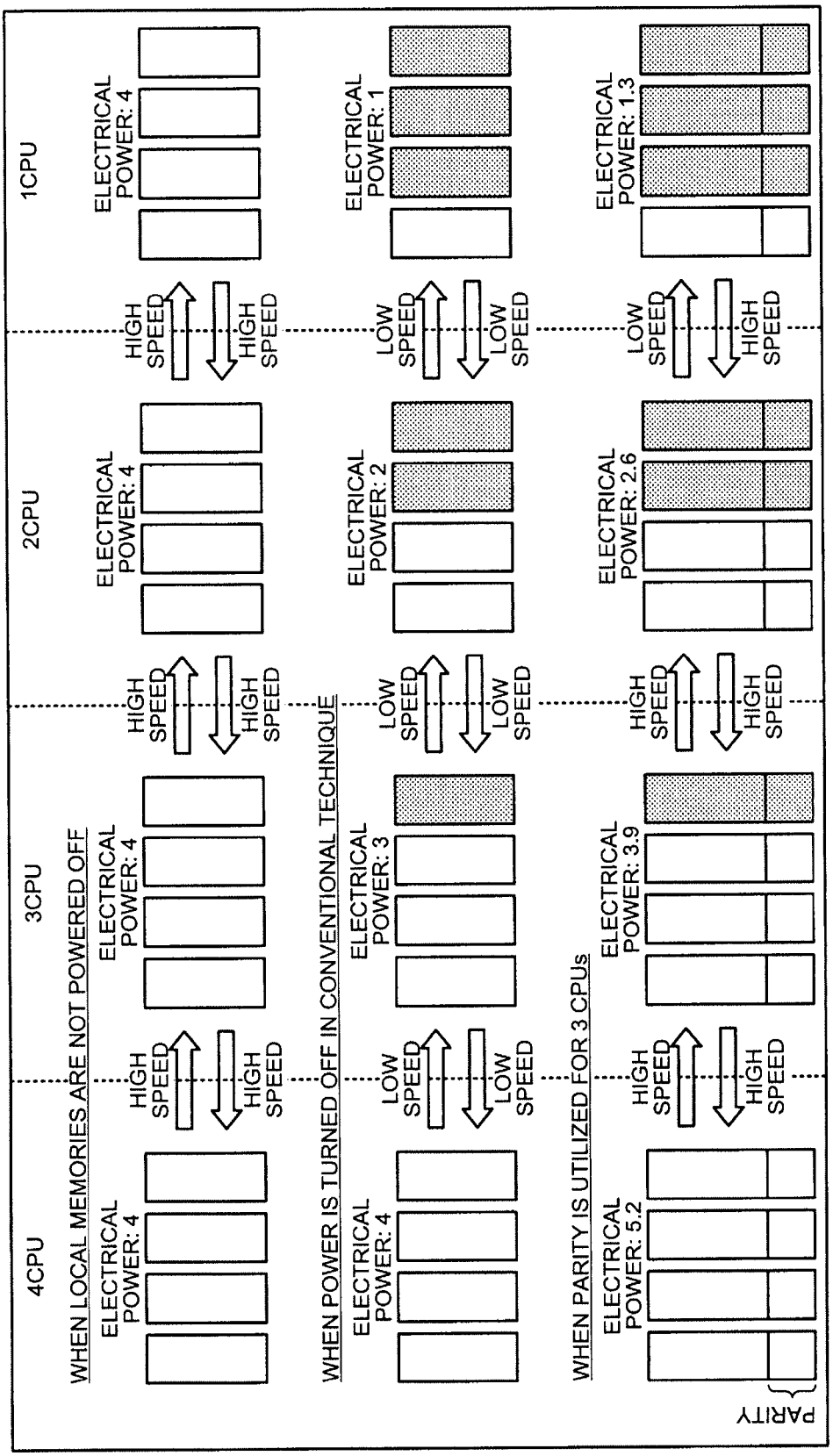
FIG. 52 is an explanatory view of an electrical power comparison example in the case of employing the data restoration process.

FIG. 52 is an explanatory view of an electrical power comparison example in the case of employing the data restoration process. In the case of the multicore processor, since the number of preliminary arranged CPUs and the number of concurrently operated CPUs vary, power efficiency significantly changes according to the usage state. However, in the conventional technique, sufficient power saving effect cannot be acquired in many cases by frequently turning on/off the power when consideration is given to the time consumed for saving data stored in a local memory.

Therefore, a brief comparison result of power consumption is illustrated in FIG. 52 between a multicore processor to which the data restoration process according to this embodiment is applied and the other multicore processors. The multicore processors including four CPUs will be described.

An upper row of FIG. 52 indicates electrical power when local memories are not powered off; a middle row indicates electrical power when the power is turned off in the conventional technique (the power is supplied until data is saved); and a lower row indicates electrical power when the data recovery process according to this embodiment is utilized. In the case of utilizing the data recovery process according to this embodiment, the multicore processor is set such that parity data is generated if three or more CPUs are in operation.

FIG. 52 depicts the case of four operating CPUs, the case of three operating CPUs, the case of two operating CPUs, and the case of one operating CPU from left to right except the upper row.

In FIG. 52, in the technique depicted in the upper-row, in which the four CPUs always operate, electrical power of 4 (relative value) is always consumed. In the conventional technique of the middle row, electrical power of 4→3→2→1 is consumed according to the number of operating CPUs. The consumed electrical power can obviously be suppressed to the minimum power of 1. However, the speed of processing required for changing the number of operating CPUs is slow and function as a multicore processor inevitably deteriorates.

In the data restoration process according to this embodiment in the lower row, parity data is created and stored into a parity area and therefore, if the number of operating CPUs is the same, power consumption is larger than the technique in which the power is not turned off or the conventional technique. However, since data is not saved even when the number of CPUs is changed, the processing speed is faster and a shift can immediately be made to the process corresponding to the number of CPUs.

Therefore, when the data restoration process according to this embodiment is applied particularly to a multicore processor having a relatively lower number of CPUs and frequently changing the number of operated CPUs, it can be expected that a system with higher power efficiency is provided.

As described, according to the data restoration program, the data restoration apparatus, and the data restoration method according to this embodiment, even when data stored in a volatile memory is lost, the data stored in the volatile memory can be restored from preliminarily stored parity data. Therefore, since it is not necessary to save the contents of a local memory in advance at the time of power-supply suspension of the local memory, the power-supply suspension operation of the local memory can be accelerated.

In the technique described above, when the number of operating volatile memories is changed, parity data is created according to the number of volatile memories capable of storage. Therefore, appropriately configured parity data can be created even in environment where the number of cores frequently changes.

In the technique described above, when a core is started after the electrical power supply has been suspended, data restored in a shared memory can automatically be recovered in a volatile memory. When the core is started, data not yet restored in the shared memory is reconfigured by utilizing the parity data and then recovered in the volatile memory. Therefore, even if a core is frequently suspended and resumed, the data stored and lost in the volatile memory can be restored without omission.

In the technique described above, when a volatile memory accessed by an operating core is suspended, the access destination of the core can be changed according to whether the data stored in the volatile memory is reconfigured. If the data stored in the volatile memory is not reconfigured, data to be accessed is reconfigured to support the access by the core. Therefore, even if a suspended core exists in the multicore processor, the other operating cores can access desired data through the procedure same as the normal procedure without considering the operating state of the other cores.

In the technique described above, the saving process for data stored in a volatile memory can be changed according to the number of operating cores. Therefore, if the number of operating cores is large and the processing speed of the cores is not reduced by storing parity data into volatile memories, the saving process utilizing parity data is employed to realize high-speed power-supply suspension. If the number of operating cores is small and the storage of parity data brings pressure on the capacity of volatile memories and may cause the reduction in processing speed of the cores, parity data is not stored and data is saved with the conventional technique. Therefore, since the most efficient technique is utilized according to the number of operating cores, the processing speed of the multicore processor can be maintained within an assumed range.

The data restoration method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

The data restoration apparatus 110 described in this embodiment can be implemented by an application specific IC (hereinafter, simply referred to as "ASIC") such as a standard cell and a structured application specific integrated circuit (ASIC) or a programmable logic device (PLD) such as FPGA. For example, the functions (the suspension detecting unit 601 to the recovering unit 606) of the data restoration apparatus 110 described above are functionally defined in hardware description language (HDL), which is logically synthesized and applied to the ASIC, the PLD, etc., thereby enabling manufacture of the data restoration apparatus 110.

The data restoration program, the data restoration apparatus, and the data restoration method enable high-speed power-supply suspension without waiting for data stored in a volatile memory to be saved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data restoration method executed by a computer capable of accessing a multicore processor equipped with volatile memories and a plurality of cores accessing the volatile memories, each core being associated with a respective volatile memory, the data restoration method comprising:
    detecting a suspend instruction to any one of the cores in the multicore processor; and
    restoring, when the suspend instruction is detected, data stored in a volatile memory accessed by a core receiving the suspend instruction, the data being restored in a shared memory accessed by cores in operation other than the core receiving the suspend instruction and based on parity data stored in volatile memories accessed by the cores in operation.

2. The data restoration method according to claim 1, comprising:
    creating after restoration is executed, parity data for restoring data stored in each of the volatile memories accessed by the cores in operation; and
    storing the created parity data into respective volatile memories among volatile memories accessed by the cores in operation other than a volatile memory storing a data to be restored by the parity data.

3. The data restoration method according to claim 2, wherein
    the creating, when data is newly added as, or updated to new data in a volatile memory of any one of the cores, includes creating parity data for restoring the new data,
    the storing includes storing the created parity data into volatile memories other than the volatile memory to which the new data is added or in which data is updated to the new data among the volatile memories accessed by the cores in operation,
    the detecting includes detecting a suspend instruction for a process accessing the volatile memory to which the new data is added or in which data is updated to the new data, and
    the restoring, when a suspend instruction is detected for a process accessing the volatile memory to which the new data is added or in which data is updated to the new data, includes restoring the new data in the shared memory based on the parity data stored in the volatile memories accessed by the cores in operation other than the core receiving the suspend instruction.

4. The data restoration method according to claim 3, wherein
    the creating, after the restoration, includes creating parity data for restoring the new data stored in the volatile memory accessed by the cores in operation, and
    the storing includes storing the parity data for restoring the created new data into respective volatile memories among the volatile memories accessed by the cores in operation other than the volatile memory storing the data to be restored by the parity data.

5. The data restoration method according to claim 1, comprising:
- detecting a start of electrical power supply to a suspended core among the cores; and
- recovering when a start of electrical power supply is detected, by storing into the volatile memory accessed by the core for which the start of electrical power supply is detected, the data restored in the shared memory.

6. The data restoration method according to claim 5, wherein
- the recovering, when the start of electrical power supply to the suspended core is detected during the restoration, includes using the parity data stored in the volatile memories accessed by the cores in operation to restore data not restored in the shared memory in data stored in the volatile memory accessed by the core receiving the suspend instruction and storing the restored data into the volatile memory accessed by the suspended core.

7. The data restoration method according to claim 5, wherein
- creating, after the data is restored at the recovering, parity data for restoring data stored in the respective volatile memories accessed by the cores in operation, and
- storing the created parity data into respective volatile memories among the volatile memories accessed by the cores in operation other than the volatile memory storing the data restored from the parity data.

8. The data restoration method according to claim 1, comprising:
- detecting a read request for data stored in a volatile memory accessed by any one of the cores; and
- notifying a core reading the data of the detected read request in response to the read request that the data of the detected read request is stored in the shared memory, if the volatile memory storing the data of the detected read request is not in operation.

9. The data restoration method according to claim 8, wherein
- the restoring, if the volatile memory storing the data of the detected read request is not in operation and the data of the detected read request is not restored in the shared memory, includes restoring the data of the detected read request based on the parity data stored in the volatile memories accessed by the cores in operation, and
- the notifying, if the volatile memory storing the data of the detected read request is not in operation and the data of the detected read request is not restored in the shared memory, includes notifying the core reading the data of the detected read request in response to the read request that the data of the detected read request is restored at the restoring.

10. The data restoration method according to claim 1, comprising:
- determining whether a number of the cores in operation is at least a threshold value;
- receiving a suspend instruction for any one of the cores; and
- outputting to a power supply circuit a suspend instruction to suspend electrical power supply to a core receiving the suspend instruction and to a volatile memory accessed by the core, when the number of the cores in operation is determined to be at least the threshold value.

11. The data restoration method according to claim 10, comprising
- transferring into the shared memory, a data stored in the volatile memory of the core for which the suspend instruction is received, when the number of the cores in operation is determined to not be at least the threshold value, wherein
- the outputting, after the data stored in the volatile memory of the core for which the suspend instruction is received is transferred to the shared memory, includes outputting to the power supply circuit, a suspend instruction to suspend electrical power supply to the volatile memory of the core for which the suspend instruction is received.

12. A data restoration apparatus capable of accessing a multicore processor equipped with volatile memories and a plurality of cores accessing the volatile memories, each core being associated with a respective volatile memory, the data restoration apparatus comprising a core configured to:
- detect a suspension of electrical power supply to a core receiving a suspend instruction among the cores in the multicore processor and to a volatile memory accessed by the core; and
- restore data stored in the volatile memory accessed by the core receiving the suspend instruction, the data being restored in a shared memory accessed by cores in operation other than the core receiving the suspend instruction and based on parity data stored in volatile memories accessed by the cores in operation and not receiving the suspend instruction, after the suspension of electrical power supply is detected.

13. A data restoration method executed by a computer having a suspension detecting unit and a restoring unit and capable of accessing a multicore processor equipped with volatile memories and a plurality of cores accessing the volatile memories, each core being associated with a respective volatile memory, the data restoration method comprising:
- detecting by the suspension detecting unit, a suspension of electrical power supply to a core receiving a suspend instruction among the cores in the multicore processor and to a volatile memory accessed by the core; and
- restoring by the restoring unit, data stored in the volatile memory accessed by the core receiving the suspend instruction, the data being restored in a shared memory accessed by cores in operation other than the core receiving the suspend instruction and based on parity data stored in volatile memories accessed by the cores in operation and not receiving the suspend instruction, after the suspension of electrical power supply is detected.

* * * * *